US012716846B2

(12) United States Patent
Ilchenko et al.

(10) Patent No.: US 12,716,846 B2
(45) Date of Patent: Aug. 25, 2026

(54) APPARATUS FOR CARRYING OUT SPECTROSCOPY

(71) Applicant: Lightnovo ApS, Birkerød (DK)

(72) Inventors: Oleksii Ilchenko, Birkerød (DK); Matvieiev Ivan, Sofiivska Borschahivka (UA)

(73) Assignee: LIGHTNOVO APS, Birkerød (DK)

( * ) Notice: Subject to any disclaimer, the term of this patent is extended or adjusted under 35 U.S.C. 154(b) by 92 days.

(21) Appl. No.: 18/804,604

(22) Filed: Aug. 14, 2024

(65) Prior Publication Data

US 2026/0049940 A1 Feb. 19, 2026

(51) Int. Cl.
*G01N 21/65* (2006.01)

(52) U.S. Cl.
CPC ... *G01N 21/65* (2013.01); *G01N 2201/06113* (2013.01); *G01N 2201/064* (2013.01)

(58) Field of Classification Search
CPC ......... G01N 21/65; G01N 2201/06113; G01N 2201/064
See application file for complete search history.

(56) References Cited

U.S. PATENT DOCUMENTS 5,454,825 A 10/1995 Van Leeuwen et al.
2004/0012778 A1 1/2004 Li et al.
2007/0132994 A1 6/2007 Kobayashi et al.
2015/0116708 A1* 4/2015 Spriggs .............. G01N 15/0211 356/336
2021/0072158 A1 3/2021 Ilchenko et al.

FOREIGN PATENT DOCUMENTS

JP 5-26728 A 2/1993
WO WO 2009/149256 A1 12/2009

* cited by examiner

*Primary Examiner* — Hina F Ayub
(74) *Attorney, Agent, or Firm* — Crowell & Moring LLP

(57) ABSTRACT

An apparatus including an optical system that guides a first portion of a laser beam to a sample and a second portion of the laser beam to a reference sample. A first spectrum beam generated from an interaction between the first portion and the sample and a second spectrum beam generated from an interaction between the second portion and the reference sample. The optical system guides the first and second spectrum beams to a diffraction element that splits the first spectrum beam into a first spectrum of spatially separated wavelength components associated with the sample and splits the second spectrum beam into a second spectrum of spatially separated wavelength components associated with the reference sample. A detector detects the first and second spectrum. A beam blocker prevents light propagating from the reference sample to the sample and/or from the sample to the reference sample.

10 Claims, 52 Drawing Sheets

Ref. 785nm
Time (sec)
Wavelength (nm)
Ref. 675nm
Time (sec)
Wavelength (nm)
Data 785nm
Time (sec)
Wavelength (nm)
Data 675nm
Time (sec)
Wavelength (nm)
Data corr. 785nm
Time (sec)
Raman shift (cm-1)
Data corr. 675nm
Time (sec)
Raman shift (cm-1)

l
Predicted
0 10 20 30 40
0 10 20 30 40
Nominal n
Raman intensity (a.u.)
0 10 20 30 30
2800 3200 3600 4000
Raman shift ($cm^{-1}$)

FIG. 10n
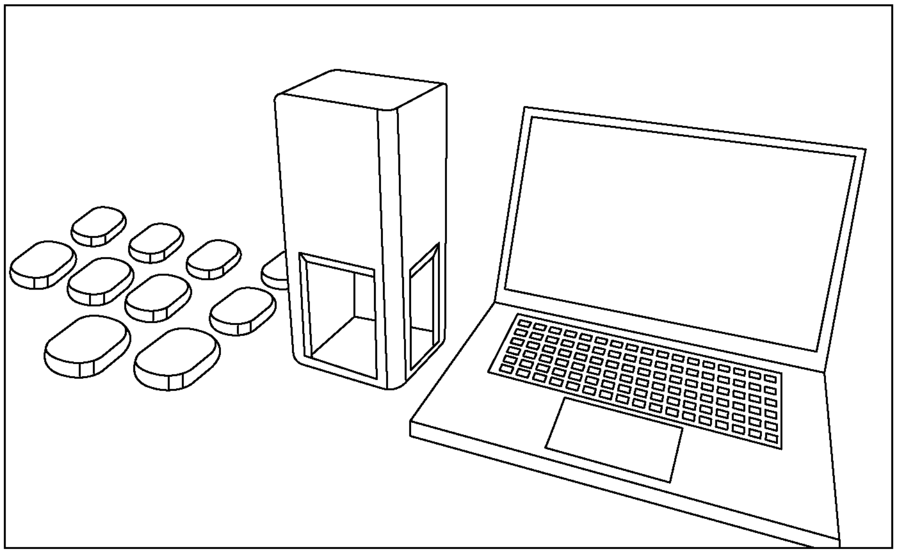
FIG. 10o
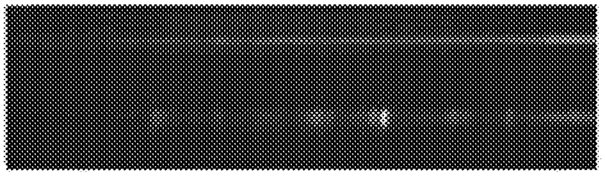
FIG. 10p
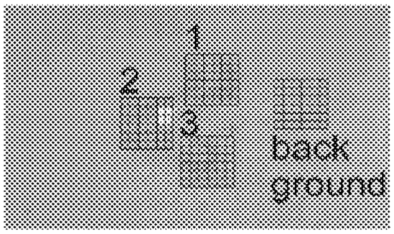
FIG. 10q
| | CaF2 | E. coli 25 | E. coli 35 | MRSE | MSSE | S hom. | S lug. |
|---|---|---|---|---|---|---|---|
| CaF2 | 40 | 0 | 0 | 0 | 0 | 0 | 0 |
| E. coli 25 | 0 | 38 | 0 | 1 | 1 | 0 | 0 |
| E. coli 35 | 0 | 0 | 39 | 0 | 0 | 1 | 0 |
| MRSE | 0 | 0 | 0 | 47 | 0 | 1 | 0 |
| MSSE | 0 | 0 | 0 | 0 | 32 | 0 | 0 |
| S hom. | 0 | 0 | 0 | 0 | 0 | 56 | 0 |
| S lug. | 0 | 0 | 0 | 0 | 0 | 0 | 32 |

Train_data = Raw_data + Random_noise

The Random noise is simple Gaussian noise with different variances, we can expand the data to bigger training sets, however this just a proof-of-concept

Data augmentation is a process of artificially increasing the amount of data by generating new data points from existing data.

Explicit: we add random Gaussian noise to the traces and expand the data set from approx. 38 to approx. 200 traces

FIG. 41a

| Spetrac Transformer | | | | | | | |
|---|---|---|---|---|---|---|---|
| | back CaF2 | Ec 25 | EC 35 | MRSE | MSSE | Homo | Lug |
| back CaF2 | 40 | 0 | 0 | 0 | 0 | 0 | 0 |
| Ec 25 | 0 | 37 | 0 | 2 | 0 | 1 | 0 |
| EC 35 | 0 | 0 | 39 | 0 | 0 | 0 | 1 |
| MRSE | 7 | 0 | 0 | 40 | 0 | 0 | 1 |
| MSSE | 0 | 1 | 0 | 0 | 31 | 0 | 0 |
| Homo | 0 | 0 | 0 | 0 | 0 | 53 | 3 |
| Lug | 0 | 0 | 0 | 0 | 0 | 0 | 32 |
| Accuracy = 100*Diagonal/total | | | | 94,4444 4 | | | |

FIG. 41b

| CNN | ML | | | | | | |
|---|---|---|---|---|---|---|---|
| | back CaF2 | Ec 25 | EC 35 | MRSE | MSSE | Homo | Lug |
| back CaF2 | 40 | 0 | 0 | 0 | 0 | 0 | 0 |
| Ec 25 | 0 | 38 | 0 | 1 | 1 | 0 | 0 |
| EC 35 | 0 | 0 | 39 | 0 | 0 | 1 | 0 |
| MRSE | 0 | 0 | 0 | 47 | 0 | 1 | 0 |
| MSSE | 0 | 0 | 0 | 0 | 32 | 0 | 0 |
| Homo | 0 | 0 | 0 | 0 | 0 | 56 | 0 |
| Lug | 0 | 0 | 0 | 0 | 0 | 0 | 32 |
| Accuracy = 100*Diagonal/total | | | | 98,6111 1 | | | |

FIG. 44

| Parameter | Value |
|---|---|
| RMSECV | 0.511 |
| RMSEP | 0.4411 |
| $R^2$ prediction | 0.998 |
| LOD min | 0.2746 |
| LOD max | 0.7739 |
| LOQ min | 0.8238 |
| LOQ max | 2.3217 |

FIG. 45

| Parameter | Value |
|---|---|
| RMSECV | 0.1 |
| RMSEP | 0.4411 |
| $R^2$ prediction | 1.0 |
| LOD min | 0.0711 |
| LOD max | 0.1607 |
| LOQ min | 0.2134 |
| LOQ max | 0.4822 |

FIG. 46

| pHCA concentration (mM) | 1 | 2 | average | std dev |
|---|---|---|---|---|
| 100 | 47.2105 | 47.2451 | 47.2278 | 0.024466 |
| 500 | 24.4478 | 24.402 | 24.4249 | 0.032385 |
| 250 | 12.546 | 12.5231 | 12.53455 | 0.016193 |
| 125 | 6.278 | 6.2729 | 6.27545 | 0.003606 |
| 62.5 | 3.10259 | 3.102102 | 3.102346 | 0.000345 |
| 31.25 | 1.6234 | 1.6227 | 1.62305 | 0.000495 |

FIG. 47

| g/L | Intensity | Intensity | Intensity |
|---|---|---|---|
| 50 | 102 | 103 | 105 |
| 25 | 56 | 55.5 | 56 |
| 12.5 | 28 | 29 | 28.5 |
| 6.25 | 16 | 17 | 16.8 |
| 1 | 5 | 5.8 | 5.3 |

FIG. 48

| | |
|---|---|
| RMSECV | 8.7 |
| RMSEP | 4.0475 |
| R2 pred | 0.9931 |
| LOD min | 2.9842 |
| LOD max | 6.875 |
| LOQ min | 8.9527 |
| LOQ max | 20.6251 |

APPARATUS FOR CARRYING OUT SPECTROSCOPY

BACKGROUND OF THE INVENTION

Field of the Invention

The present disclosure relates to an apparatus for carrying out spectroscopy.

Related Art

Spectroscopy is a useful tool to examine a sample. Spectroscopy, such as Raman spectroscopy, is also very useful to identify a sample based on a sample's spectral fingerprint or to determine a chemical composition of the sample based on the components' spectral fingerprints. The discovery of the Raman effect in 1928 has aided to the fundamental understanding of the quantum nature of light and matter interaction, and has also opened up completely novel areas of optics and spectroscopic research that has accelerated greatly during the last decade. The utility of Raman spectroscopy has been demonstrated for a diverse range of biological, biomedical and chemical applications, such as chemical imaging of living cells and tissues, stem cell and cancer research, bacterial identification, chemical hazards and illicit substances detection, as well as food and product authentication, and with a great deal of interest and research into its potential for disease diagnosis in the laboratory and in-vivo.

Raman spectroscopy has been developed into a variety of methods and experimental realizations, such as confocal Raman microscopy, Raman endoscopy, spatially offset Raman spectroscopy (SORS), resonance Raman spectroscopy, and surface enhanced Raman spectroscopy (SERS). The listed Raman spectroscopy and microscopy methods are non-destructive, label-free, non-invasive, and capable of providing 3D molecular sensing with depth profiling. Such capabilities, however, come at the cost of extremely high requirements for instrumentation, such as the used laser should have stable wavelength and stable high optical power, and the spectroscopic sensor should have low noise. Therefore, Raman spectroscopy and microscopy applications that require high spectral resolution and sensitivity would normally need to be performed on high-end, bulky, and costly Raman instruments. The need for miniaturization of Raman instrumentation is driven by applications where the complexity and/or the bulkiness of existing devices is obstructive. Application examples in need of miniaturization include space exploration, on-site toxic substance inspection, in-vivo diagnostics of tissues, chemical identification in hardly accessible places using robots and drones, and Raman device integration into robotic arms for biomedical applications.

Systems and methods for carrying out Raman spectroscopy are described in US 2021072158 A1, the entire contents of which are incorporated herein by reference.

It is an object of the present disclosure to provide an improved apparatus for carrying out spectroscopy, in particular Raman spectroscopy.

SUMMARY

In one aspect, the present disclosure relates to an apparatus for carrying out spectroscopy, in particular Raman spectroscopy, on a sample, the apparatus including an optical system which is configured to guide a first portion of a laser beam to a sample and a second portion of the laser beam to a reference sample, wherein a first spectrum beam is generated from an interaction between the first portion of the laser beam and the sample and a second spectrum beam is generated from an interaction between the second portion of the laser beam and the reference sample, the optical system being configured to guide the first spectrum beam and the second spectrum beam to a diffraction element, such as a grating, wherein the diffraction element is configured to split the first spectrum beam into a first spectrum of spatially separated wavelength components associated with the sample and to split the second spectrum beam into a second spectrum of spatially separated wavelength components associated with the reference sample;

the apparatus comprising a detector with an array of pixels for detecting the first and second spectrum on the array of pixels;

wherein the sample and the reference sample are placed in different positions in the optical system; and wherein the optical system includes a beam blocker arranged between the sample and the reference sample and configured to prevent at least one of the following: that light propagates from the reference sample to the sample and that light propagates from the sample to the reference sample.

In one aspect, the present disclosure relates to an apparatus for carrying out spectroscopy, in particular Raman spectroscopy, on a sample, the apparatus including an optical system which is configured to guide a first portion of a laser beam to a sample and a second portion of the laser beam to a reference sample;

wherein a first spectrum beam is generated from an interaction between the first portion of the laser beam and the sample and a second spectrum beam is generated from an interaction between the second portion of the laser beam and the reference sample;

the optical system being configured to guide the first spectrum beam and the second spectrum beam to a diffraction element, such as a grating; the diffraction element being configured to split the first spectrum beam into a first spectrum of spatially separated wavelength components associated with the sample and to split the second spectrum beam into a second spectrum of spatially separated wavelength components associated with the reference sample;

the apparatus including a detector with an array of pixels for detecting the first and second spectrum on the array of pixels;

wherein the sample and the reference sample are placed in different positions in the optical system; and wherein the optical system includes an optical filter having a surface facing the grating and a surface facing at least one of the sample and the reference sample, the optical filter being reflective for the first laser beam and the second laser beam and transmissive for the first and second spectrum beam, wherein the reference sample is arranged on one of the surfaces of the optical filter;

wherein the optical system is configured to guide the first laser beam such that it is reflected from the optical filter and incident on the sample, wherein the first laser beam is bypassing the reference sample;

wherein the optical system includes an optical slit through which the first and second spectrum beam are guided by the optical system, wherein the optical slit is formed by a separate optical element between the optical filter and the grating, and wherein the optical element forming the optical slit is movable such that the optical slit can be aligned in at least one direction in a plane perpendicular to an optical axis of the optical system.

BRIEF DESCRIPTION OF THE DRAWINGS

The following detailed description, given by way of example, but not intended to limit the invention solely to the specific embodiments described, may best be understood in conjunction with the accompanying drawings, incorporated herein by reference, wherein.

laser stability experiment versus time that represents raw Raman spectra variation of polystyrene in the reference channel under laser excitation wavelength of 785 nm.

Figure 7A:
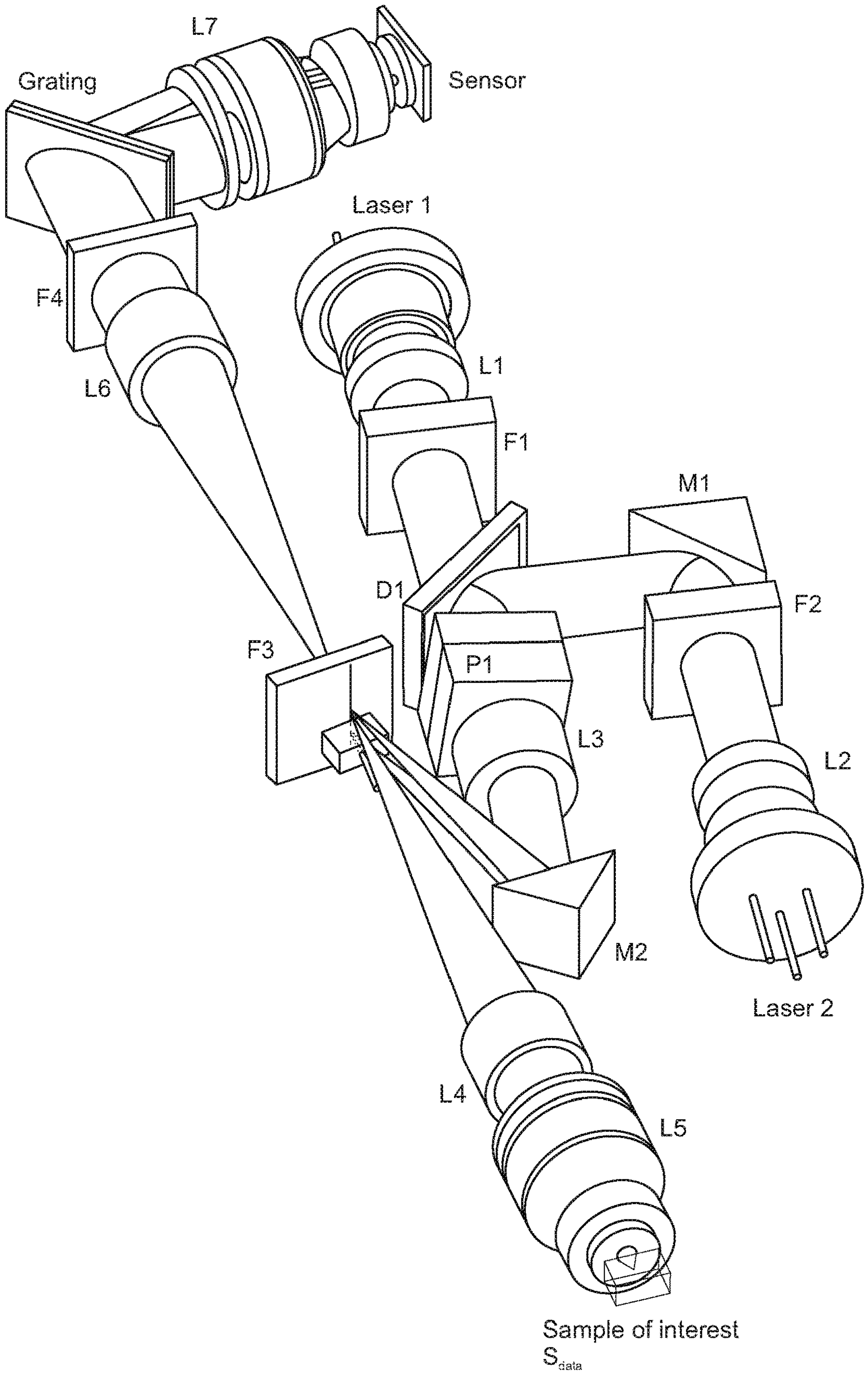
FIG. 7*a* shows an optical scheme of miniaturized Raman system.
Figure 7B:
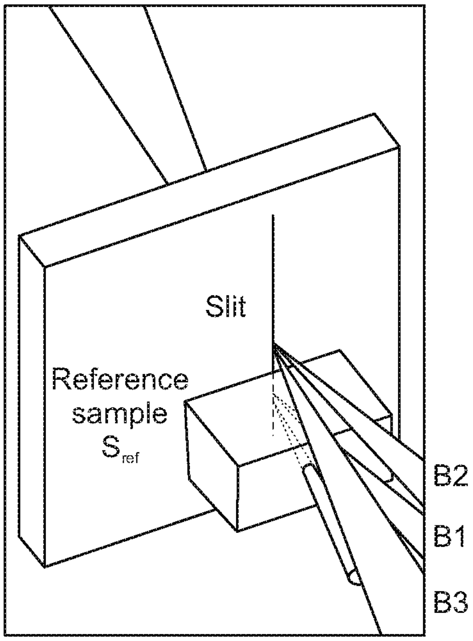
FIG. 7*b* shows a reference sample on filter/slit.
Figure 7C:
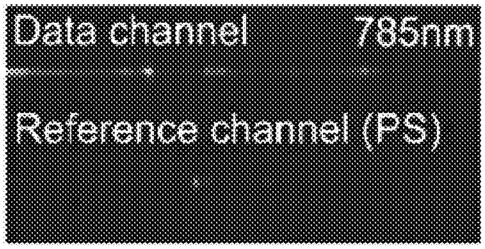
FIGS. 7*c*-7*d* show a CMOS sensor image that demonstrates simultaneous acquisition of main and reference Raman signals from laser excitation at 785 nm and 675 nm, respectively.
Figure 7D:
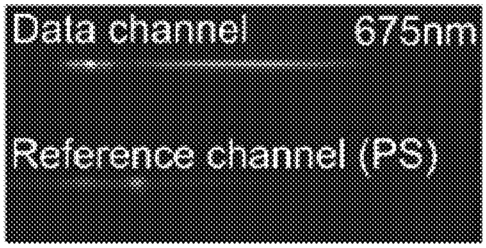
Figure 7E:
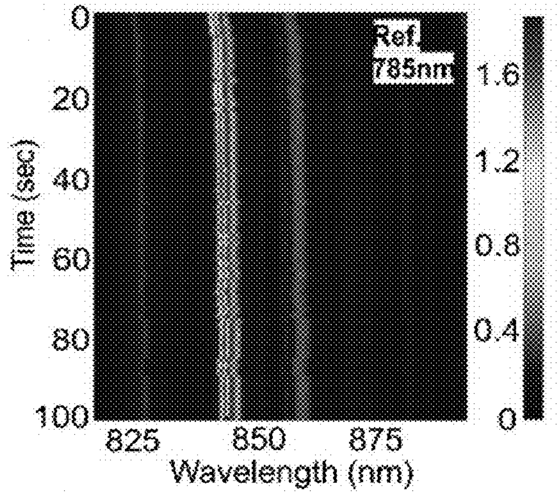
FIGS. 7*e*-7*f* show CMOS images represent Raman spectrum of water-ethanol solution (60:40) in the main channel and Raman spectrum of polystyrene in the reference channel, e), f), h), i)
Figure 7H:
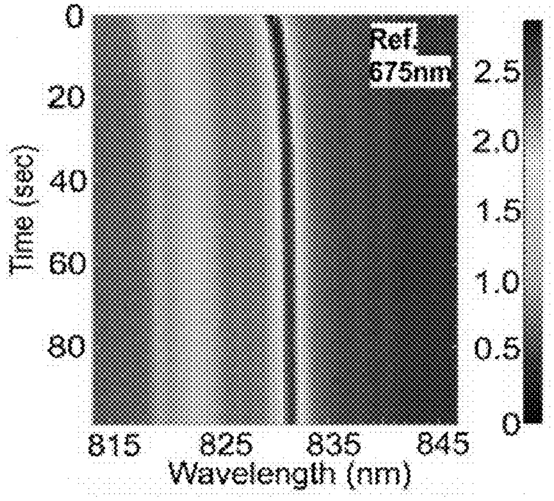
Figure 7F:
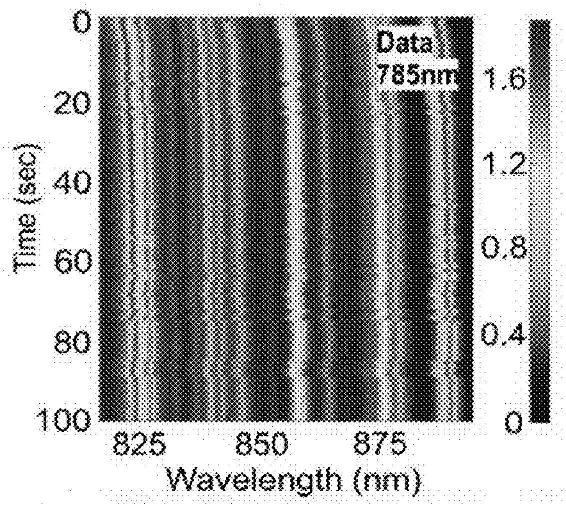
Figure 7I:
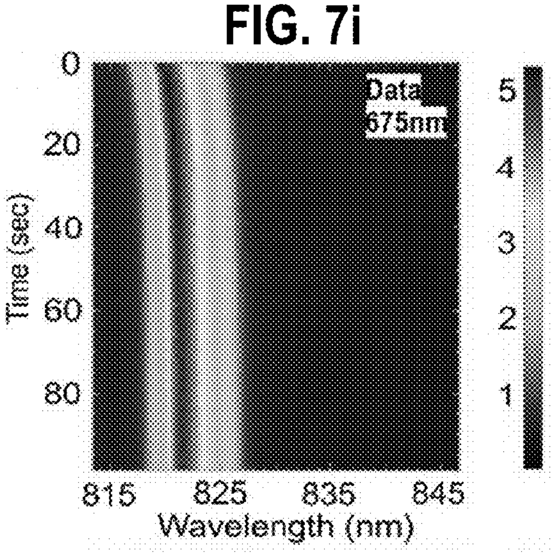

FIGS. 7*h*-7*i* show CMOS images represent Raman spectrum of water-ethanol solution (60:40) in the main channel and Raman spectrum of polystyrene in the reference channel, e), f), h), i) laser stability experiment versus time that represents raw Raman spectra variation of polystyrene in the reference channel under laser excitation wavelength of 675 nm.

Figure 7G:
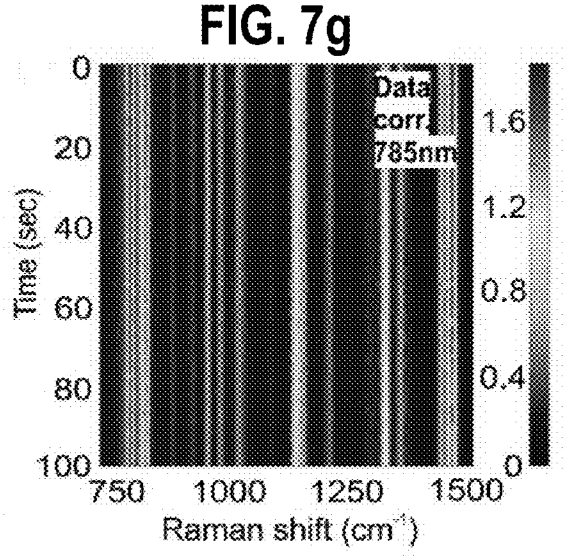
Figure 7J:
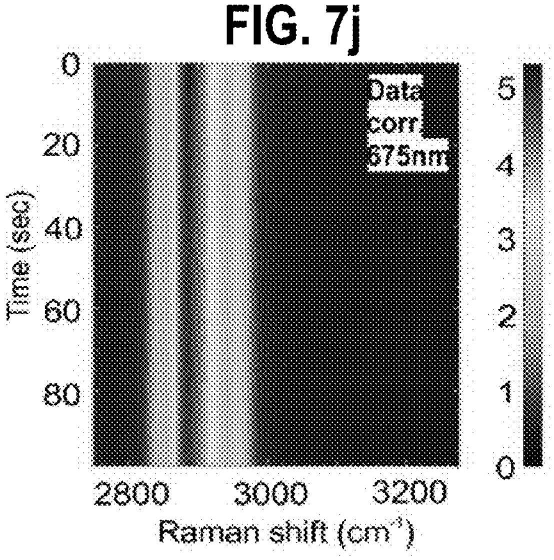

FIGS. 7*g* and 7*j* show Raman spectra of polypropylene in the main channel versus time under laser excitation wavelength 785 nm and 675 nm, respectively after real-time (i) Raman shift, (ii) Raman intensity calibrations, (iii) anti "mode hop" deconvolution and (iv) spectrum deblurring being applied.

Figure 7K:
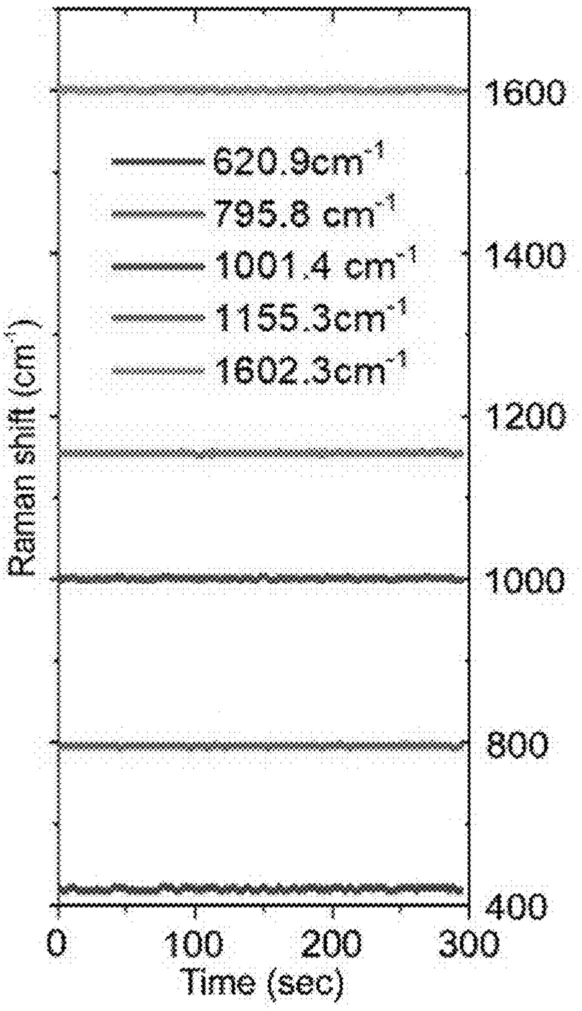
Figure 7L:
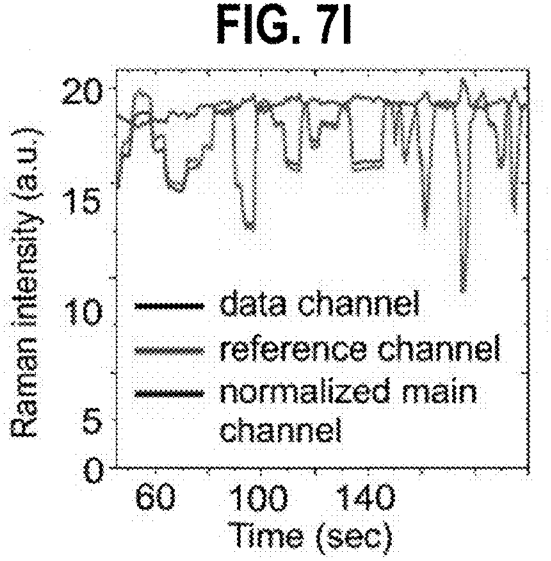

FIGS. 7*k*-7*l* show a time dependent experiment of polystyrene sample placed in the main channel that demonstrates long time calibration stability of the Raman shift and Raman intensity, respectively.

Figure 7M:
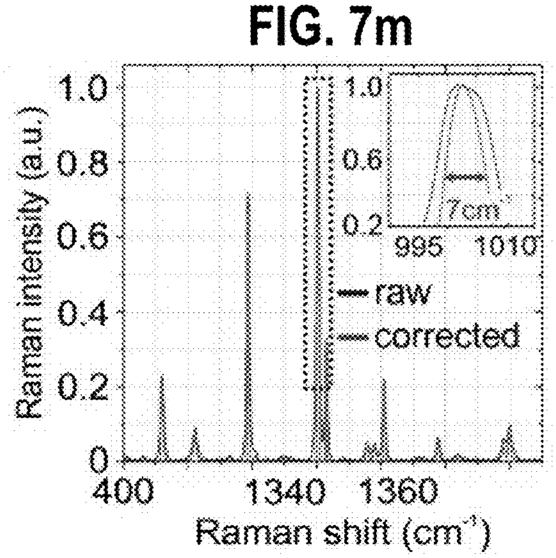

FIG. 7*m* shows a Raman spectrum of toluene before (black curve) and after (red curve) multiple preprocessing procedures being applied.

Figure 7N:
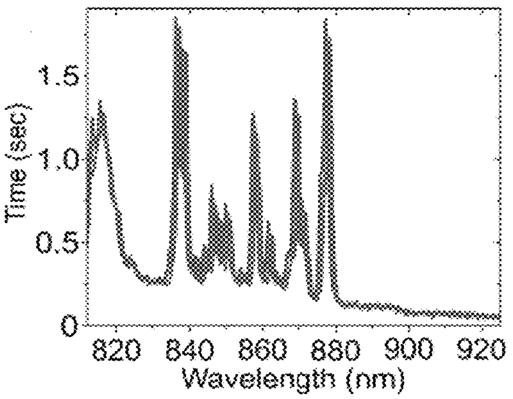
Figure 7O:
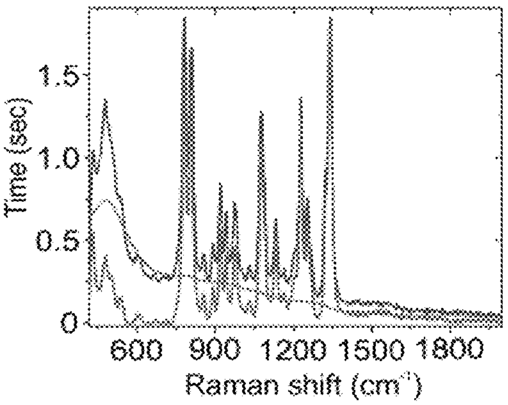
Figure 7P:
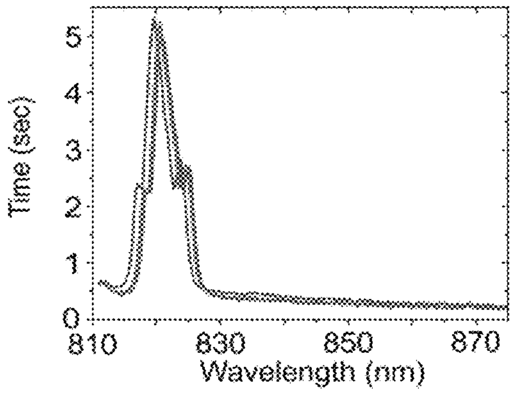

FIGS. 7*n* and 7*p* show three Raman spectra of polypropylene at different time points under a laser excitation wavelength of 785 nm and 675 nm, respectively.

Figure 7Q:
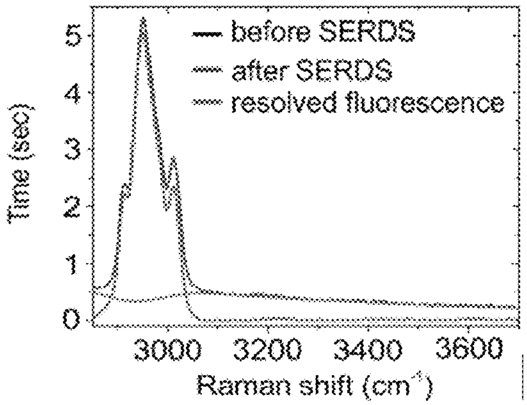

FIGS. 7*o* and 7*q* show Raman spectra of polypropylene before (black curve) and after SERDS correction (red curve) under laser excitation wavelength of 785 nm and 675 nm, respectively.

Figure 8A:
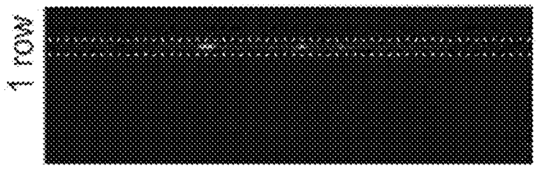
Figure 8B:
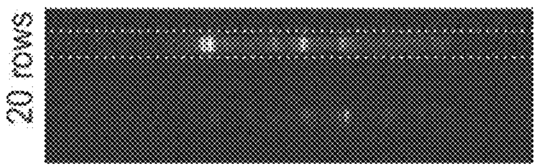

FIG. 8*a*-8*b* show images on CMOS sensor of the SERS spectrum of BPE deposited on nano pillars based SERS substrate at a concentration of 100 μM; signal measured a laser spot size on the sample of 10 μm and 100 μm, respectively.

Figure 8C:
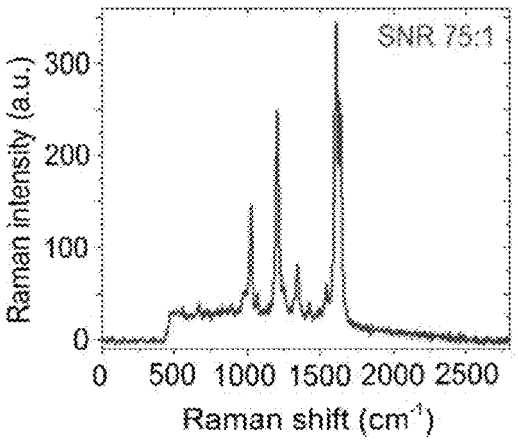

FIG. 8*c* shows an SERS spectrum of BPE obtained after the averaging of 3 rows on CMOS image in FIG. 7*a*.

Figure 8D:
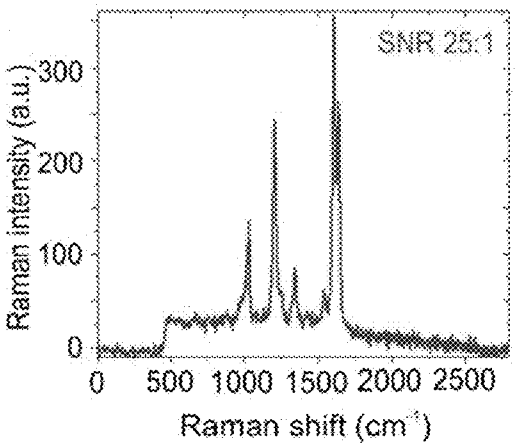

FIG. 8*d* shows an SERS spectrum of BPE obtained after the averaging of 20 rows on CMOS image in FIG. 7*b*.

Figure 8E:

FIG. 8*e* is an illustration of dynamic QE variation of pixels on CMOS sensor.

Figure 8F:
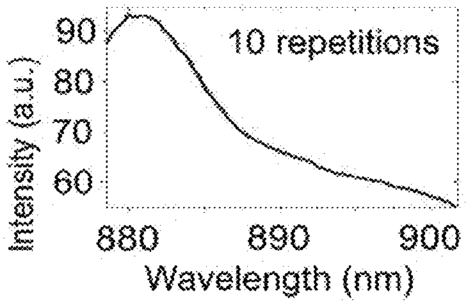
Figure 8G:
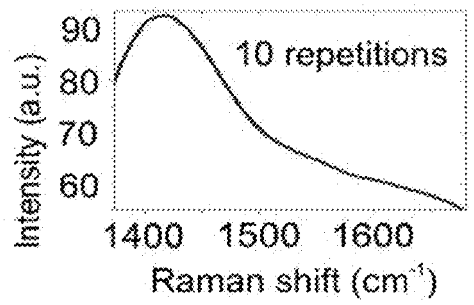

FIGS. 8*f*-8*g* show fluorescence spectrum from glass cover slide excited by laser with excitation wavelength 785 nm obtained after averaging of 10 repetitions without pixel averaging method and with pixel averaging method, respectively, demonstrating improved SNR ratio.

Figure 8H:

FIG. 8*h* shows a SORS-like sample illumination layout with off-axis laser beam delivery and on-axis Raman beam collection that serves dual purpose: avoiding back reflections to diode laser and minimization of fluorescence impact on the out of focus signals.

Figure 8I:
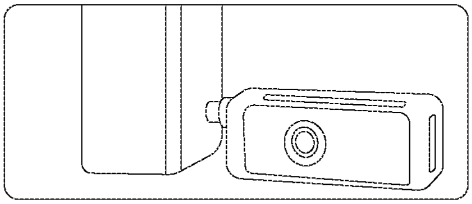

FIG. 8*i* shows a photograph of miniaturized Raman spectrometer measuring whiskey content through the glass bottle.

Figure 8J:
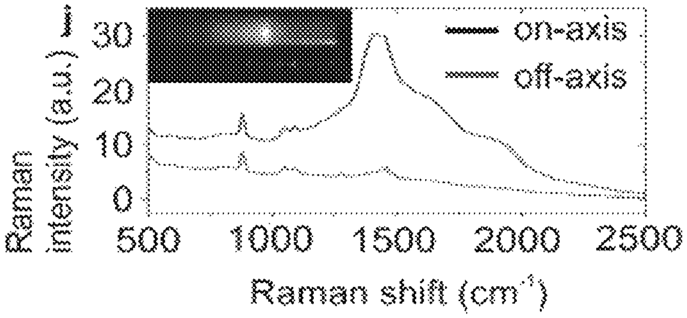

FIG. 8*j* shows a Raman spectrum of whiskey measured by miniaturized Raman system through the glass bottle with on-axis (black curve) and off-axis (red curve) laser beam delivery that demonstrates SORS benefit to avoid the contribution of fluorescence from glass bottle (upper right image is a screen shot from CMOS sensor in the case of off-axis laser beam delivery).

Figure 8K:
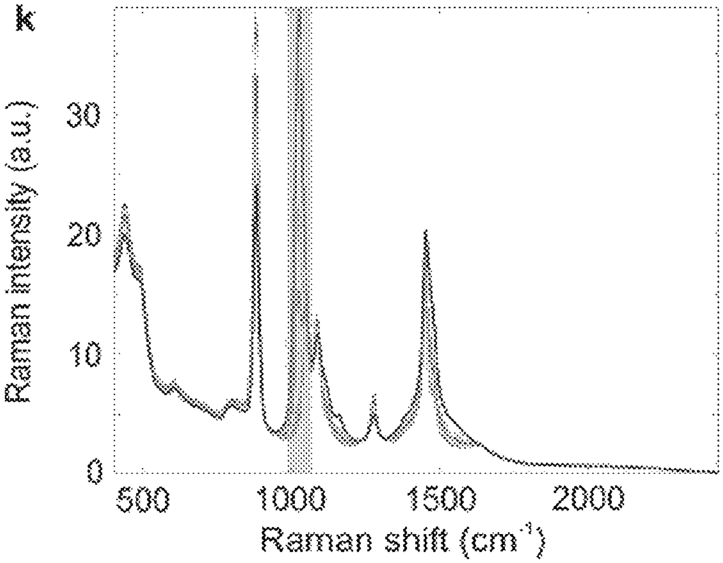
Figure 8L:
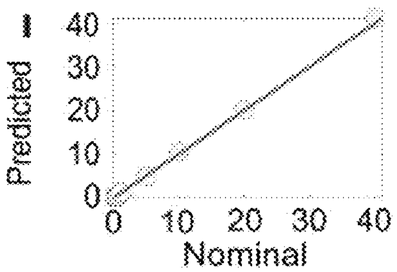
Figure 8M:
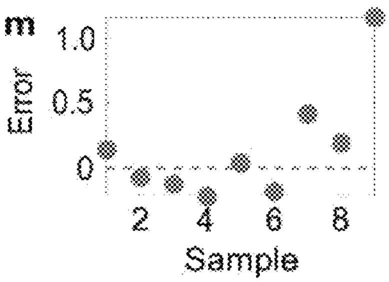
Figure 8N:
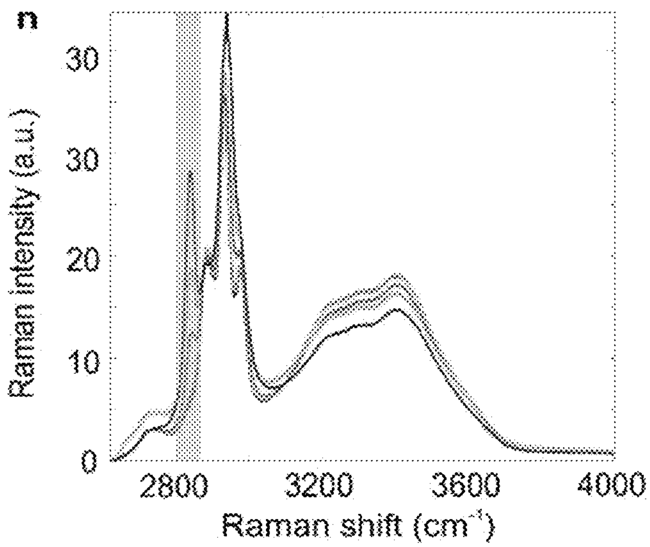

FIGS. 8*k* and 8*n* show Raman spectra of water-ethanol solution (40% of ethanol) with different concentrations of methanol (variation between 0-40%) in the range 400-2300 $cm^{-1}$ and 2750-4000 $cm^{-1}$, respectively.

FIGS. 8*i* and 8*m* show result of PLS calibration for methanol quantification based on the Raman data in the range 400-2300 $cm^{-1}$.

FIG. 8*l* shows result of PLS calibration for methanol quantification.

Figure 8O:
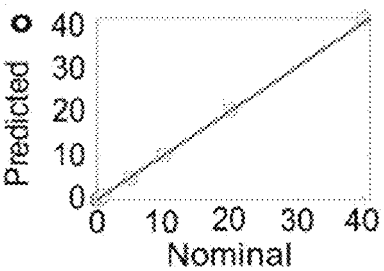
Figure 8P:
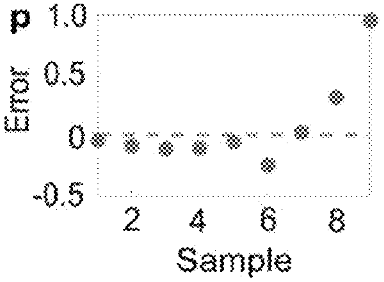

FIGS. 8*o* and 8*p* result of PLS calibration for methanol quantification based on the Raman data in the range 2750-4000 cm−1.

Figure 9A:
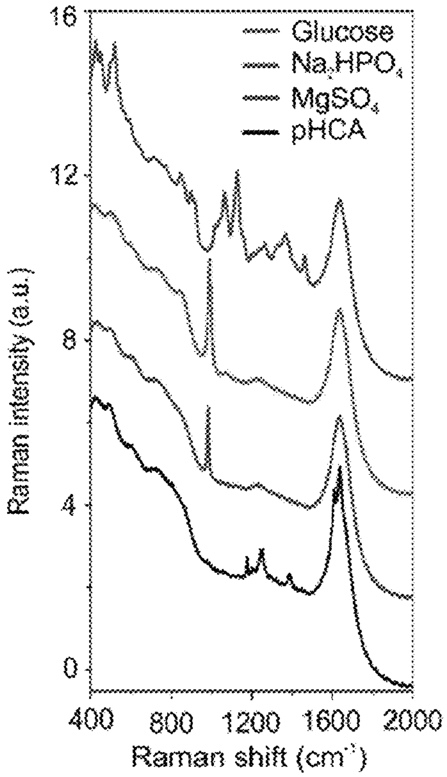

FIG. 9*a* shows Raman spectra of the main components contributing to the Raman signal of bacterial supernatant.

Figure 9B:
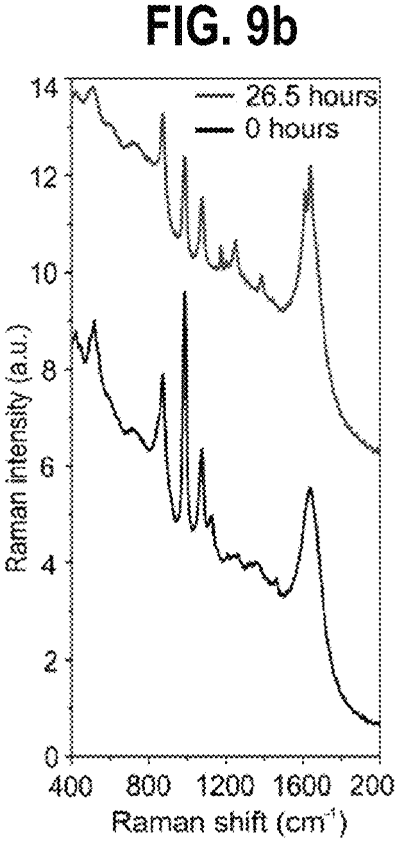

FIG. 9*b* shows a Raman signal of bacterial supernatant at 0 and 26.5 hours of culture.

Figure 9C:
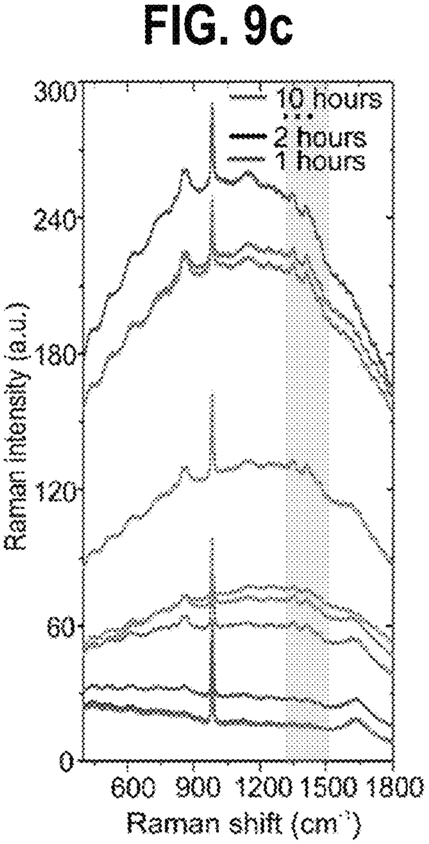

FIG. 9*c* shows Raman spectra of bacterial supernatant containing Serine at 0 to 10 hours of culture collected with step of 1 hour; pink band indicates spectral region with prominent Serine peaks.

Figure 9D:
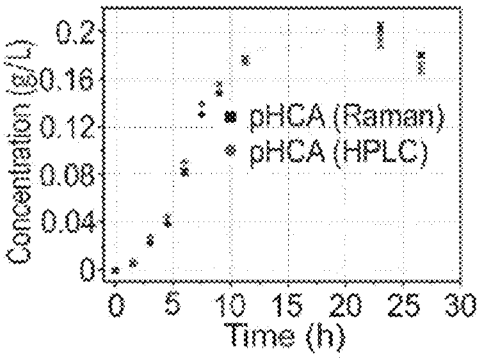
Figure 9E:
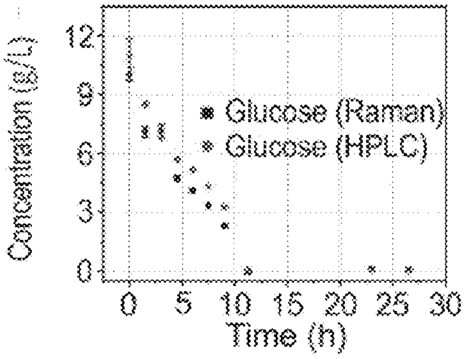
Figure 9F:
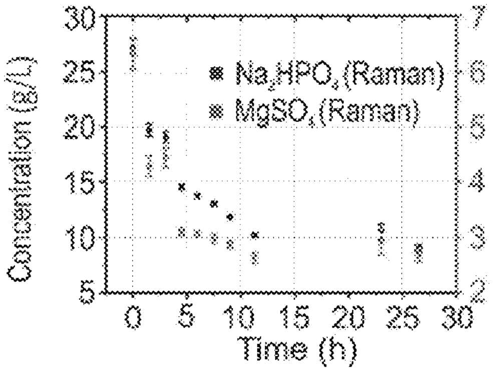

FIGS. 9*d*-9*f* show Raman and HPLC quantification of pHCA, glucose, and MgSO4/Na2HPO4, respectively, in bacterial supernatant (each Raman point is the average of triplicate acquisitions, whereas each HPLC point is the result of duplicate injections.

Figure 9G:
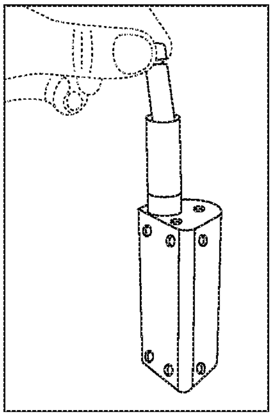

FIG. 9*g* is a photograph of miniaturized Raman spectrometer during measurements of fermentation samples.

Figure 9H:
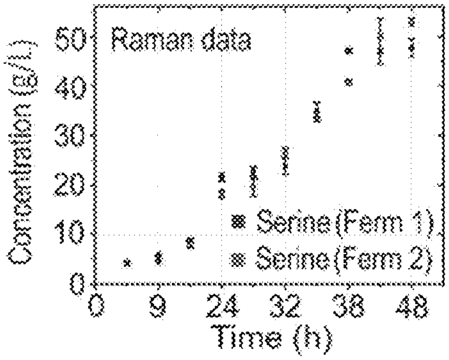
Figure 9I:
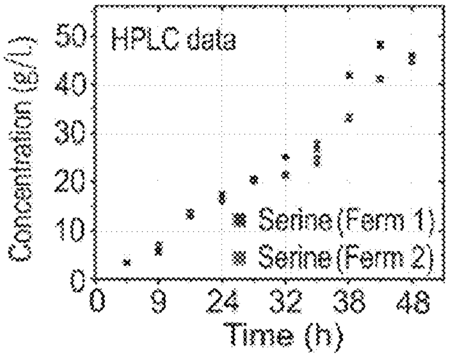

FIGS. 9*h* and 9*i* show Raman and HPLC quantification of Serine in bacterial supernatant (each Raman and HPLC point is the average of triplicate acquisitions and injections, respectively).

Figure 9J:
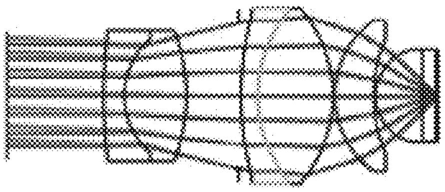

FIG. 9*j* shows optical schema of the Raman probe with high NA (0.95) developed for in-vivo skin measurements.

Figure 9K:
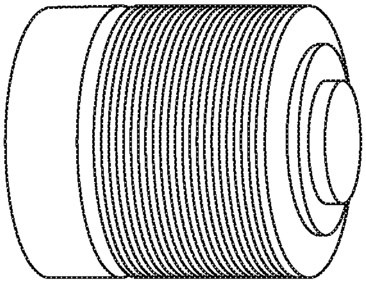

FIG. 9*k* shows a photograph of "skin probe."

Figure 9L:
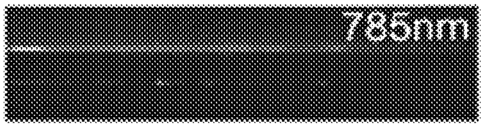
Figure 9M:
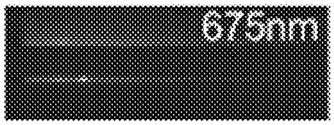

FIGS. 9*l*-9*m* show CMOS images of the measurement process of skin in-vivo, demonstrating sharp focusing of the Raman signal in the vertical dimension of the sensor under laser excitation wavelength of 785 nm and 675 nm, respectively.

FIGS. 9*n*-9*s* show Raman spectra of normal skin collected at the depth of 10-20 μm under a laser excitation wavelength of 785 nm (FIGS. 9*n*, 9*p*, and 9*r*) and 675 nm (FIGS. 9*o*, 9*q*, and 9*s*); pink bands indicate spectral regions of CH and OH peaks; Raman spectra were collected on finger (FIGS. 9*n* and 9*o*), hand (FIGS. 9*p* and 9*q*) and cheek (FIGS. 9*r* and 9*s*); spectrum color represents different probe locations over the skin area around 1 $cm^2$.

Figure 10A:
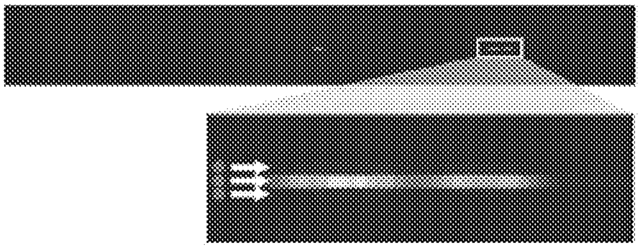

FIG. 10*a* shows an image from the CMOS sensor of the SERS signal of BPE; the zoomed region shows that the spectrum is compressed into one row on the sensor.

Figure 10B:
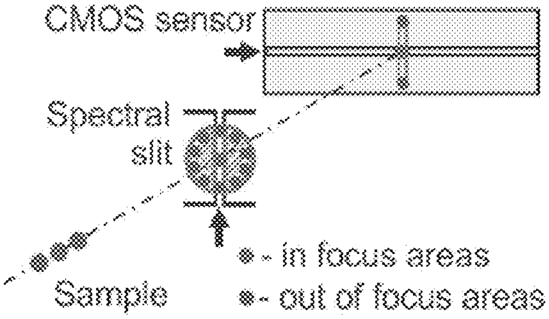

FIG. 10*b* is an illustration of the cross slit design of miniaturized Raman spectrometer that is capable for confocal measurements.

Figure 10C:
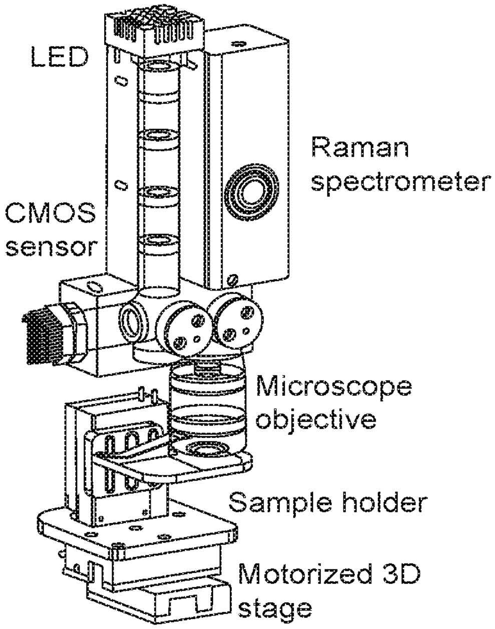

FIG. 10*c* shows an optomechanical design of miniaturized Raman microscope based on miniaturized Raman spectrometer.

Figure 10D:
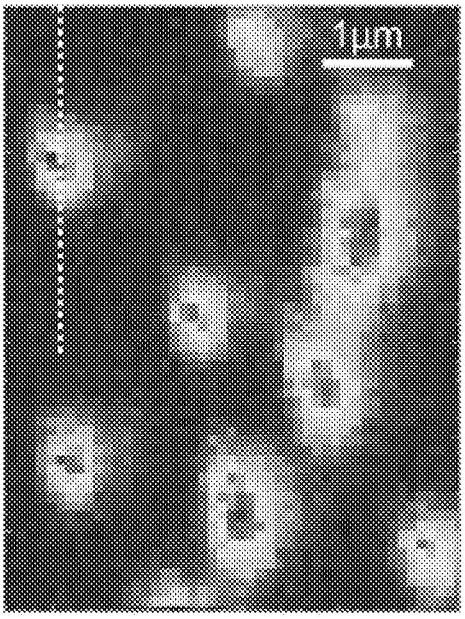

FIG. 10*d* shows a Raman microscopy image of polystyrene beads at the size of 1 μm obtained with Zeiss objective 100×, NA=0.95.

Figure 10E:
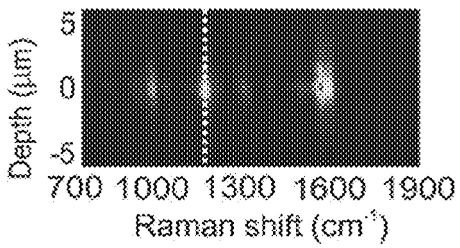

FIG. 10*e* shows a depth scan by a miniaturized Raman microscope (equipped with Zeiss objective 100×, NA=0.95) through the surface of SERS substrate with BPE analyte at concentration 100 μM.

Figure 10F:
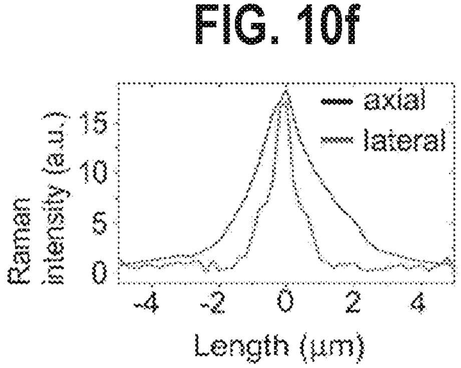

FIG. 10*f* shows axial (black curve) and lateral intensity distribution of Raman signal as a function of sample displacement (dotted white lines in FIG. 10*d*-10*e* indicate areas used for plotted axial and lateral intensity profiles).

Figure 10G:
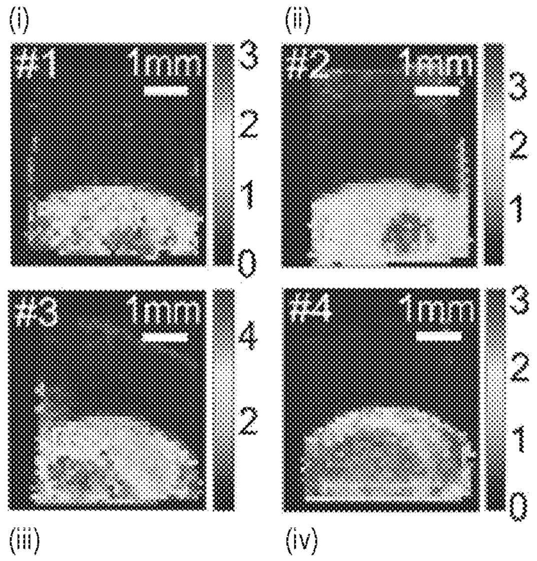

FIG. 10g(i)-(iv) show SERS maps of MTX deposited on silver coated NP SERS substrates at concentration of 25 μM.

Figure 10H:
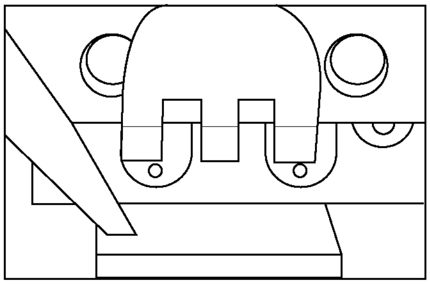
Figure 10I:
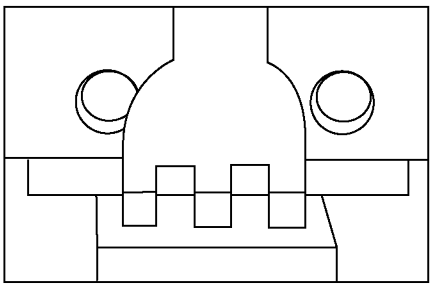

FIG. 10*h*-10*i* show photographs demonstrating the process of analyte deposition.

Figure 10J:
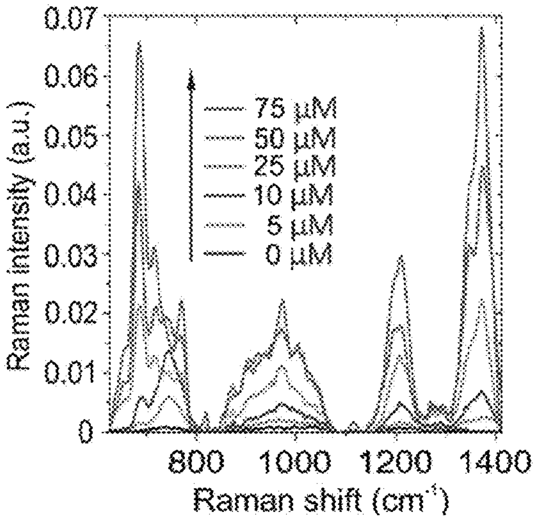

FIG. 10*j* shows SERS spectra of MTX at different concentrations (0-75 μM) obtained after the averaging of SERS signals collected by mapping of the SERS chip.

Figure 10K:
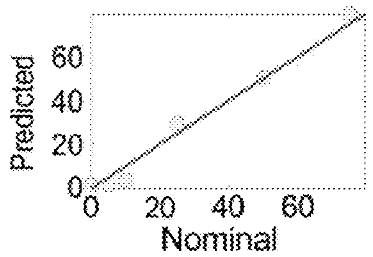
Figure 10L:
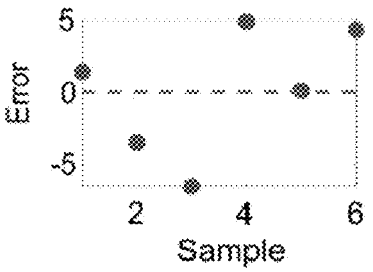

FIGS. 10*k*-10*l* show results result of PLS calibration for MTX quantification.

Figure 10M:
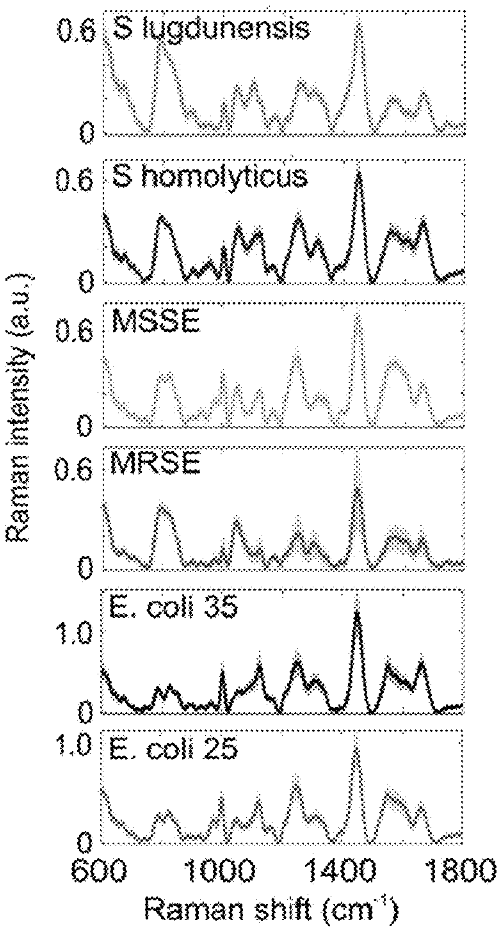

FIG. 10*m* show Raman spectra of different bacteria obtained after the averaging of the Raman signal from Raman maps.

FIG. 10*n* shows a photograph of miniaturized Raman microscope during Raman mapping of bacteria samples on CaF2 cover glass.

FIG. 10*o* shows a CMOS image of the measurement process of bacteria demonstrating sharp focusing of Raman signal in vertical dimension of the sensor under a laser excitation wavelength of 785 nm.

FIG. 10*p* shows a microscopy image of bacteria deposited on CaF2 cover glass with areas selected for Raman mapping of bacteria (areas 1-3) and Raman mapping of cover glass background (areas 4).

FIG. 10*q* shows a confusion matrix of bacteria identification built as a result of machine learning data analysis of Raman maps of bacteria.

Figure 11A:
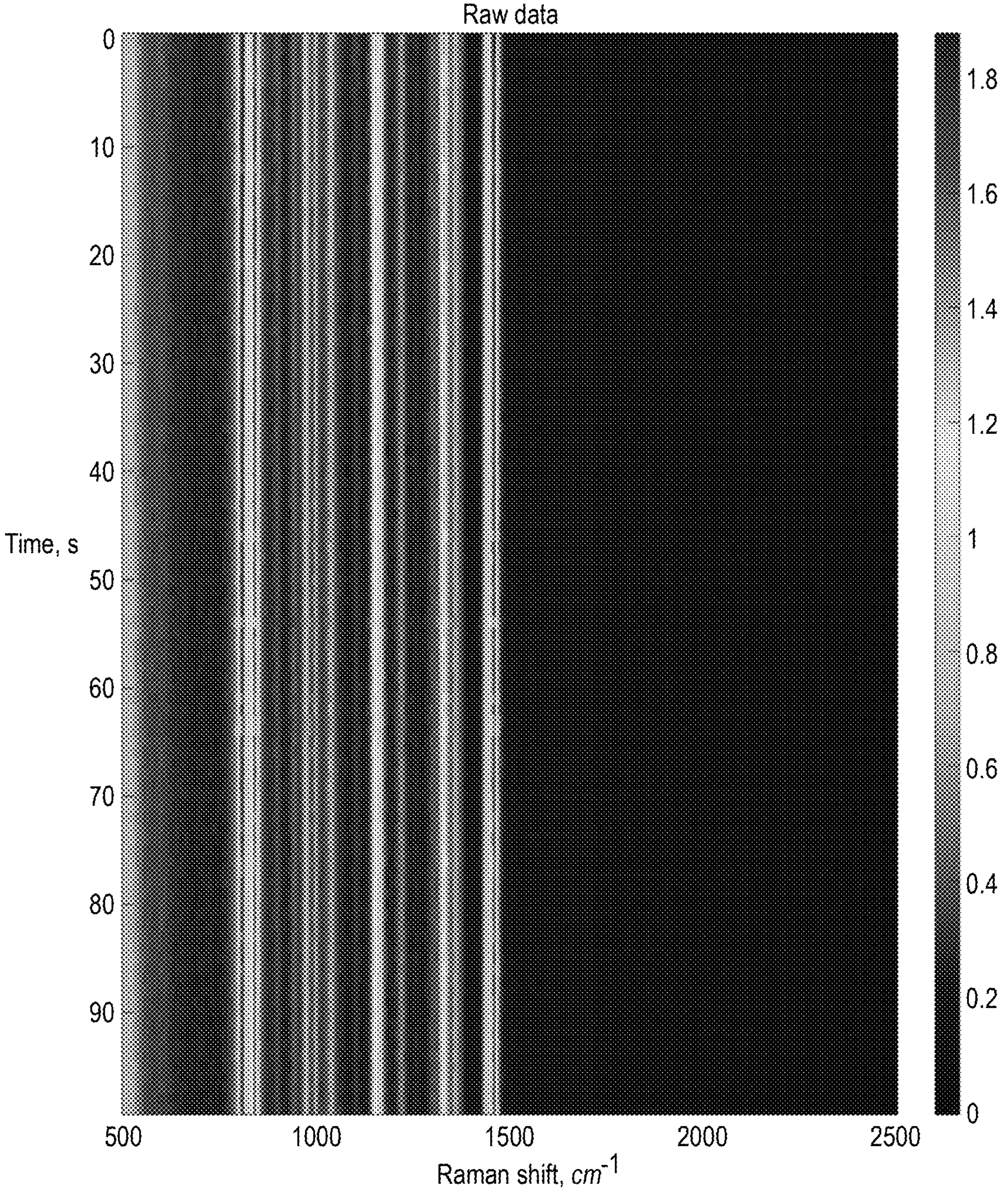
Figure 11B:
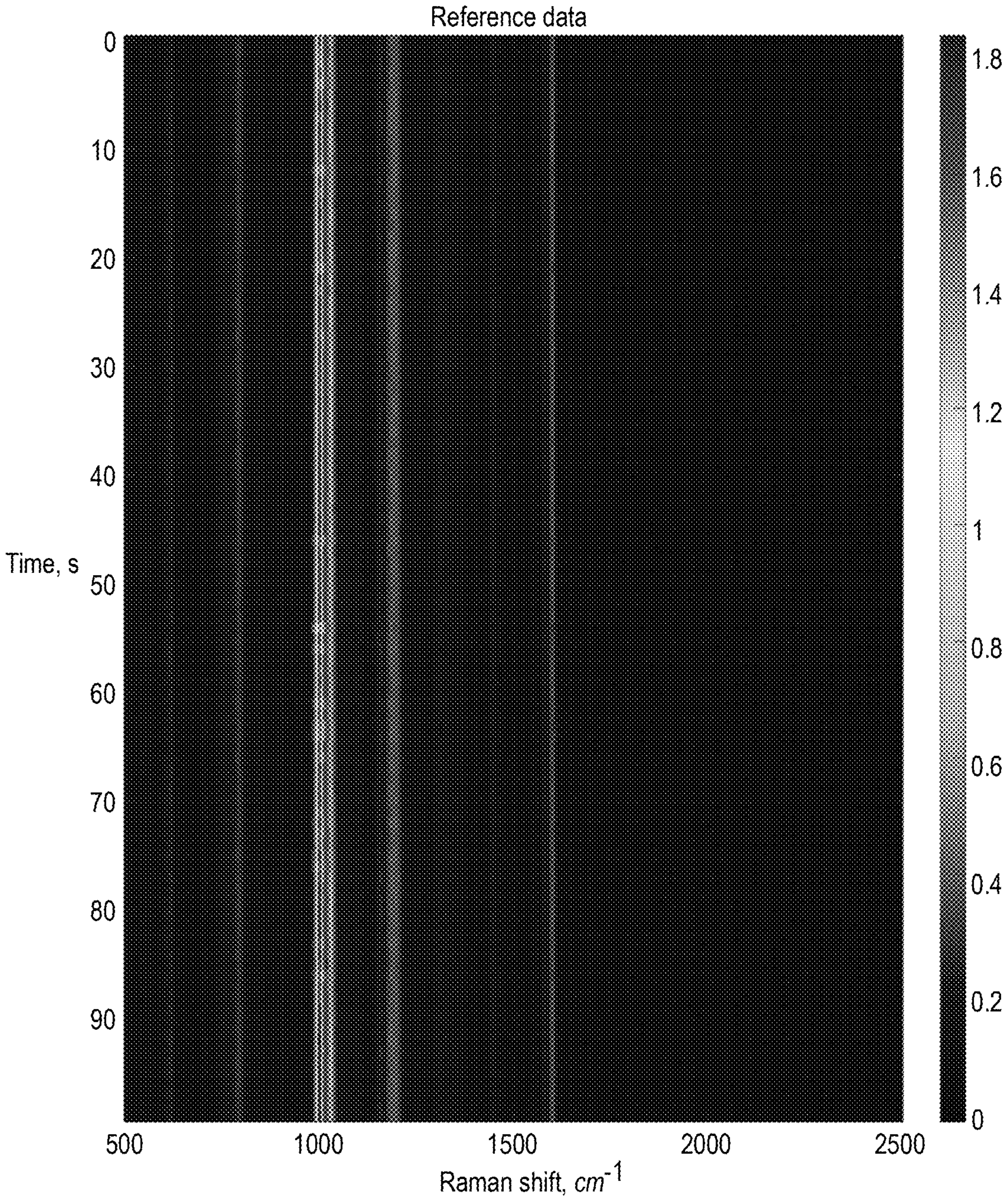

FIGS. 11*a*-11*b* show raw data and reference spectra.

Figure 12:
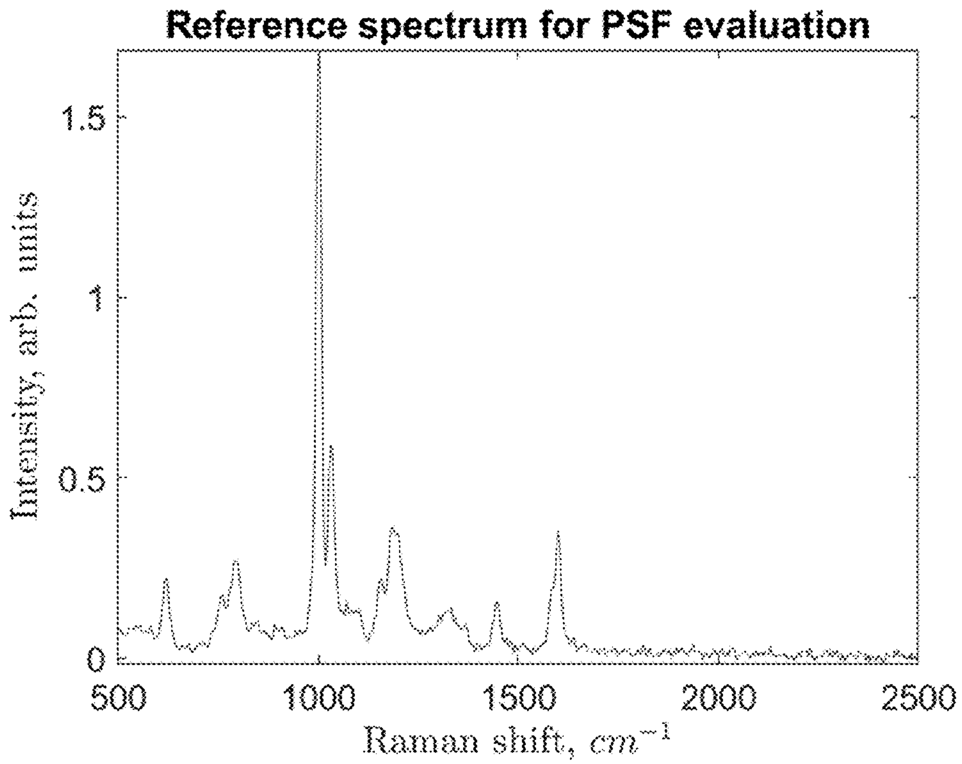

FIG. 12 shows reference channel spectrum used as ideal.

Figure 13:
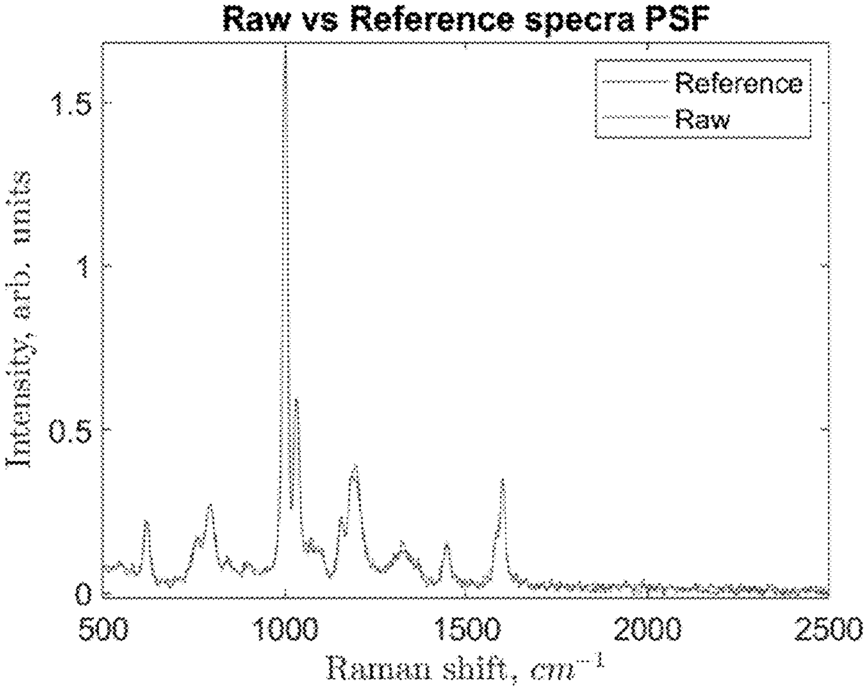

FIG. 13 shows raw and ideal reference channel spectra.

Figure 14:
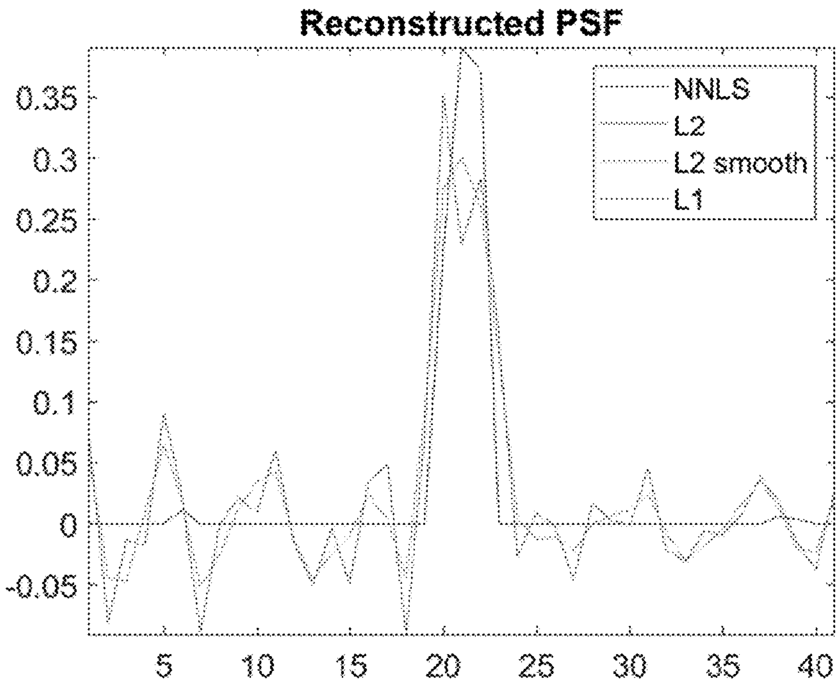
Figure 15A:
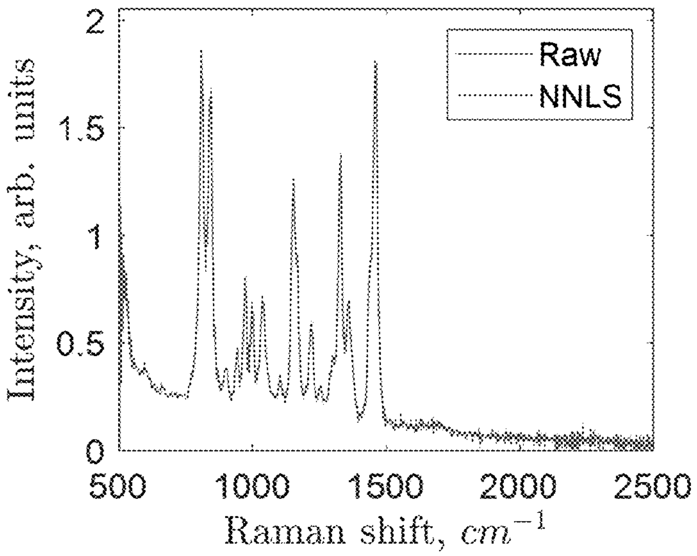
Figure 15B:
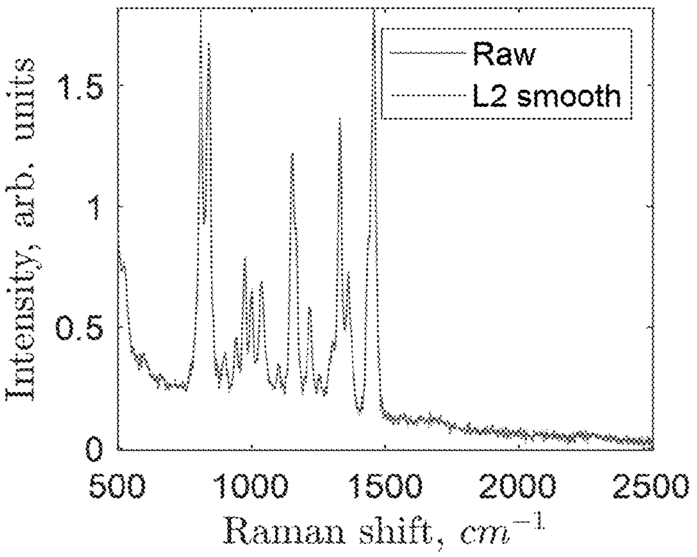
Figure 15C:
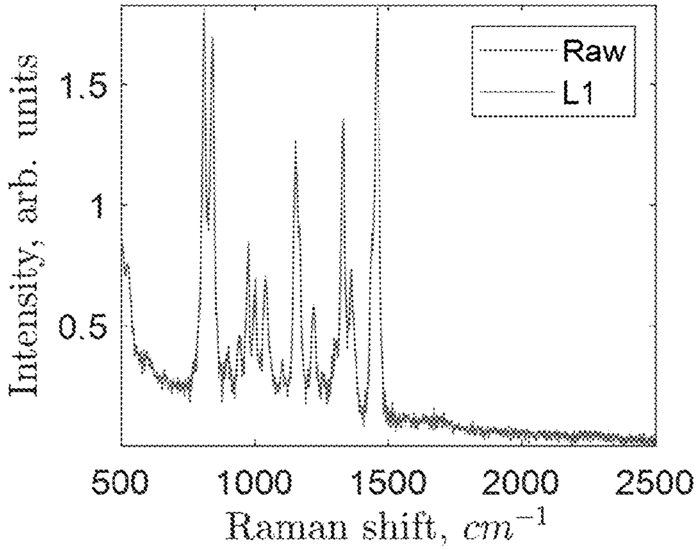
Figure 15D:
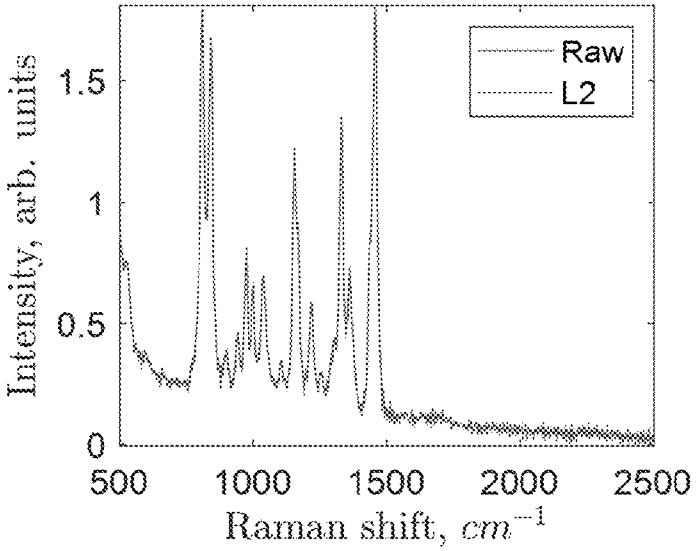
Figure 16A:
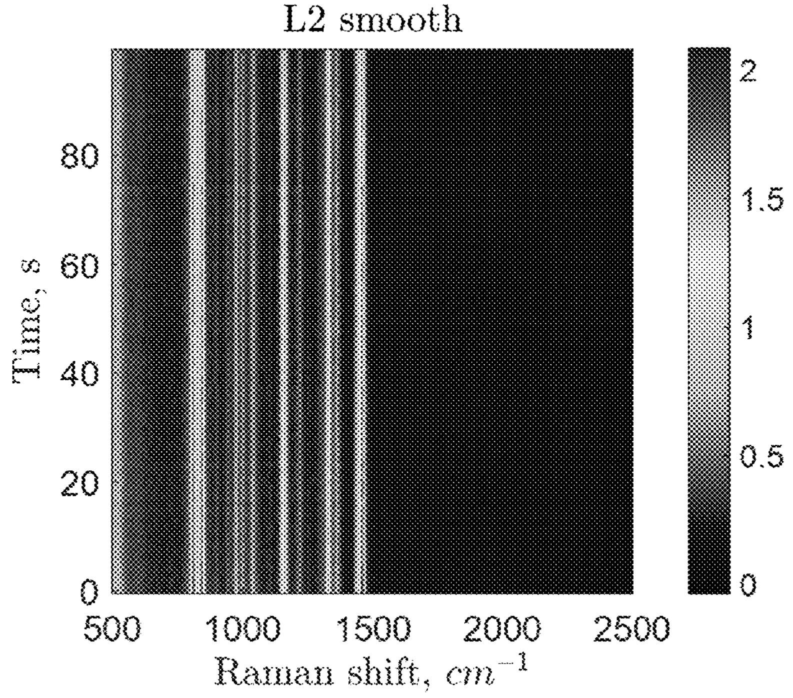
Figure 16B:
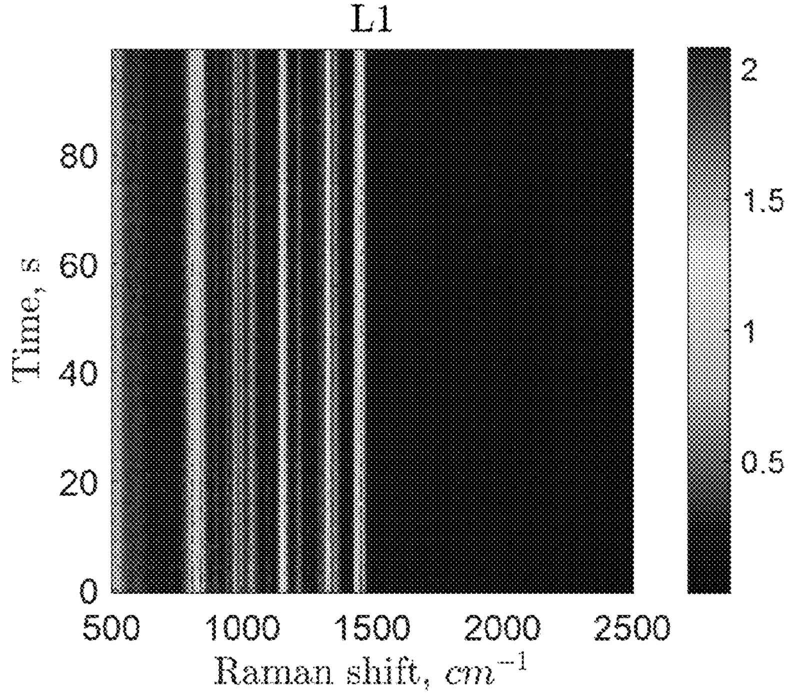
Figure 16C:
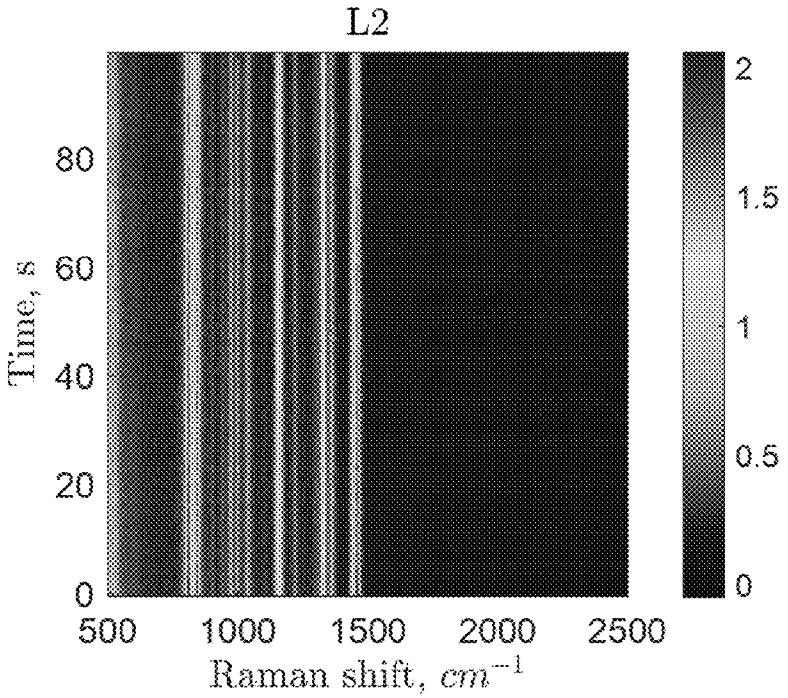
Figure 16D:
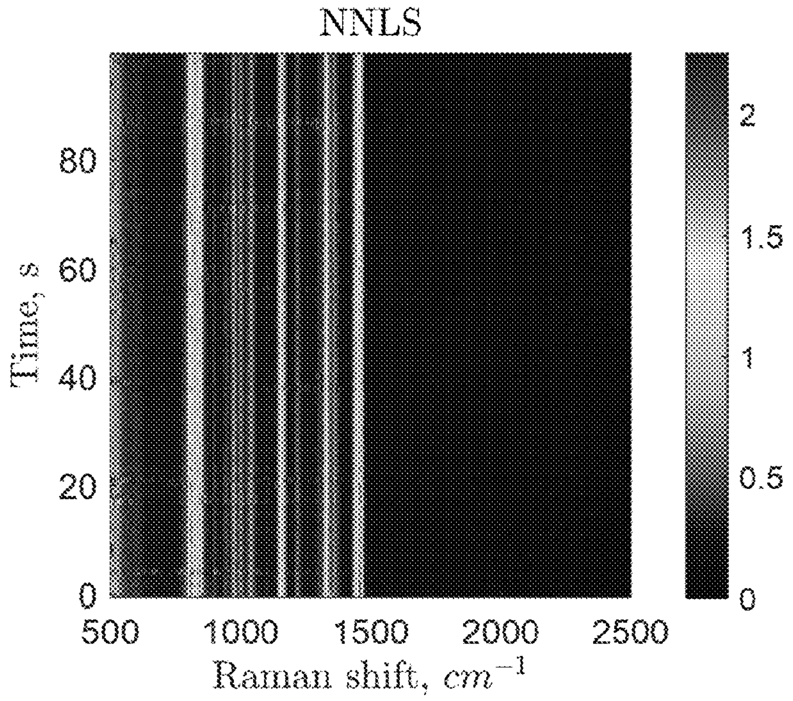

FIG. 14 shows the estimated PSF.

FIGS. 15*a*-15*d* show deblurred vs. raw data channel spectra.

FIGS. 16*a*-16*d* show deblurred time maps.

Figure 17:
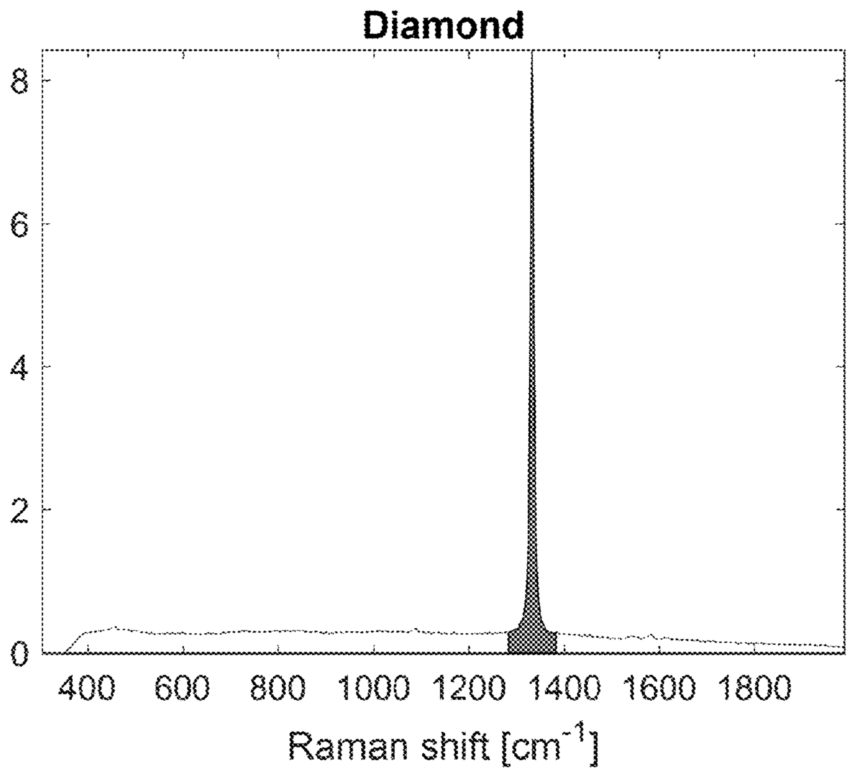

FIG. 17 shows the Raman spectrum of diamond, wherein highlighted area is used for the PSF estimation.

Figure 18:
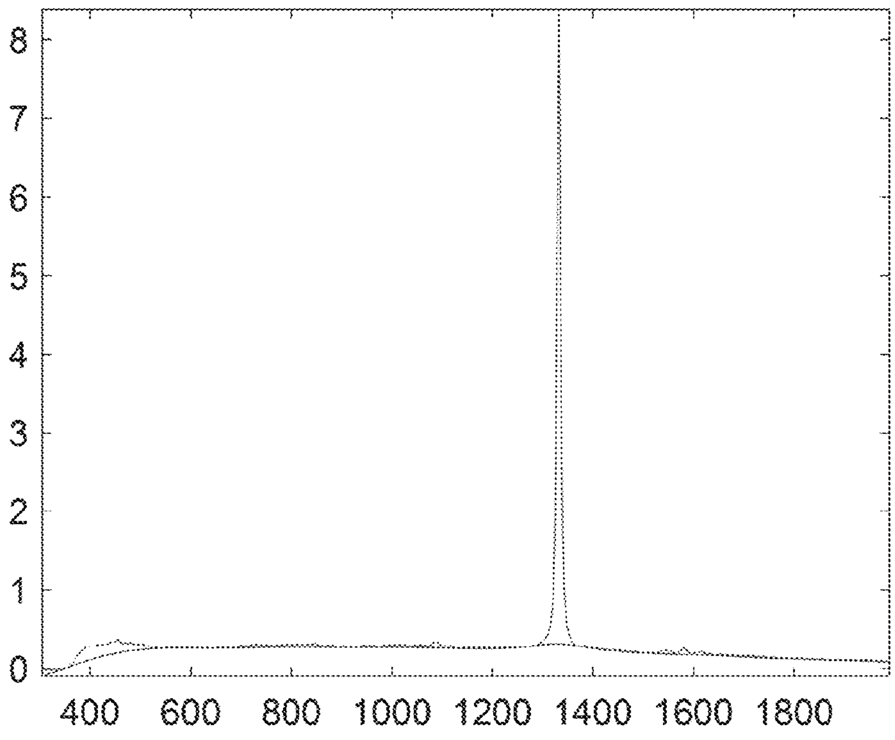

FIG. 18 shows the calculated baseline.

Figure 19:
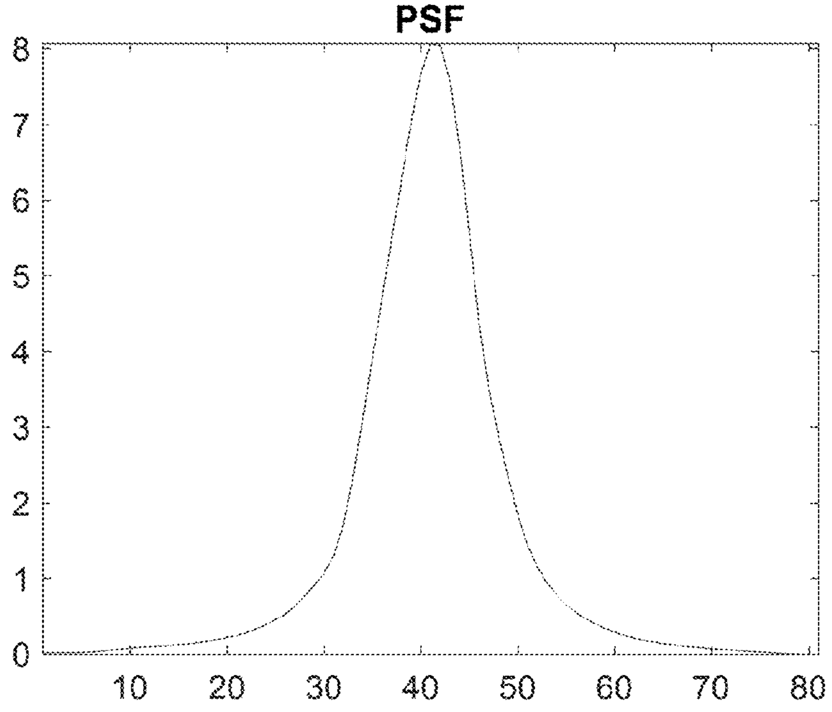

FIG. 19 shows the estimated PSF.

Figure 20:
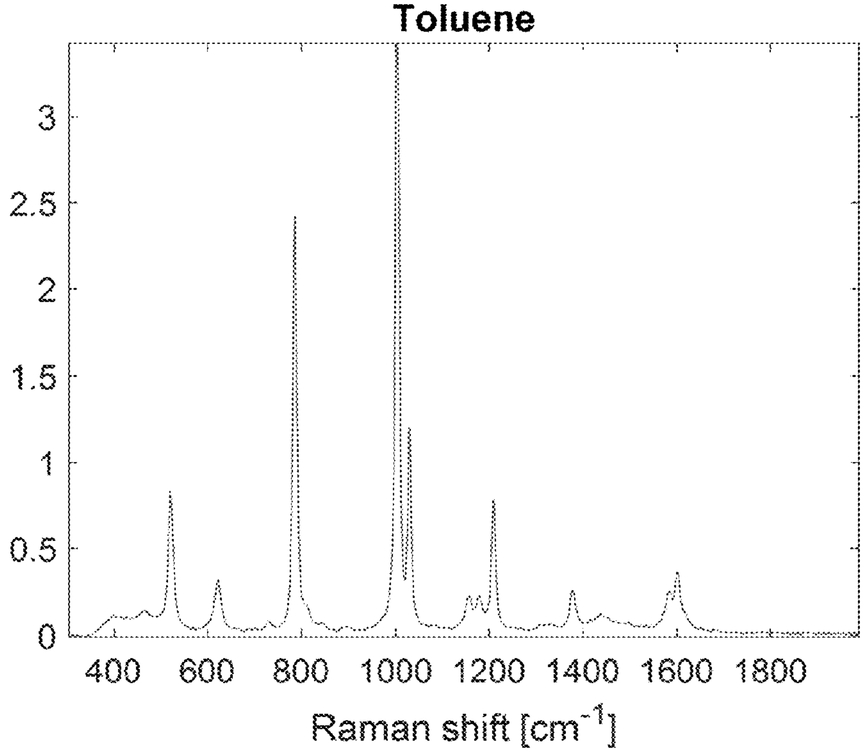

FIG. 20 shows the Raman spectrum of toluene.

Figure 21:
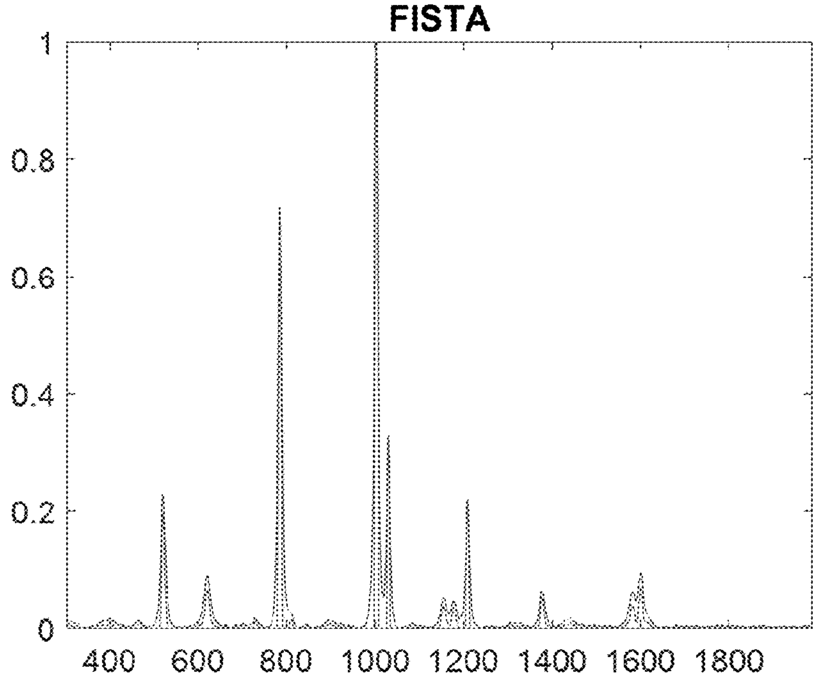

FIG. 21 shows raw and deblurred spectra of toluene.

Figure 22:
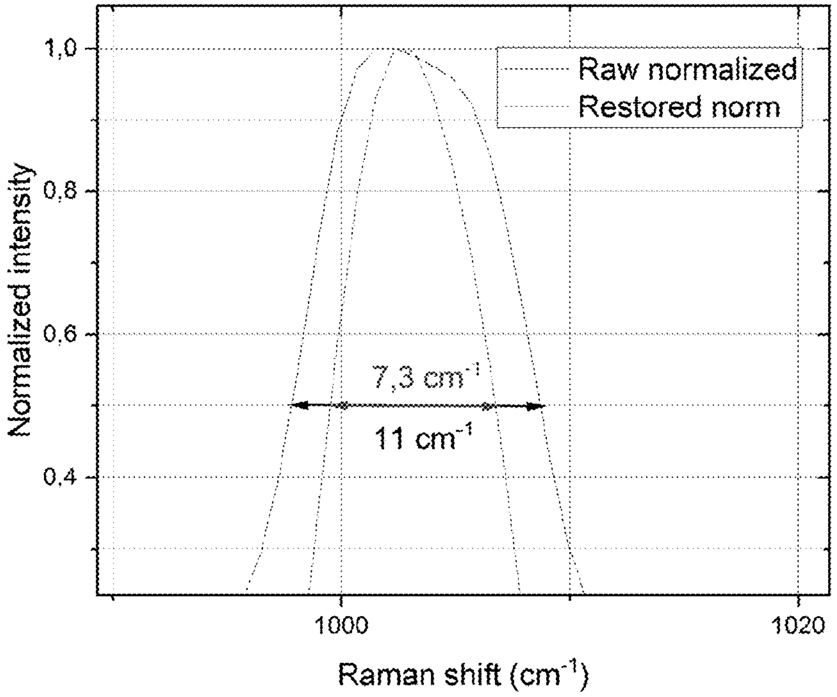

FIG. 22 shows peak width at half height for the raw and deblurred spectra, wherein the raw and deblurred spectra were peak heigh normalized.

Figure 23:
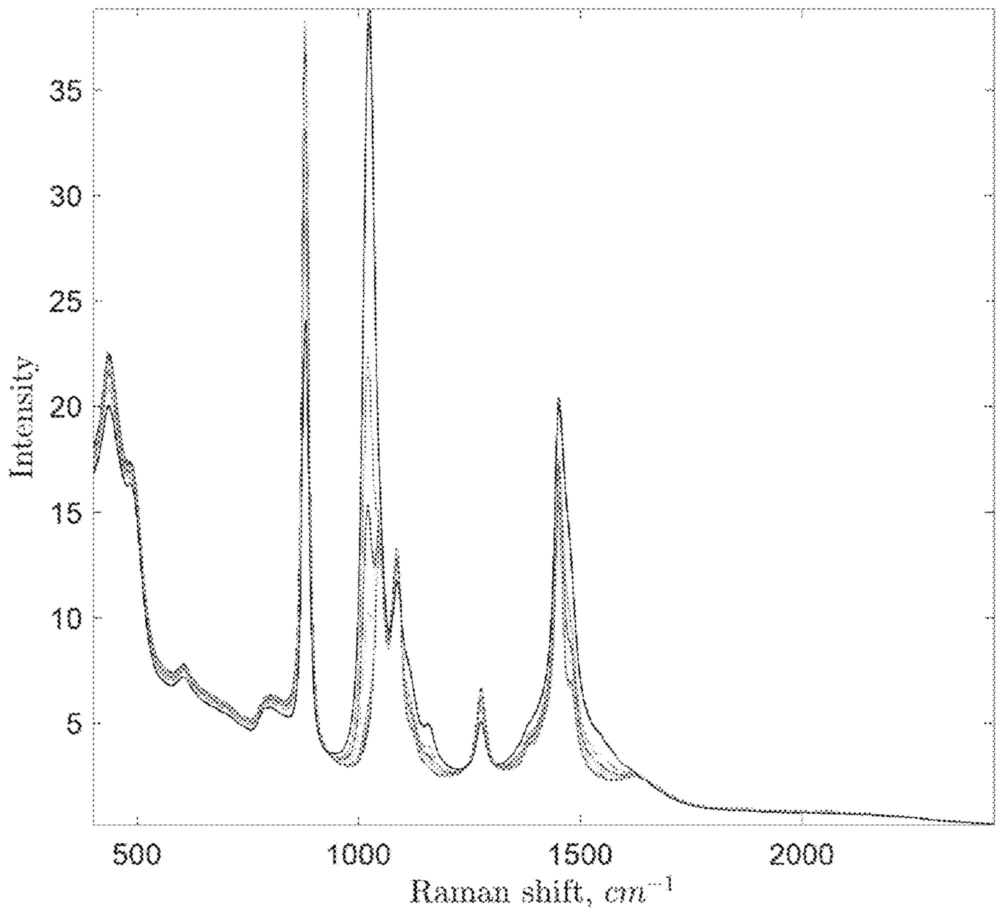
Figure 24A:
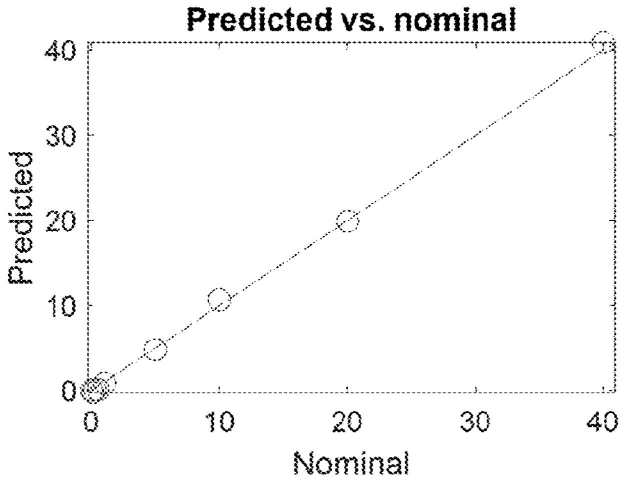
Figure 24B:
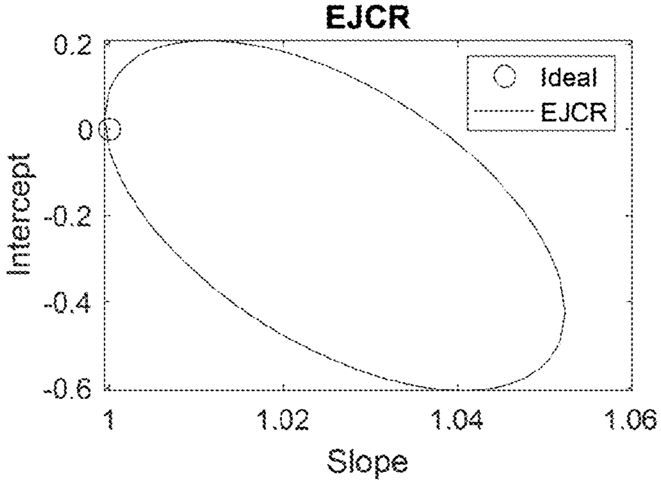
Figure 24C:
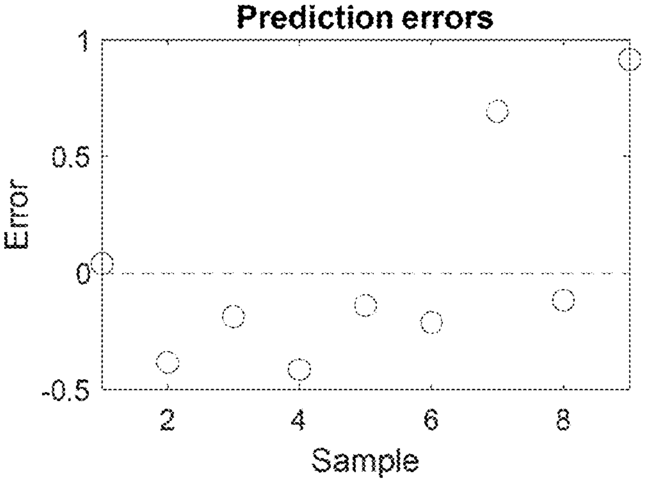
Figure 24D:
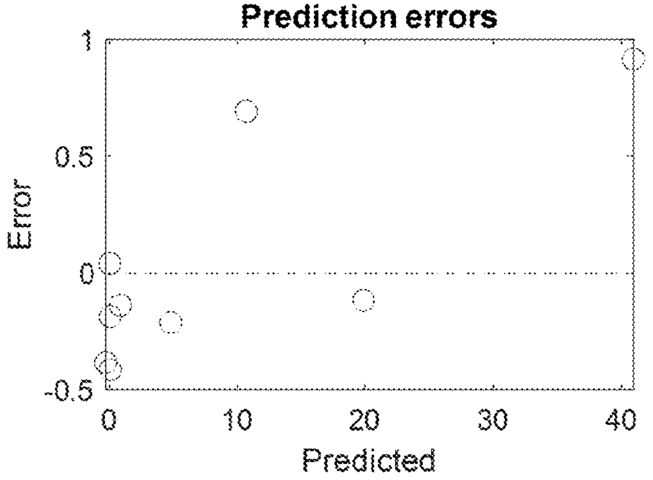

FIG. 23 is the Raman spectra of a water ethanol solution with different concentrations of methanol at a laser excitation of 785 nm.

FIGS. 24*a-d* show methanol quantification results obtained from a laser excitation of 785 nm, wherein methanol detection was performed by PLS regression using MVC1 toolbox.

Figure 25:
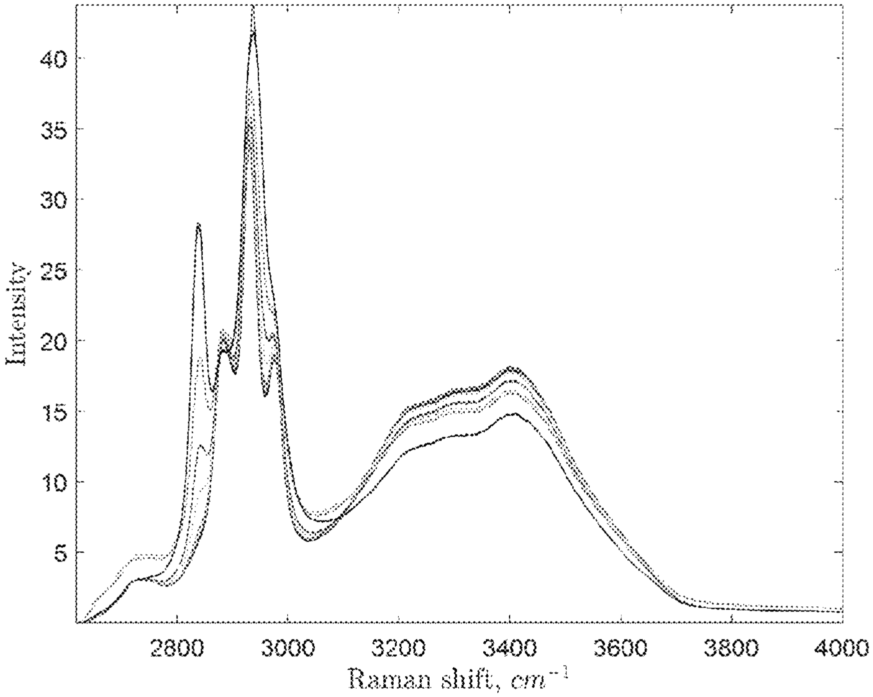
Figure 26A:
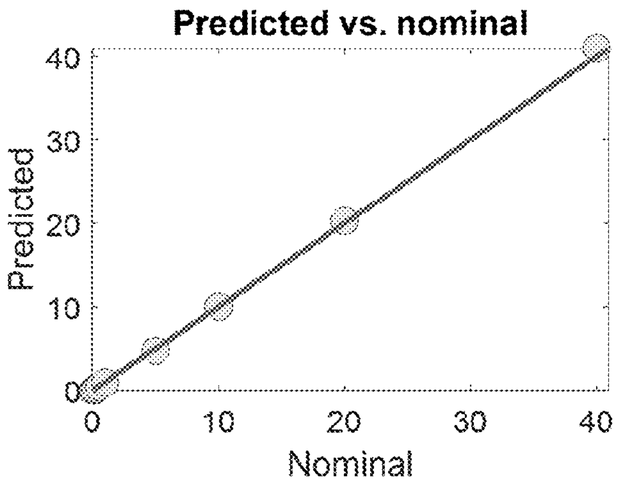
Figure 26B:
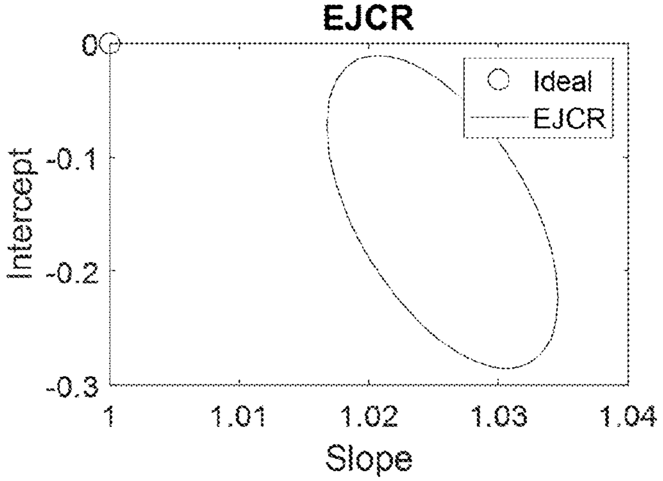
Figure 26C:
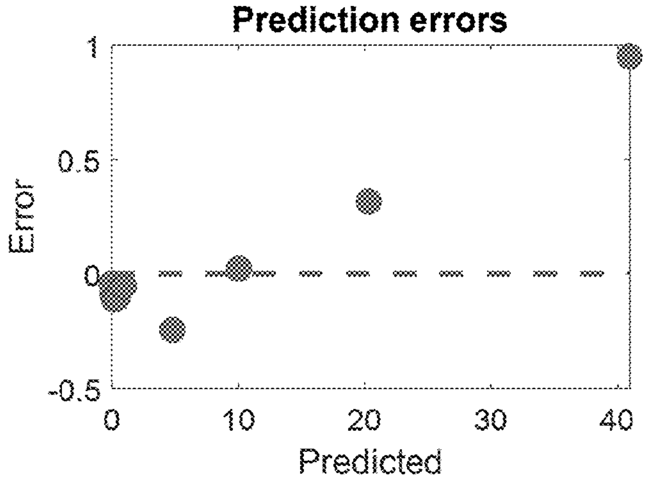
Figure 26D:
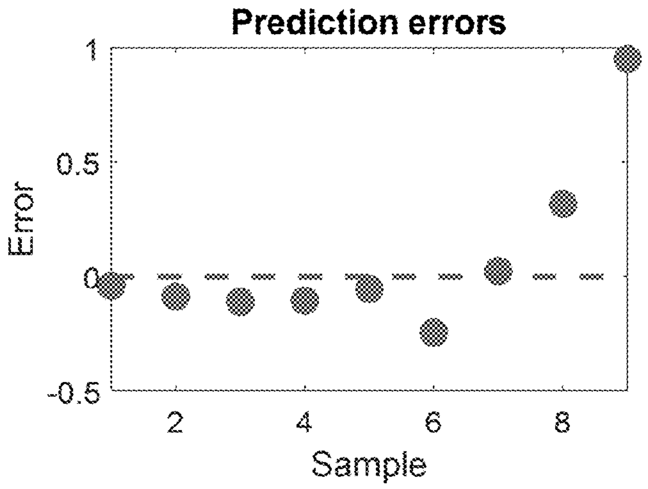

FIG. 25 is the Raman spectra of a water ethanol solution with different concentrations of methanol at a laser excitation of 675 nm.

FIGS. 26*a-d* show methanol quantification results obtained from a laser excitation of 675 nm, wherein methanol detection was performed by PLS regression using MVC1 toolbox.

Figure 27:
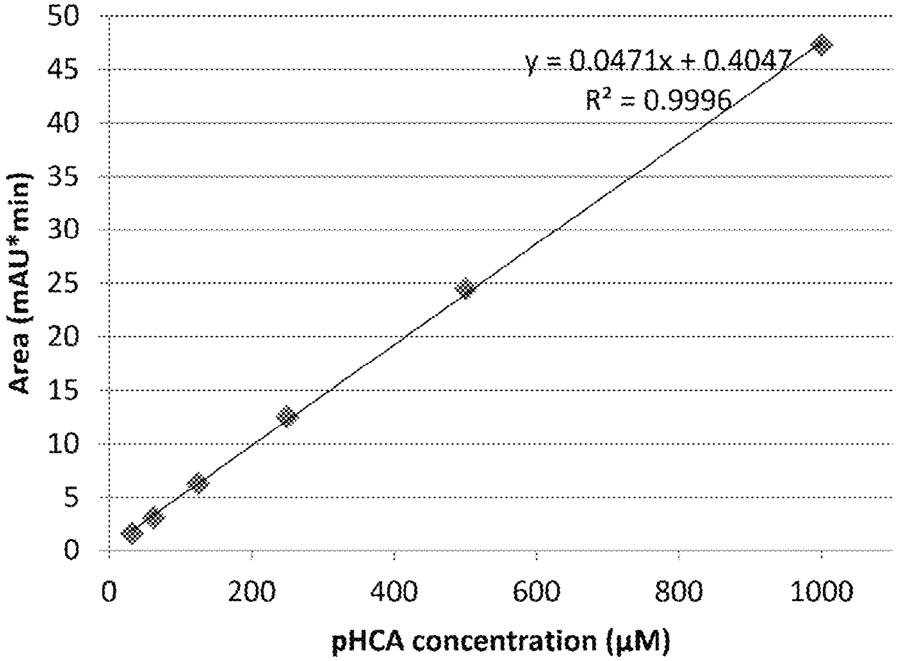

FIG. 27 shows PLS calibration based on Raman data for liquid samples of pHCA diluted in PBS.

Figure 28:
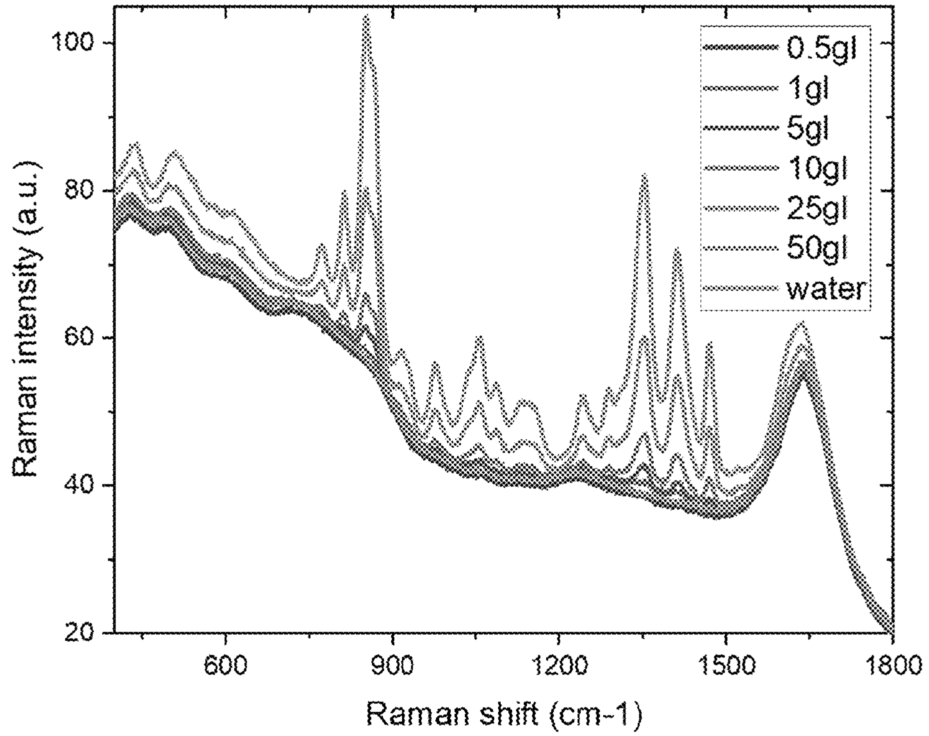
Figure 29A:
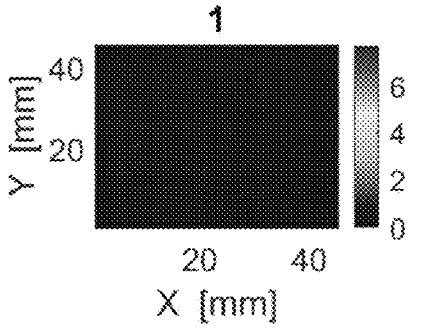
Figure 29B:
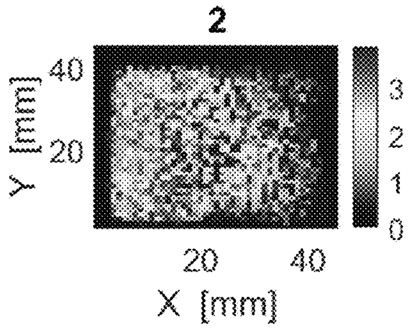
Figure 29C:
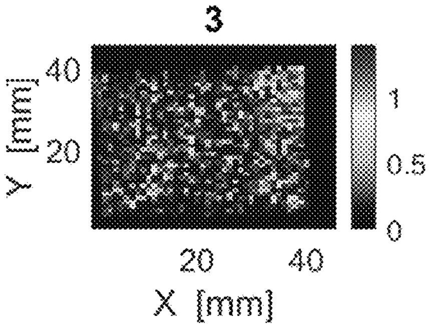
Figure 29D:
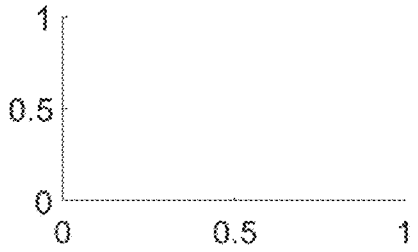
Figure 30A:
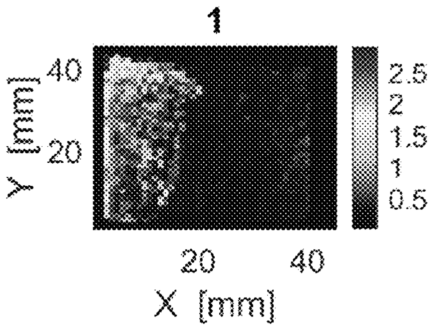
Figure 30B:
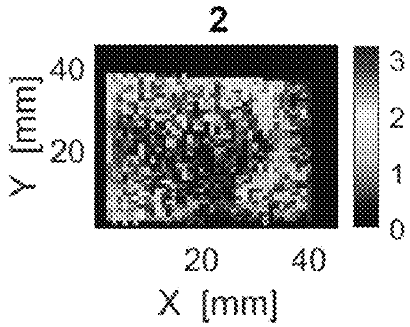
Figure 30C:
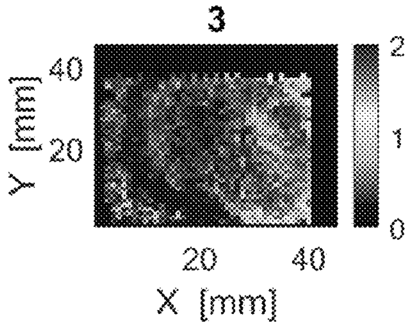
Figure 30D:
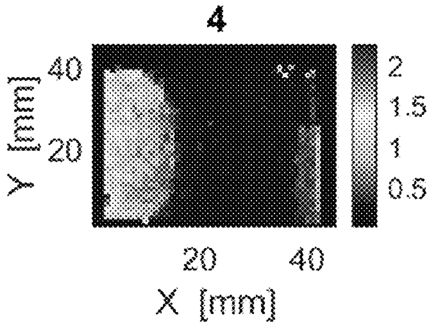
Figure 31A:
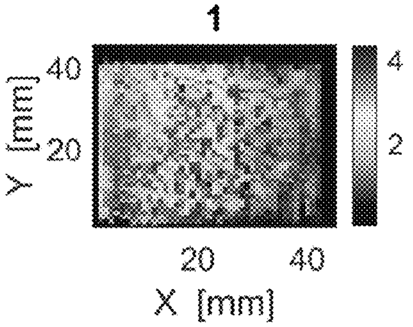
Figure 31B:
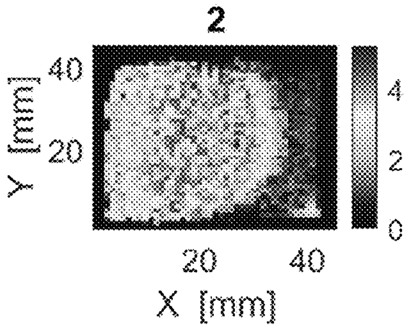
Figure 31C:
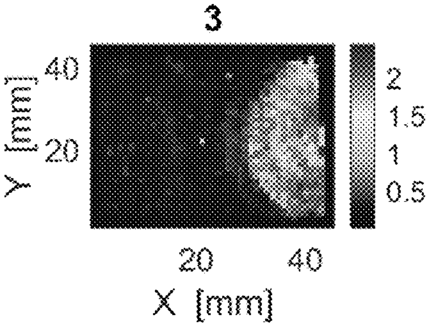
Figure 31D:
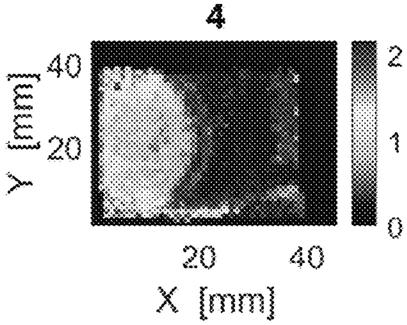
Figure 32A:
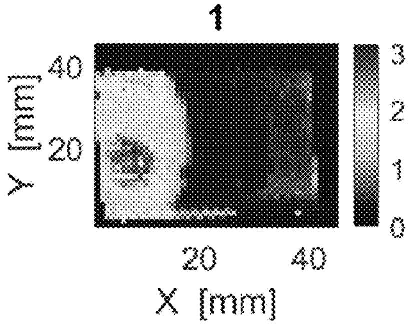
Figure 32B:
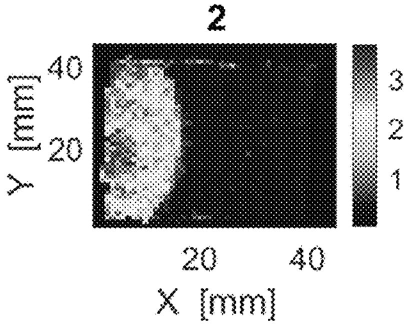
Figure 32C:
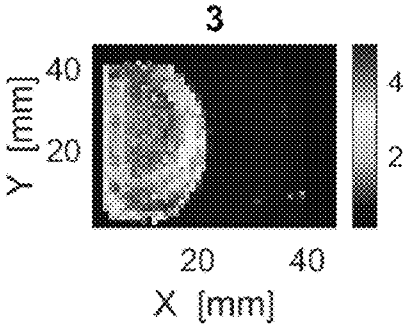
Figure 32D:
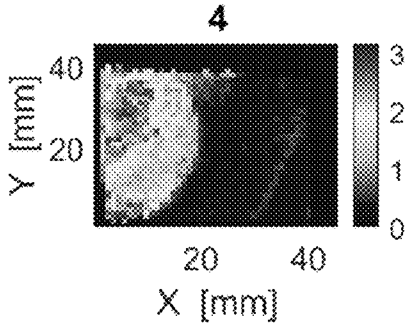
Figure 33A:
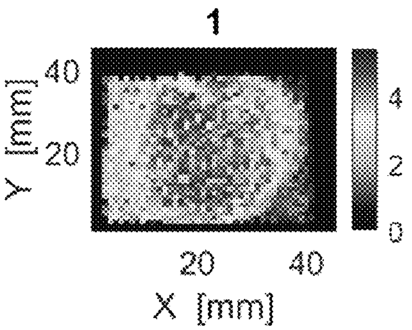
Figure 33B:
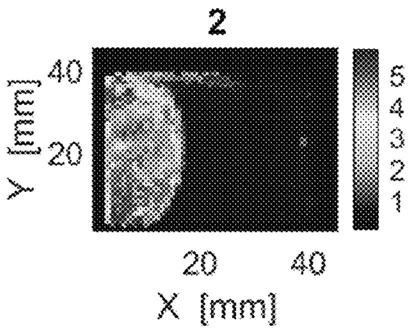
Figure 33C:
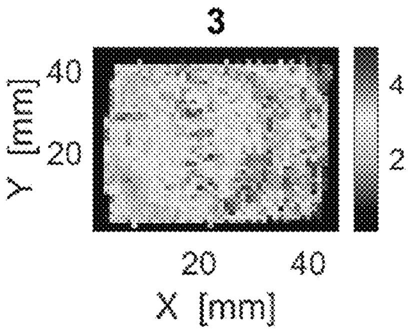
Figure 33D:
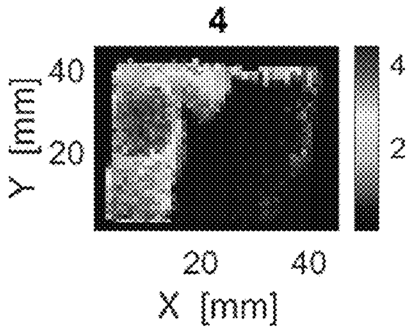
Figure 34A:
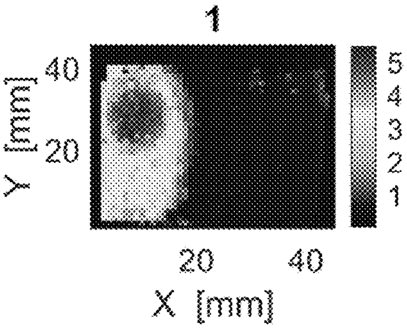
Figure 34B:
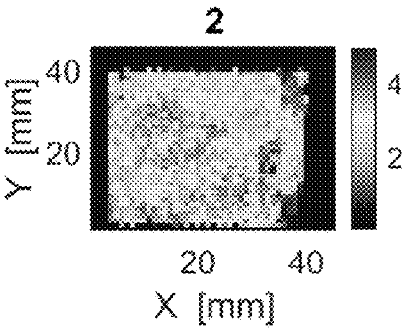
Figure 34C:
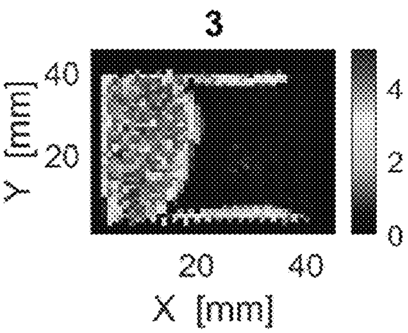
Figure 34D:
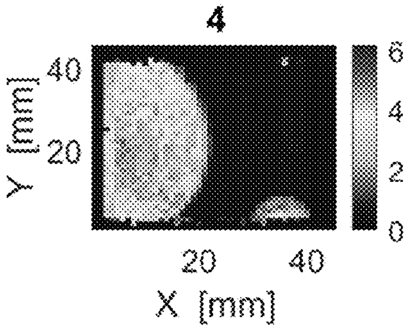

FIG. 28 shows Raman spectra of the different concentration is Serine diluted in PBS.

FIGS. 29*a-d* show peak intensity spatial distribution of MTX, with an MTX percentage of 0% and at a frequency of 680 cm−1.

FIGS. 30*a-d* show peak intensity spatial distribution of MTX, with an MTX percentage of 5% and at a frequency of 680 cm−1.

FIGS. 31*a-d* show peak intensity spatial distribution of MTX, with an MTX percentage of 10% and at a frequency of 680 cm−1.

FIGS. 32*a-d* show peak intensity spatial distribution of MTX, with an MTX percentage of 25% and at a frequency of 680 cm−1.

FIGS. 33*a-d* show peak intensity spatial distribution of MTX, with an MTX percentage of 50% and at a frequency of 680 cm−1.

FIGS. 34*a-d* show peak intensity spatial distribution of MTX, with an MTX percentage of 75% and at a frequency of 680 cm−1.

Figure 35:
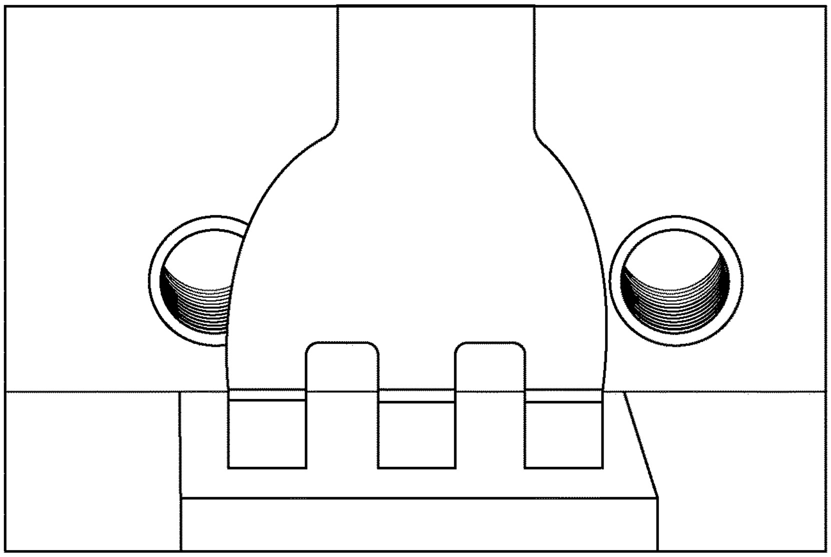

FIG. 35 shows a photograph of silver coated NP SER chips inserted into solution with MTX.

Figure 36:
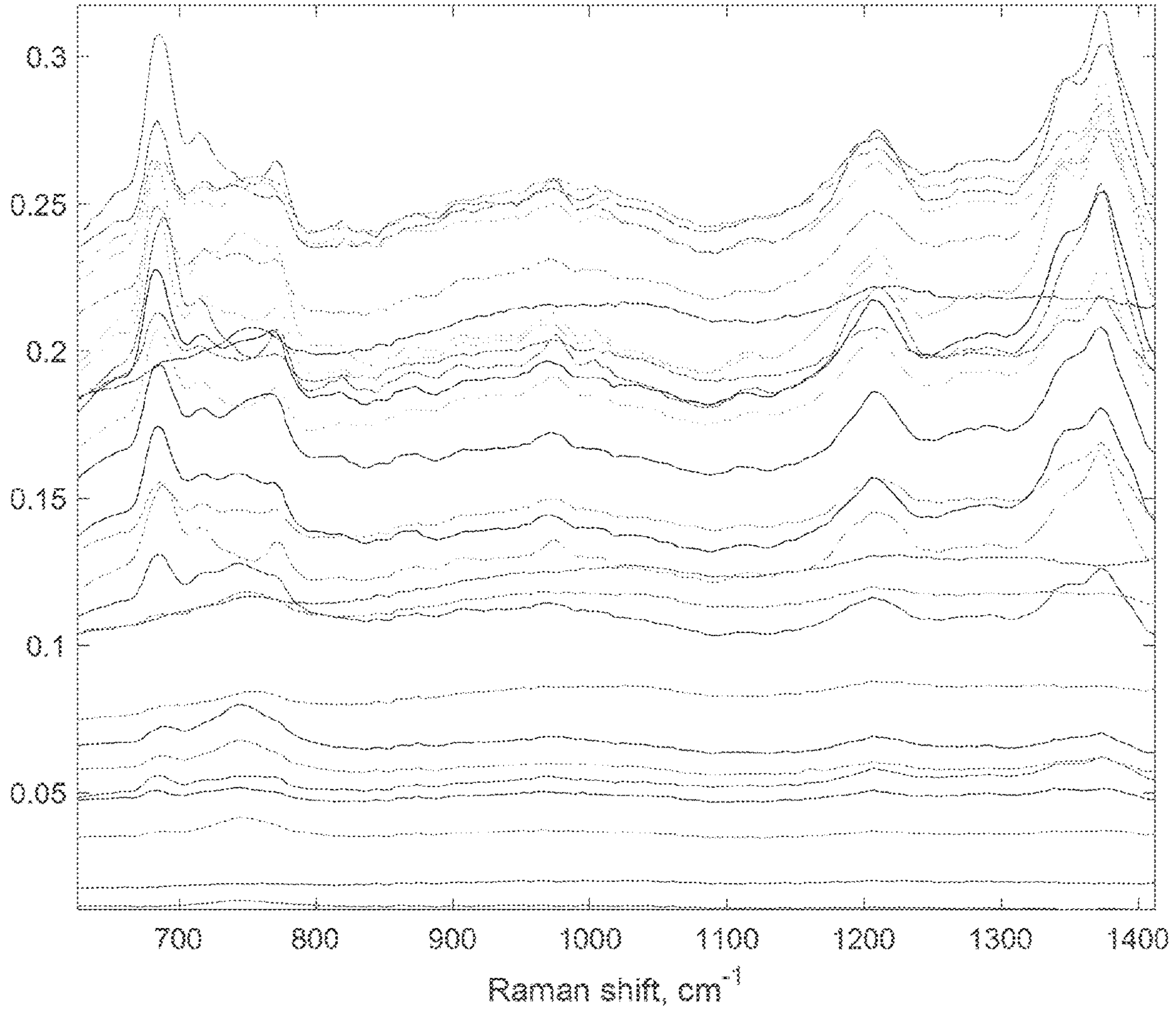

FIG. 36 shows a map averaged MTX spectra.

Figure 37:
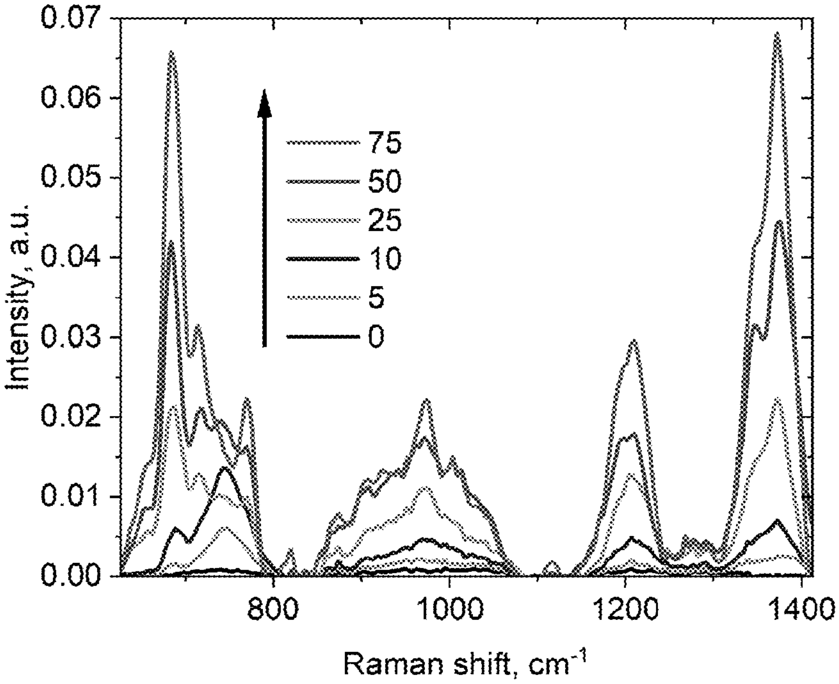
Figure 38A:
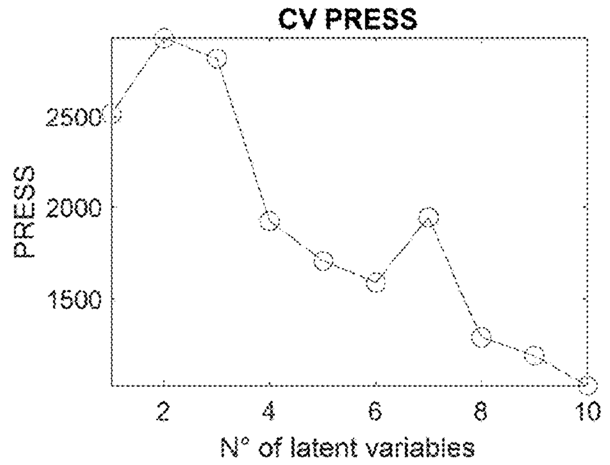
Figure 38B:
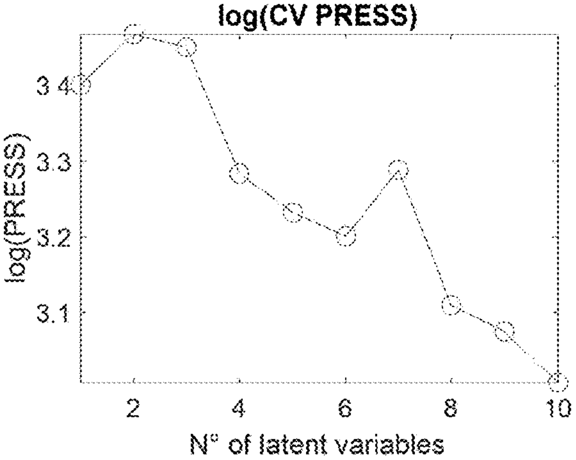
Figure 38C:
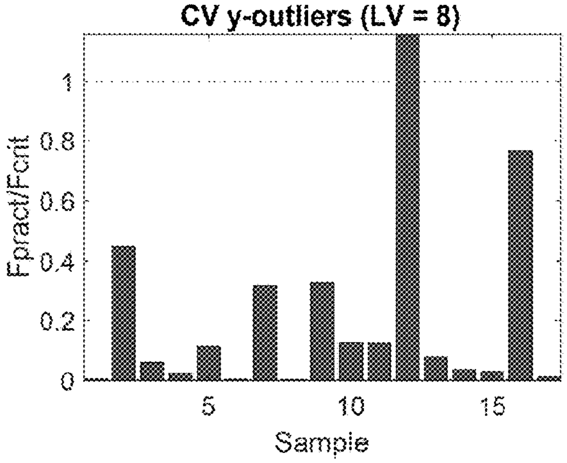
Figure 38D:
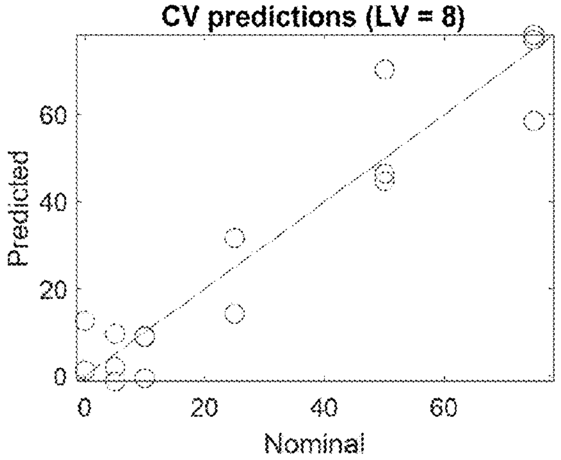
Figure 39A:
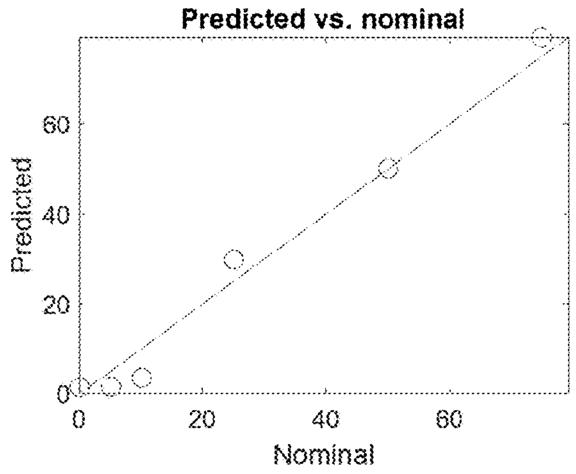
Figure 39B:
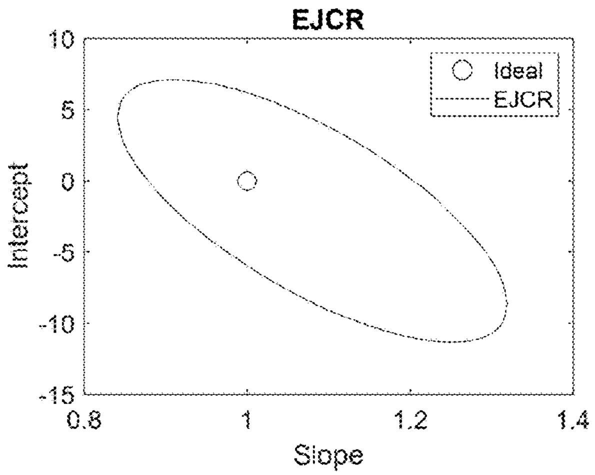
Figure 39C:
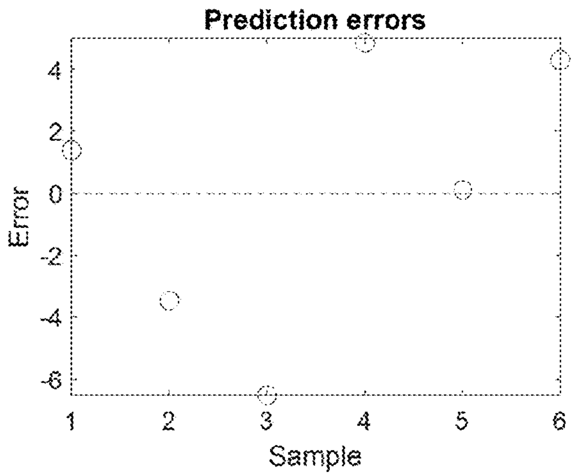
Figure 39D:
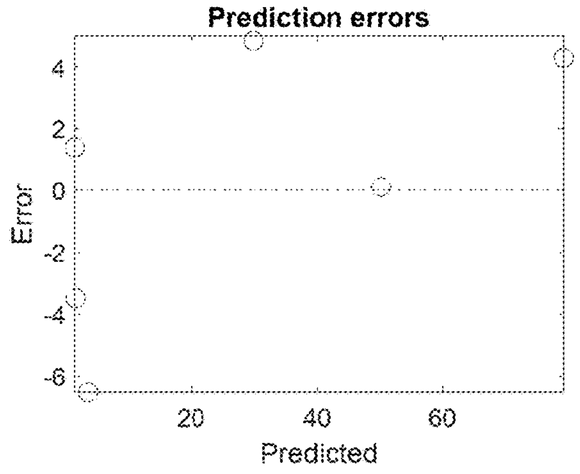

FIG. 37 shows background corrected spectra, wherein background was eliminated using asymmetrical least squares with $\lambda$=105, $\rho$=0.01 with further mean-centering and a spectral range of 626-1412 cm−1 was used for calibration.

FIGS. 38*a*-38*d* show MTX PLS calibration results, wherein the analysis was performed by PLS regression using MVC1 toolbox.

FIGS. 39*a*-39*d* show MTX PLS validation results, wherein the analysis was performed by PLS regression using MVC1 toolbox.

Figure 40A:
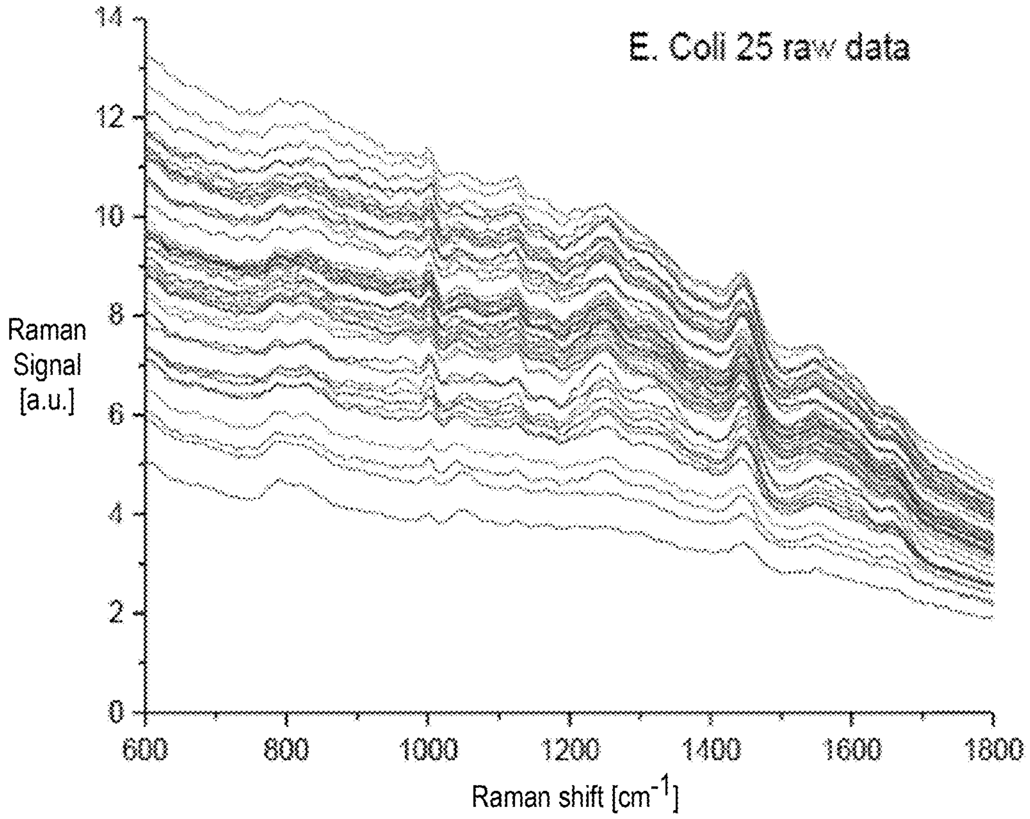
Figure 40B:
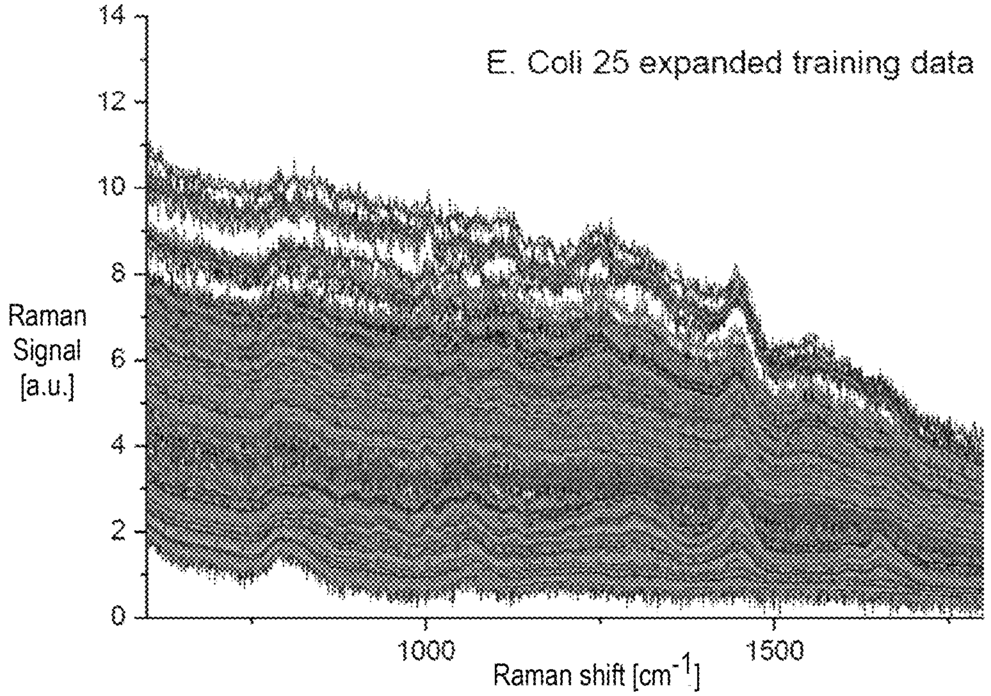

FIGS. 40*a*-40*b* show ML of bacteria data.

FIGS. 41*a*-41*b* show ML of bacteria data.

Figure 42:
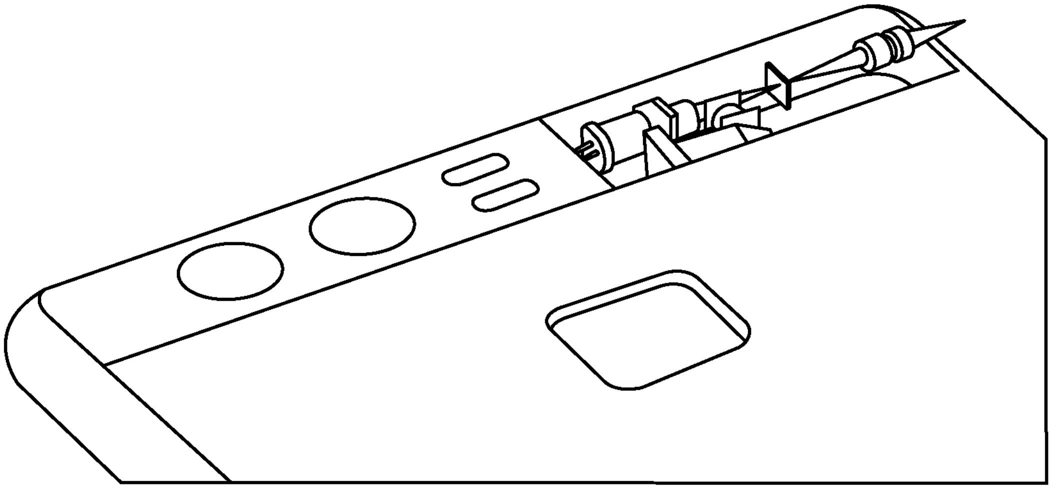

FIG. 42 shows an optomechanical design of miniaturized Raman spectrometer with spectral resolution 18 cm−1 in the range 400-2000 cm−1 operated from laser wavelength 785 nm.

Figure 43:
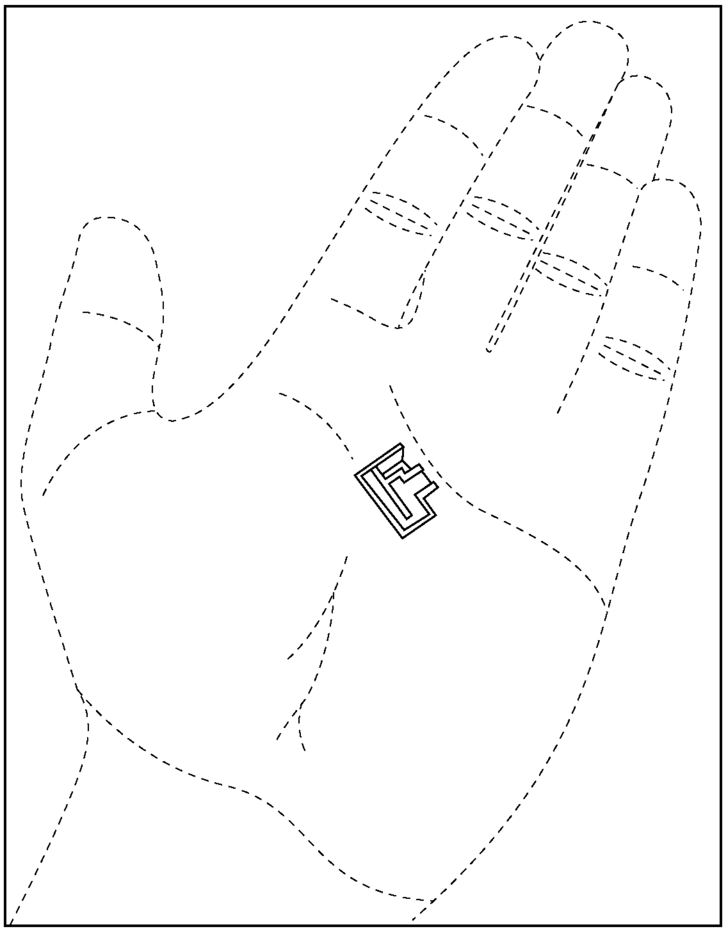

FIG. 43 shows a photograph of a prototype of a miniaturized Raman spectrometer with spectral resolution 18 cm−1 in the range 400-2000 cm−1 operated from laser wavelength 785 nm.

FIG. 44 shows a table of methanol quantification from 785 nm.

FIG. 45 shows a table of methanol quantification from 675 nm.

FIG. 46 shows a table regarding pHCA calibration Raman.

FIG. 47 shows a table regarding Serine calibration Raman.

FIG. 48 shows a table regarding MTX quantification by SERS.

DETAILED DESCRIPTION

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention. These and other embodiments are disclosed or are obvious from and encompassed by, the following Detailed Description.

Embodiments of an apparatus for carrying out optical spectroscopy can be denoted in the following also as Raman system or miniaturized Raman system or Raman spectrometer.

Figure 1A:
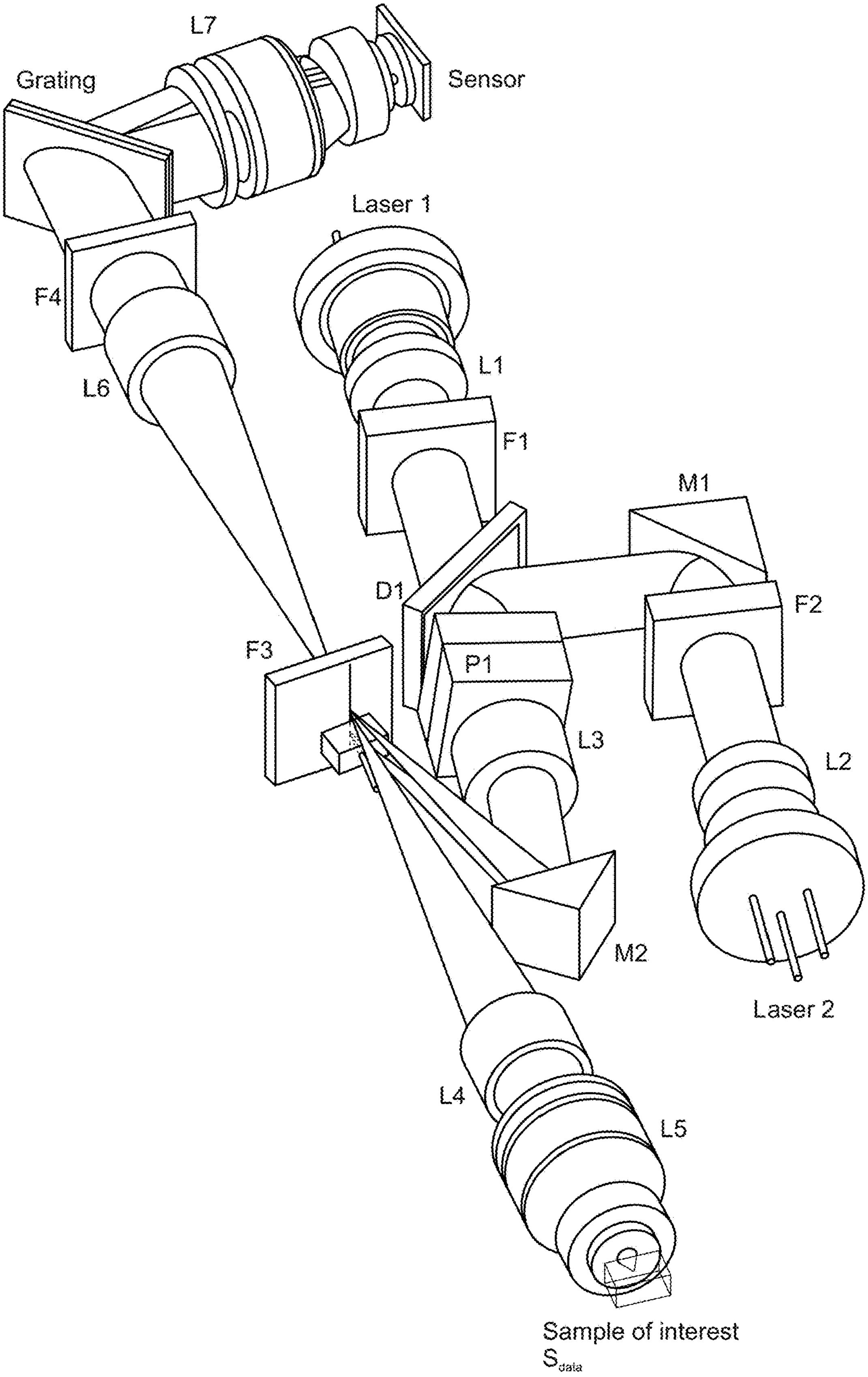
FIG. 1*a* shows an optical layout of an exemplary apparatus for carrying out spectroscopy.

FIG. 1*a* shows an optical scheme of an embodiment of a Raman spectrometer. It includes a laser 1, such as a laser diode, such an AlGaAs laser diode (AlGaAs=Aluminium Gallium Arsenide). In some embodiments, the laser diode is arranged in a TO package, for example with a diameter of 5.6 mm, and includes a Fabry-Pérot resonator at a central wavelength of 785 nm and a maximum power of 200 mW. The laser is used as a Raman source (L1). In some embodiments, the laser spectral linewidth at half maximum (LWHM) is 0.2 nm which is at least in some embodiments sufficient to obtain a spectral pixel resolution of the miniaturized Raman system of 0.3 nm. The selected type of laser requires in some embodiments precise temperature stabilization for Raman spectroscopy applications to prevent laser wavelength drift and/or a change of a laser mode. Such a change is also called a "mode hop". However, in order to avoid bulky, costly and power consuming Peltier elements for temperature stabilization of the laser, at least in some embodiments the described Raman system does not require laser wavelength stabilization.

As shown in FIG. 1*a*, a collimated laser beam provided by laser 1 is split into two beams using prism (P1), resulting in two different portions of the laser beam (B1) and (B2). A portion of the laser beam (B2), also denoted as first portion of laser beam B2, is focused on the slit and reflected from the Raman edge filter (F3) towards a sample and from the sample, see sample of interest $S_{data}$, a first spectrum beam (B3) (see also FIG. 1*b*) is obtained due to an interaction, in particular Raman interaction, between the sample and the incident portion of the laser beam B2.

The other portion of the laser beam, also denoted as a second portion of the laser beam (B1), is focused on a reference sample Sref. Due to interaction, in particular Raman interaction, between the reference sample and the second portion of laser beam (B1), a second spectrum beam is generated.

In some embodiments, the reference sample Sref is a polystyrene reference sample. In some embodiments, the reference sample is glued to an optical filter F3, such as a Raman edge filter. In some embodiments, the Raman edge filter (F3) is coated with an aluminium mask. The mask serves as a spectral slit. The coating forming the aluminium mask is arranged on one surface of the filter. In some embodiments, the spectral slit is not arranged on a front side of a filter F3, but on the opposite side. The opposite side is facing the grating. In some embodiments, the slit is provided as a separated optical element.

In the apparatus of FIG. 1*a*, two spectrum beams are obtained whereof one spectrum beam includes the Raman spectrum of the sample of interest, while the other spectrum beam includes the known Raman spectrum of the reference sample $S_{ref}$. The beam that carries the Raman spectrum from the sample is called first spectrum beam and the beam that carries the Raman spectrum from the reference sample $S_{ref}$ is called second spectrum beam.

The apparatus shown in FIG. 1*a* includes an optical system with lenses and mirrors, such as lenses L1, L2, L3, L4, L5, L6 and L7, mirrors, such as mirrors M1 and M2, and filters, such as filters F1, F2 and F3. The optical system is designed to guide the first spectrum beam and the second spectrum beam to a diffraction element, which is a grating in the embodiment shown in FIG. 1*a*. The grating may be a transmissive or transmission Bragg grating. The grating splits the first spectrum beam into a first spectrum of spatially separated wavelength components and the second spectrum beam into a second spectrum of spatially separated wavelength components. The first spectrum is related to the sample of interest and the second spectrum is related to the reference sample for which the spectrum is known.

The apparatus as shown in FIG. 1*a* includes a detector, also called sensor, that includes an array of pixels for detecting the first spectrum and the second spectrum. The spatially separated wavelength components of the first and second spectra are usually separated from each other in one direction, here called spectral direction, but the spectra usually do not have a larger extension in a width direction, which is perpendicular to the spectral direction, where both directions extend in the plane defined by the array of pixels. The width of a spectrum in the width direction is in some embodiments close to the size of a pixel.

Figure 1B:
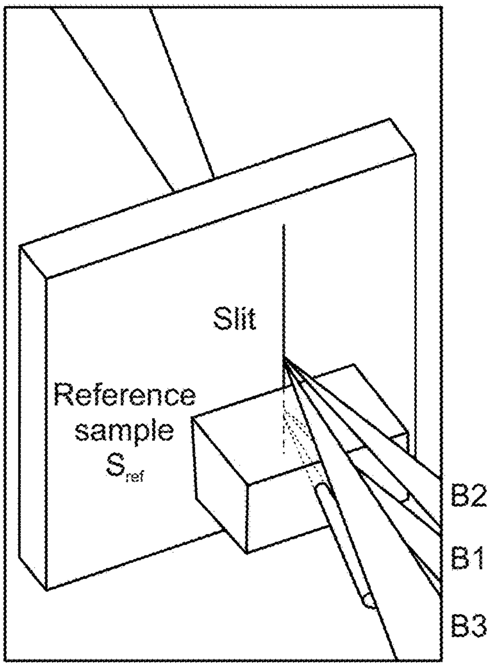
FIG. 1*b* shows a reference sample on an optical filter or slit of the apparatus of FIG. 1*a*.
Figure 1C:
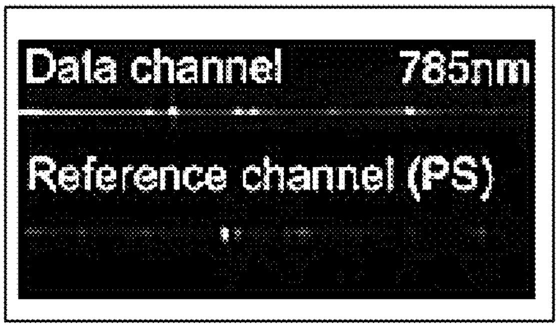
FIGS. 1*c* and 1*d* show sensor images that demonstrate simultaneous acquisition of main and reference Raman signals from laser excitation at 785 nm (FIG. 1*c*) and 660 nm (FIG. 1*d*). Each image represents a Raman spectrum of a water-ethanol solution (60:40) in the main channel and a Raman spectrum of polystyrene in the reference channel.
Figure 1D:
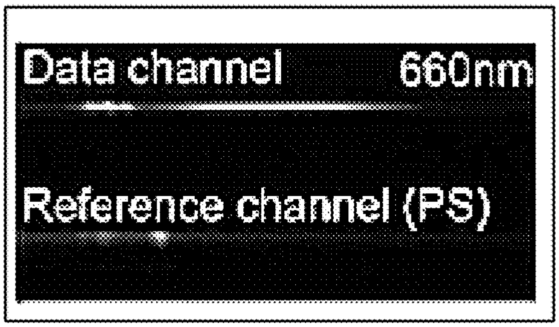

FIGS. 1*c* and 1*d* show images of the array of pixels. In a so-called main or data channel, the first spectrum related to the sample of interest is detected, and in a so-called reference channel, the second spectrum related to the reference channel is detected. Here, the spectral direction runs along the horizontal axis and the width direction runs along the vertical axis of the array of pixels. The array of pixels can in particular be arranged such that the spectral direction extends along a line of pixels, such that a respective spectrum can be detected by one line of pixels or a small amount of adjacent rows of pixels, such as 2, 3, 4, or 5 adjacent rows of pixels. In some embodiments, the number of adjacent pixels may be between 2 and 20. In other words, in some embodiments, the number of adjacent rows of pixels may be between 2 and 20 and a number of pixels may be arranged in each row of pixels to detect the wavelength components, which are spatially separated in the spectral direction. In some examples, the number of adjacent rows of pixels may be 5, 10 or 15.

FIG. 1*c* shows a first spectrum of the sample collected in the data channel and a second spectrum of the reference sample collected in the reference channel as obtained from the first and second portions of the laser beams generated from laser 1. The laser 1 is operating at a wavelength of 785 nm.

In some embodiments, the apparatus can include a second laser (laser 2). In some embodiments, the second laser (laser 2) operates at a wavelength of 660 nm. A first portion of a laser beam and a second portion of a laser beam can also be obtained from laser 2, which also can be used to generate a first spectrum beam and a second spectrum beam as explained before. After the dichroic mirror D1, the beams generated by laser 1 and laser 2 can be aligned. Thus, in some embodiments, after the dichroic mirror D1, laser irradiation from the second laser L2 propagates through the same optical paths as B1-B3, which are obtained using the first laser L1, and targets the reference sample $S_{ref}$ on the slit or the sample of interest $S_{data}$. Therefore, the optical system does not have to be adjusted depending on whether laser 1 or laser 2 is in operation. In the device shown in FIG. 1*a*, however, only one laser is operated at any given time. In some embodiments, the dichroic mirror is transmissive for laser light from laser 1 and reflective for laser light from laser 2.

Thus, in some embodiments, the apparatus includes at least one laser, such as laser 1 and laser 2 as shown in FIG. 1*a*, which provides a laser beam for generating the first and second portions of the laser beam. In some embodiments, the laser beam is split into the first and second portions of the laser beam by use of beam splitter P1 as shown in FIG. 1*a*, or any other suitable optical device to split beams. The beam splitter P1 may split the first and second portions of the laser beams such that the two beams take paths through the optical system that are offset from each other. This may happen because the first and second portions of the laser beam leave the beam splitter at different angles, so that they travel slightly offset to each other through the optical system. Therefore, the first portion of the laser beam B2 can be focused on the sample, but the first portion of the laser beam B2 and the first spectrum beam B3 run past the side of the reference sample without hitting it as illustrated in FIG. 1*b*. On the other hand, the second portion of the laser beam B1 is hitting the reference sample $S_{ref}$, and the second Raman beam originating from the interaction between the second portion of the laser beam B1 and the reference sample is guided to the array of pixels of the sensor. In some embodiments, the first spectrum beam is focused to a focal point when passing through the slit, in particular due to lens L4. The focus of lens L6 is also placed at least approximately in the same plane as the focus of the lens L4, and the focus may be in the optical plane defined by the slit. The reference sample where the second spectrum beam is generated is close to the slit and thus, the second spectrum beam may be picked up by lens L6 and further guided to the grating (see also in FIG. 1*b*).

FIG. 1*b* shows that the reference sample is arranged on the surface of the optical filter F3, which also provides on one of its surfaces a slit. The slit may be arranged in form of a material coating, such as a metal coating, on the surface of the filter.

FIG. 1*d* shows the first spectrum of the sample collected in the data channel and the second spectrum of the reference sample collected in the reference channel as obtained from the first and second portions of the laser beams generated from the second laser (laser 2), which is operating at 660 nm.

As the first portion of the laser beam and the second portion of a laser beam are generated from a single laser beam either from the first laser or the second laser, the Raman spectra from both beams, for example in a "fingerprint" range between 400-2700 $cm^{-1}$, are simultaneously collected by the pixel array of the sensor. In some embodiments, the sensor is a NIR enhanced imaging CMOS sensor.

The optical system of the apparatus of FIG. 1*a* is at least in some embodiments set up such that the two Raman beams travel slightly offset from each other. Therefore, the Raman spectra of the sample and reference sample are collected in different areas on the pixel array of the detector. Therefore, the data channel and the reference channel may be located in different areas of the array of pixels, as shown in FIGS. 1*c* and *d*. The offset between the Raman beams may be caused by the beam splitter P1 used to generate the first and second portions of the laser beam, as the two portions leave the beam splitter in slightly different directions, so that their beam paths do not overlap in the optical system.

The optical system for guiding the first spectrum beam and the second spectrum beam is also denoted as Raman beam delivery system. It includes or consists of the reference sample (see FIG. 1*b*), lens L5, which is called Raman probe lens L5, slit lens L4 and a spectrometer. The spectrometer includes or consists of optical elements F3, L6, F4, the grating, and focusing lens L7, and the sensor, which is for example a CMOS sensor. The sample, however, is usually not a component of the apparatus, as it is only placed at its intended position for measurement purposes. It can be replaced by another sample.

In some embodiments, a spectral slit size of a slit on the filter F3 is 25 μm, which is zoomed down to 5.4 μm on the focal plane. The focal plane may be located on the pixel array of the sensor. Each pixel may have a binned pixel size of 4 μm. The imaging capabilities of the lens L7 may provide a uniform resolution along the spectral dimension on the sensor at or close to a diffraction limited spot size. This makes it possible to concentrate most of the Raman signal intensity into a single row of the sensor (see FIG. 1*c*).

In some embodiments, the grating is a fused silica transmission Bragg grating with average efficiency in the first order of diffraction ~96% in the range of 800-960 nm. In combination with NIR coating for all optical elements (NIR for near infrared), the optical system may provide an extremely high throughput from the sample to the detector of about 92%. The described elements may significantly boost the sensitivity of the miniaturized Raman spectrometer.

In some embodiments, the second laser L2 serves to cover a "high frequency" Raman range. In some embodiments, the second laser 2 is an AlGaInP laser diode 125 (L2) with a Fabry-Perot resonator L2 with a central wavelength of 675 nm, LWHM 0.2 nm and a maximum power of 200 mW (AlGaInP=Aluminium Gallium Indium Phosphide). In some embodiments, the second laser (L2) and the main laser (L1) are switched on sequentially, providing two different Raman shift ranges with the same grating. Using two lasers may make it possible to collect in the "high frequency" Raman range by the same optical elements in the same spectral range 800-960 nm that is used for collection of the "fingerprint" range. In some embodiments, the miniaturized Raman spectrometer is capable of collecting combined Raman spectrum in the range of 400-4000 $cm^{-1}$ reaching the performance typically associated with much larger, research grade systems.

As mentioned before, in some embodiments, data channels for 785 nm and 660 nm (see FIGS. 1_c_ and 1_d_) are collected one by one, not simultaneously, because their spectral lines overlap on the sensor and a simultaneous measurement is not possible. In some embodiments, however, after two consecutive measurements data may be automatically appended by software in a data acquisition device of the apparatus to provide one 400-4000 $cm^{-1}$ spectrum for the sample. The data acquisition device may be a computing device.

The data detected on the array of pixels is an intensity distribution of the wavelengths in the first spectrum and the second spectrum. Thus, first data, which is measured for the first spectrum of the sample on the array of pixels, may correspond to an intensity distribution over the pixels of the array of pixels that is detected over time either continuously or stepwise. Second data, which is measured for the second spectrum of the reference sample on the array of pixels, may correspond to an intensity distribution measured on the array of pixels over time either continuously or from time to time. In some embodiments, the array of pixels is divided in two areas, for example an upper and a lower area. Data measured in the upper area is considered data for the data channel and data measured in the lower area is considered data for the reference channel (see FIGS. 1_c_ and 1_d_). This is possible, as the first spectrum and the second spectrum are spatially separated from each other on the array of pixels as explained before due to the design of the optical system.

The data measured by the array of pixels is provided to the data acquisition device which is connected with the array of pixels. The raw data as obtained by the data acquisition device can be stored on a storage device on the data acquisition device and the data can be further processed by a processor of the data acquisition device, for example in order to determine the spectrum of the sample.

In the apparatus as shown in FIG. 1_a_, for example, it should be avoided that light from the reference sample is erroneously detected as light from the sample and vice versa. In other words, the data channel should be kept free of any signal from the reference sample, and the reference channel should be kept free of any signal from the sample.

Figure 2:
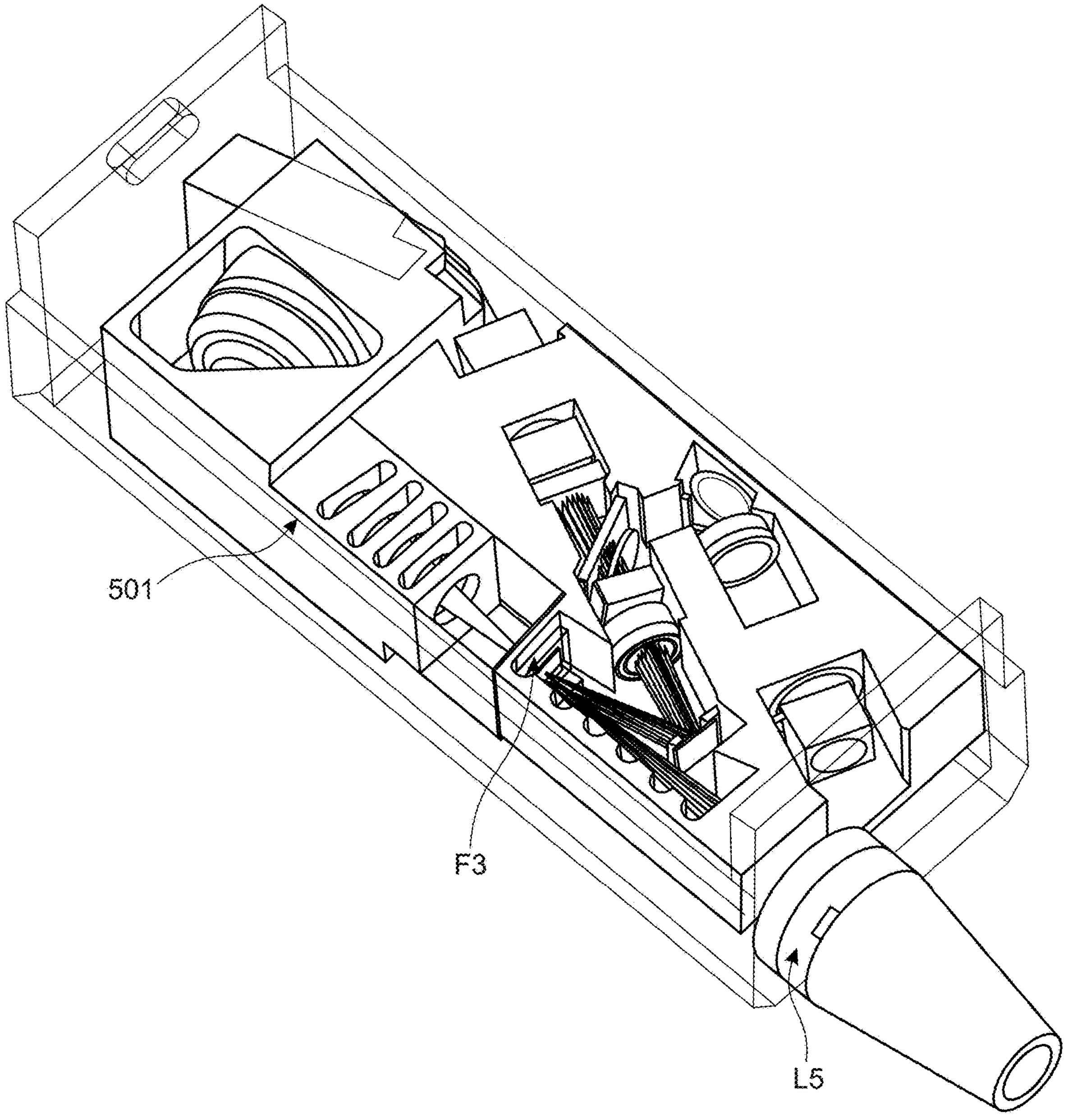
FIG. 2 shows a perspective view of an exemplary apparatus for carrying out spectroscopy.

FIG. 2 shows a perspective view of an exemplary apparatus which includes several improvements as will be described further below.

Figure 3:
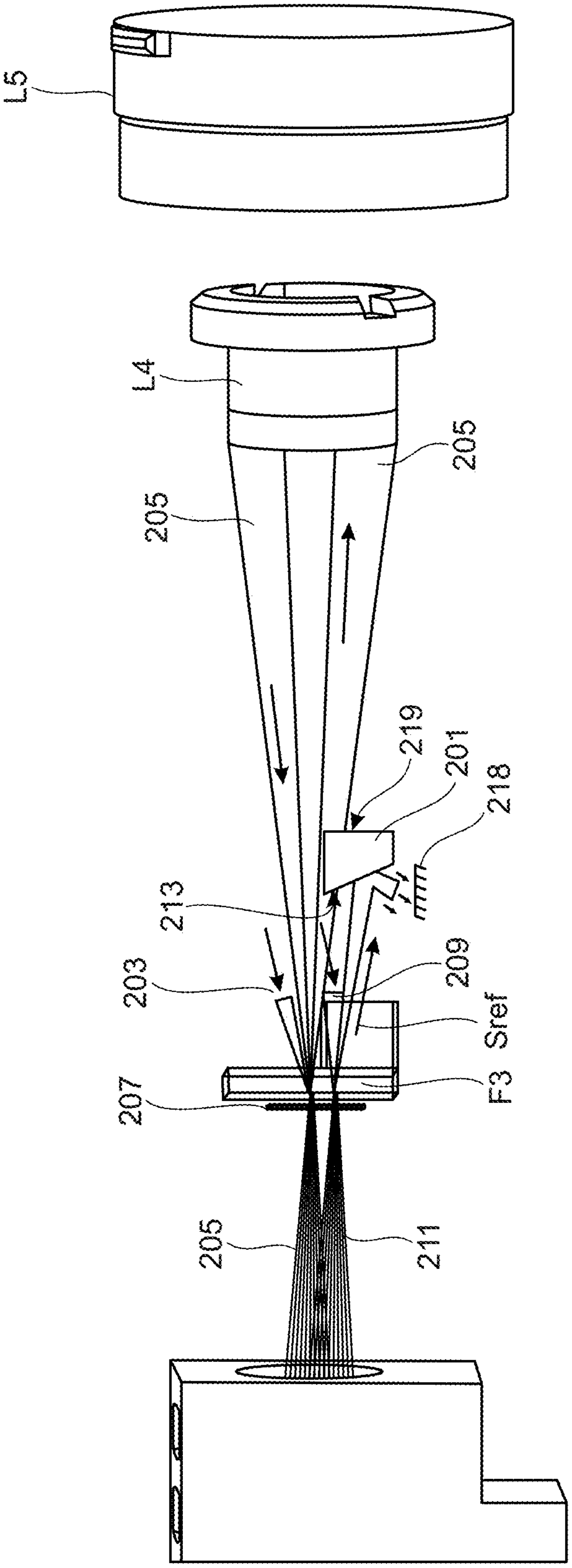
FIG. 3 shows a side view of a portion of the apparatus of FIG. 2.

As shown in FIG. 3, the apparatus includes in the optical system a beam blocker 201, which is located in the optical system between the reference sample $S_{ref}$ and the sample, which is located after the Raman probe lens or objective lens L5. The slit lens L4 and objective lens L5 focus the incoming first portion of the laser beam 203, which is reflected from optical filter F3 on the sample. The slit lens L4 and the objective lens L5 further focus the first Raman beam 205 from the sample through the slit 207 from where the first Raman beam 205 is further guided by optical elements L6 and F4 to the grating (see FIG. 1_a_). Furthermore, the second portion of the laser beam 209 is focused by lens L3 (see FIG. 1_a_) on the reference sample $S_{ref}$. The generated second Raman beam 211 is also guided by the optical elements L6 and F4 to the grating.

The beam blocker 201 is inserted in the optical system as shown in FIG. 3 to prevent that light, such as stray light generated in a scattering process, propagates from the reference sample to the sample and that light, in particular also stray light, propagates from the sample to the reference sample. Thereby, at least to a satisfying or sufficient level, the reference channel can be kept free from light from the sample, and the data channel can be kept free from light from the reference sample.

In some embodiments, the beam blocker 201 is arranged in the optical system between the sample and reference sample such that the beam blocker blocks a field of sight between the sample and the reference sample. Therefore, if one were to draw a straight line from any point on the reference sample to any point one the sample, the line would end at a surface of the beam blocker that is facing the reference sample. Similarly, if one were to draw a straight line from any point on the sample to any point on the reference sample, the line would also end at a surface of the beam blocker that is facing the sample.

As shown in particular in FIG. 3, the beam blocker 201 may in some embodiments be a material block. The material block may be arranged on a movable stage or the like, so that its position can be adjusted, in particular to reduce or minimize the effect that light from the sample enters the reference channel and that light from the reference sample enters the data channel, during the manufacturing process of the apparatus. However, during operation of the apparatus, the position of the material block is fixed. In some embodiments, the material block is fixedly arranged in the apparatus, for example by fixing the material block to the inner side of a housing of the apparatus. In some embodiments, the material block has a wedge like form as shown in FIG. 3. A surface 213 of the beam blocker 201 which is facing the reference sample $S_{ref}$ is inclined outwards, so that light from the reference sample is reflected to the outside and for example on a beam dump 218. In some embodiments, the surface 219 of the beam blocker 201 may absorb radiation.

Figure 4:
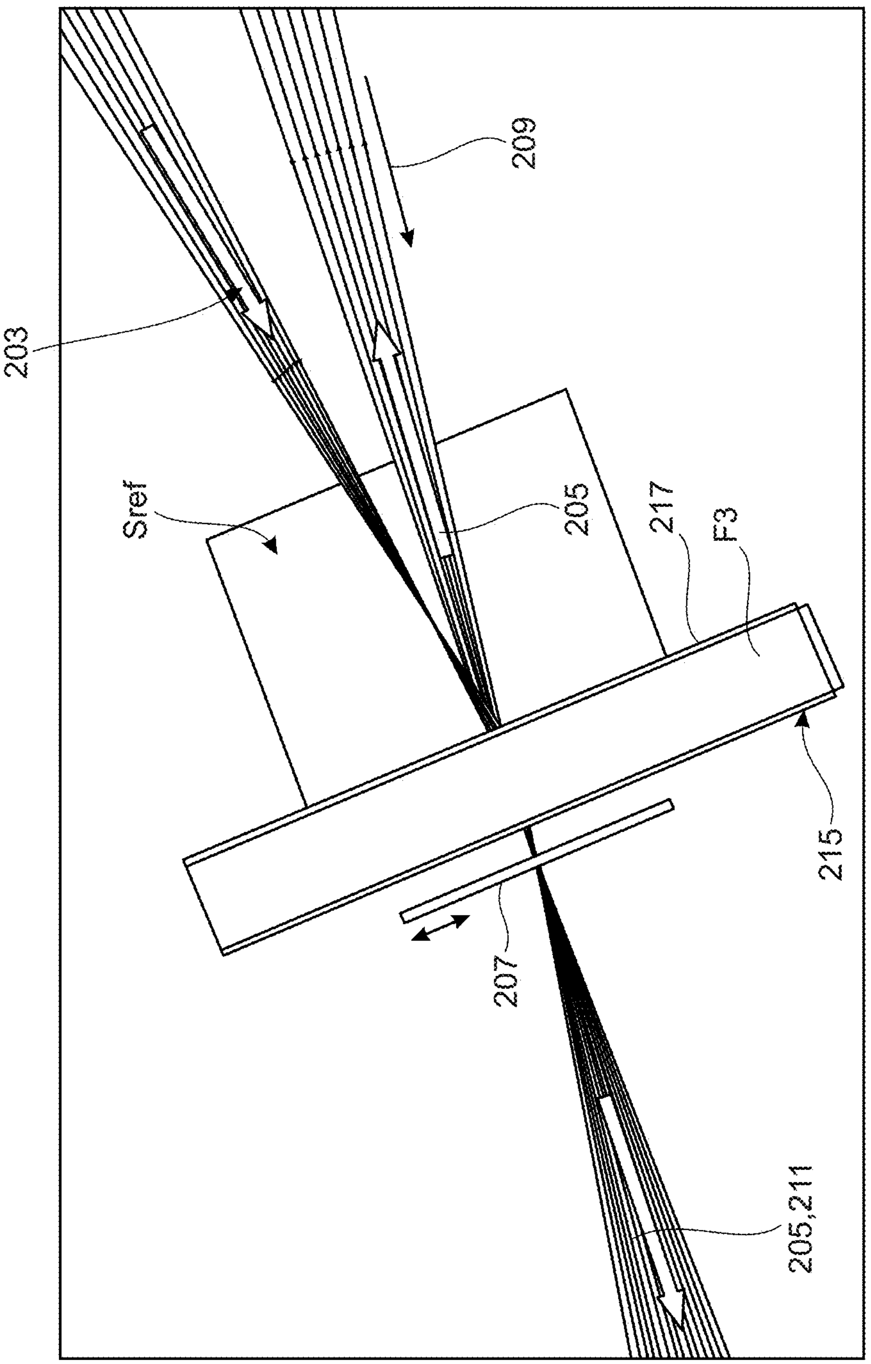
FIG. 4 illustrates functioning top view of the apparatus of FIG. 2.

As illustrated with regard to FIG. 4, the optical filter F3 has a first surface 215 facing the grating and a second surface 217 facing the sample and the reference sample Sref, which is arranged below the first laser beam 203 and the first Raman beam 205 in the view of FIG. 4. The first surface 215 of the optical filter F3 includes an AR coating (anti-reflection coating) and the second surface 217 is reflective for the first portion of the laser beam 203 and the second portion of the laser beam. The second portion of the laser beam 209 (see FIG. 3) is not shown in FIG. 4, as the second portion of the laser beam 209 is below the first portion of the laser beam 203 in the view of FIG. 4. The second surface 217 is furthermore transmissive for at least a range of wavelengths in the first and second spectrum beams 205, 211, so that the first and second spectrum beams 205, 211 can pass through the optical filter F3.

In some embodiments, the reference sample $S_{ref}$ is arranged on the second surface 217 of the optical filter F3. Therefore, the second portion of the laser beam 209 can be blocked by the second surface 217 from entering the spectrometer of the apparatus. As explained before, the first portion of the laser beam 203 is reflected by the second surface 217 of the optical filter F3 and incident on the sample, while the first portion of the laser beam 203 is bypassing the reference sample $S_{ref}$. Thus, the first portion of the laser beam 203 is not incident in the reference sample $S_{ref}$.

In some embodiments, the optical system includes an optical slit 207, which is in contrast to the exemplary embodiment of FIGS. 1*a* and 1 *b* not arranged on a surface of the optical filter F3, but it is implemented as a separate optical part which is a distance away from the optical filter F3 and arranged between the optical filter F3 and the grating. In some embodiments, the optical slit 207 is spaced at a distance in the range between 0 mm and 2.0 mm from the optical filter F3. In some embodiments, the optical slit 207 is spaced at a distance in the range between 0 mm and 2.0 mm from the first surface 215 of the optical filter F3. For example, the distance may be 1.0 mm or 1.5 mm or any other value in the mentioned range.

Figure 6:
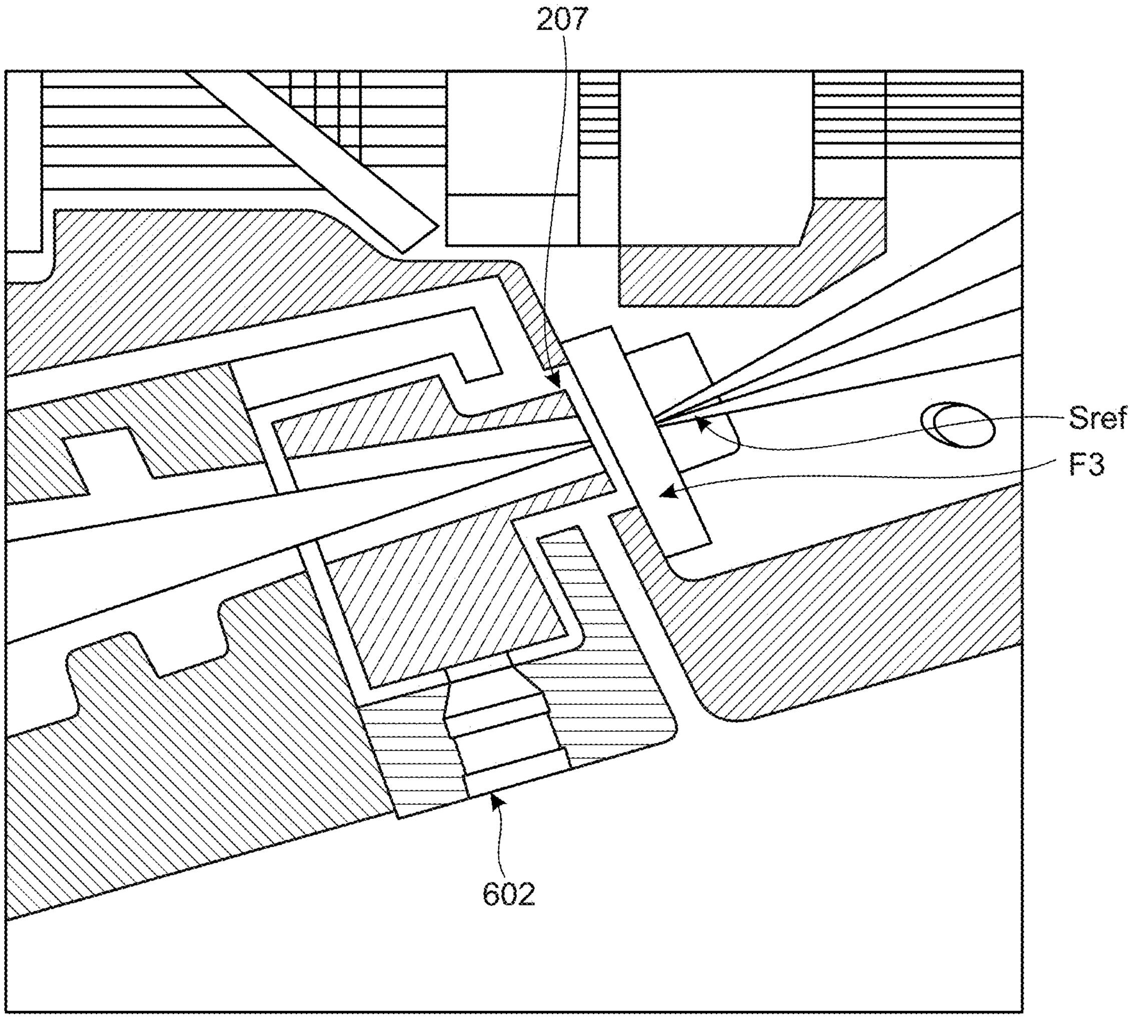
FIG. 6 illustrate the possibility of an independent alignment of a slit used in an exemplary apparatus for carrying out spectroscopy.

In some embodiments, the optical element forming the optical slit 207 is movable such that the optical slit can be aligned in at least one direction in a plane perpendicular to an optical axis of the optical system. The optical element that forms the slit can for example be placed on a translation stage or on a slit mount 601 as shown in FIG. 6. The translation stage or slit mount may be moved in a plane, which is in substance perpendicular to the beams. Therefore, during the manufacture of the apparatus, the slit 207 can be aligned in order to optimize or improve the functioning of the apparatus. The optical element that forms the slit may be a plate having a slit in its center. The plate may be a metal plate. The plate may be blackened. During operation of the apparatus, the position of the slit 207 may be fixed. For example, after alignment of the slit during manufacture, the position of the slit is secured, for example by gluing the adjusting screws of the translation stage used to adjust the position of the slit.

Figure 5:
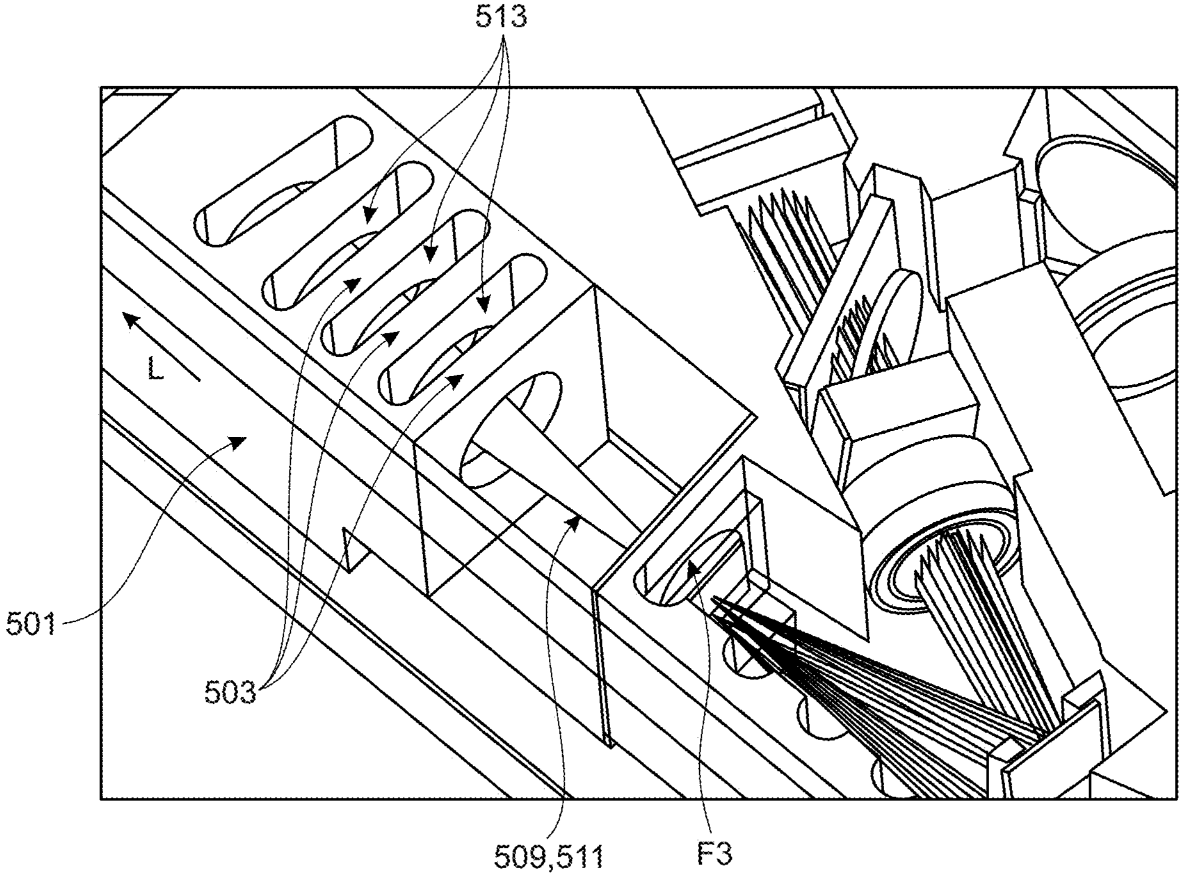
FIG. 5 shows a perspective view of a portion of the apparatus of FIG. 2.

In some embodiments, the optical system includes as shown in FIG. 5*a* set of optical apertures 501. The set of optical apertures 501 includes apertures 503 that are arranged between the grating (not shown in FIG. 5) and the optical filter F3 in a staggered relationship as viewed in a longitudinal direction. Thus, the apertures 503 are spaced from each other in the longitudinal direction L. In some embodiments, the apertures are equally spaced from each other in the longitudinal direction. Each aperture includes a disc-shaped body 505 and a central opening 507 in the disc-shaped body 505. The openings 507 of the apertures 503 are aligned with each other in the longitudinal direction L, so that the first and second Raman beams 509, 511 can travel through the openings on their way to the grating. A diameter of all openings 507 can be the same. In some embodiments, the diameter of all openings may differ from one another. In some embodiments, the diameters of the openings 507 can be individually adapted to the respective diameters of the Raman beams 509, 511 at the position of the respective apertures 503 and their openings 507. In some embodiments, the diameter of an opening 507 may be by a defined factor, such as a factor between 1 and 2, or between 1.5 and 2, larger than the diameters of the Raman beams 509, 511 in the plane of the respective opening 507. The Raman beams 509, 511 can be assumed to be Gaussian beams for which the diameter can be easily calculated.

As shown in FIG. 5, the set of apertures 501 can be manufactured from a single block, for example a metal block, by manufacturing slots 513 in the material block to form the disc-like bodies 505 of the apertures 503 and by machining a hole in the metal block that forms the openings 507. The disc-shaped body 505 or the material block can be blackened in order to absorb radiation. Thereby, stray light in the optical system can be reduced or blocked by the set of apertures 503. The material block may be arranged fixedly in the optical system.

The term "store," "stored," "storing," or any variation thereof may refer to saving data in any computer readable medium.

The term "computing device" as used herein includes mobile, portable, and/or handheld devices, including but not limited to laptops, tablets (including medical grade tablets), smartwatches and other wearable devices, mobile telephones, and smartphones. The term "computing device" may also include a computer such as a desktop computer, or server.

Although particular features have been shown and described, it will be understood that they are not intended to limit the claimed invention, and it will be made obvious to those skilled in the art that various changes and modifications may be made without departing from the spirit and scope of the claimed invention. The specification and drawings are accordingly to be regarded in an illustrative rather than restrictive sense. The claimed invention is intended to cover all alternatives, modifications and equivalents.

APPENDED MATERIALS

Optics Miniaturization Strategy for Demanding Raman Spectroscopy Applications

Abstract

Raman spectroscopy provides non-destructive, label-free quantitative studies of chemical compositions at the microscale as used on NASA's Perseverance rover on Mars. Such capabilities come at the cost of extremely high requirements for instrumentation.

Here we present a centimeter-scale miniaturization using cheap non-stabilized laser diodes, densely-packed optics, and non-cooled small sensors, while the performance is comparable with expensive bulky research-grade Raman systems. It has excellent sensitivity, low power consumption, perfect wavenumber, intensity calibration, and 7 $cm^{-1}$ resolution within the 400-4000 $cm^{-1}$ range using a built-in reference. We present solutions to Raman miniaturization challenges: laser temperature and power stabilization, reduction of sensor dark noise, compensation on pixel-to-pixel quantum efficiency variation, laser optical isolation and high spectral resolution. Moreover, shifted-excitation Raman difference spectroscopy (SERDS) and spatially offset Raman spectroscopy (SORS) functions are compatible.

High performance and versatility are demonstrated in use cases including quantification of methanol in beverages, in-vivo Raman measurements of human skin, quantification of p-coumaric acid and serine in bacterial fermentations, chemical Raman mapping at sub-micrometer resolution, quantitative SERS mapping of the anti-cancer drug methotrexate and in-vitro bacteria identification by Raman mapping. We foresee that the miniaturization will allow realization of super-compact Raman spectrometers for integration in smartphones and medical devices, democratizing Raman technology.

Main

The discovery of the Raman effect in 1928 has not only aided to the fundamental understanding of the quantum nature of light and matter interaction, but has also opened up completely novel areas of optics and spectroscopic research that has accelerated greatly during the last decade. The utility of Raman spectroscopy has been demonstrated for a diverse and wide range of biological, biomedical and chemical applications, such as chemical imaging of living cells and tissues[1], stem cell[2] and cancer research[3], bacterial identification[4-7], chemical hazards and illicit substances detection[8], as well as food and product authentication[9], and with a great deal of interest and research into its potential for disease diagnosis in the laboratory[10-12] and in-vivo[13-16]. Raman spectroscopy has been developed into a variety of methods and experimental realizations, such as confocal Raman microscopy, Raman endoscopy, spatially offset Raman spectroscopy (SORS), resonance Raman spectroscopy, and surface enhanced Raman spectroscopy (SERS). The listed Raman spectroscopy and microscopy methods are non-destructive, label-free, non-invasive, and capable of providing 3D molecular sensing with depth profiling. Such capabilities, however, come at the cost of extremely high requirements for instrumentation: i) the used laser should have stable wavelength and stable high optical power, ii) the spectroscopic sensor should have low noise, and iii) the spectrometer's optics should have a large clear aperture. Therefore, Raman spectroscopy and microscopy applications that require high spectral resolution and sensitivity would normally need to be performed on high-end, bulky, and costly Raman instruments. The need for miniaturization of Raman instrumentation is driven by applications where the complexity and/or the bulkiness of existing devices is obstructive. Application examples in need of miniaturization include space exploration[17-19], on-site toxic substance inspection[20-22], in-vivo diagnostics of tissues[23,24], chemical identification in hardly accessible places using robots[25] and drones, and Raman device integration into robotic arms for biomedical applications[26-28].

Multiple optics miniaturization strategies for Raman spectrometers have been proposed within the last decade. More conventional solutions are based on bulky dispersive optics, that require the presence of a slit or a pinhole and a grating or a prism as a dispersion element. Here, the miniaturization comes at the cost of e.g. reduced spectral range and resolution, reduced confocality (mostly relevant for microscopy applications) and sensor sensitivity[29]. On-chip spectrometers have the potential to offer dramatic size, weight, and power reductions compared to bulky optics-based instruments[30]. Multiple extra-compact on-chip spectrometer concepts have been proposed[31]. For example, on-chip dispersive spectrometers based on Echelle gratings[32], planar concave gratings[33] and arrayed waveguide gratings[34-37] provide low-cost solutions for on-chip spectral analysis using visible and near-infrared light. However, when applied to high-resolution spectrum acquisition, these devices suffer serious signal-to-noise ratio (SNR) penalties as a result of spreading the input light over many spectral channels. Furthermore, the device footprint and system-level complexity increase linearly with the number of spectral channels, since the spectral resolution scales inversely with the optical path length (OPL) and each channel requires a dedicated photodetector.

Unlike dispersive spectrometers, Fourier transform (FT) spectrometers overcome the trade-off between SNR and spectral resolution benefiting from the multiplex advantage, also known as Fellgett's advantage[38]. Traditional benchtop FT spectrometers use moving mirrors to generate a tunable OPL, a design not readily amenable to planar photonic integration. On-chip FT spectrometers instead rely on thermo-optic or electro-optic modulation to change the OPL in a waveguide. However, this concept suffers from poor scaling because the number of spectral channels is equal to the number of switches and photodetectors.

On the other hand, on-chip digital FT spectrometry could support high-resolution spectra and high SNR via time-domain modulation of a reconfigurable Mach-Zehnder interferometer[39]. This approach requires only a single-element photodetector rather than a linear detector array, which reduces cost and system complexity. However, digital FT spectrometry has only been demonstrated in a very narrow spectral range[39] that limits its applicability in Raman spectroscopy applications.

A promising on-chip Raman spectrometry concept is CMOS based hyperspectral (HS) filter technology. The HS filter technology is already used in various commercially available HS cameras for imaging applications in the VIS-NIR (470-900 nm), NIR (600-970 nm) and SWIR range (1100-1700 nm) to study the reflectance or transmission spectra of imaged targets. However, existing proof of concept experiments in the field of Raman spectroscopy demonstrate low spectral resolution (2.4 and 3.0 nm) which significantly limits the application areas[40]. Moreover, HS filter technology has significantly lower Raman signal throughput in comparison with dispersion-based approaches due to reduced transmittance of Fabry-Pérot narrow-band optical filters applied on top of the sensor pixels. Another limitation comes from the need to illuminate a much larger sample area while maintaining equal laser power density in order to reach a sensitivity comparable to dispersion-based spectrometers. This happens since each pixel on the HS sensor collects signals from a different area on the sample. In particular, it could lead to sample overheating and/or significantly increased fluorescence level for Raman spectroscopy-based studies on fluorescent materials similar to wide-field Raman microscopy[41,42].

Another promising concept is based on spatial heterodyne Raman spectrometry (SHRS)[43,44]. This technology has not yet been realized on-chip, nevertheless, existing prototypes demonstrate research grade performance in terms of spectral range (50-3300 $cm^{-1}$), resolution (5-9 $cm^{-1}$) and SNR[44]. Here, high resolution can be realized without using long focal length dispersing optics. Therefore, it is possible to use monolithic construction techniques to make a compact and robust device. SHRS could be an ideal candidate for an optics miniaturization strategy in many aspects, except for issues related to increased level of stray light and non-confocality in comparison with slit/pinhole-based dispersion spectrometers.

Due to the mentioned drawbacks of emerging technologies, challenging Raman spectroscopy and microscopy applications are still relying on conventional bulky dispersion optics. Here, we can select between miniaturization concepts based on reflective[45-47] and transmission gratings[29,48]. Designs based on reflective gratings could be as compact as 17×15×8 $mm^3$ [49], however they suffer from low spectral resolution (>90 $cm^{-1}$)[49]. A relevant compromise could be found by using a spectrometer footprint of around 40×42×24 $mm^3$ that provides spectral resolution of around 25 $cm^{-1}$ within a spectral range of 200-2000 $cm^{-1}$ [49]. Raman spectrometer designs based on transmission Bragg gratings benefit from higher throughput (up to 97% of diffraction efficiency in broad NIR range), alignment robustness and minimized stray light in comparison with reflective gratings[50]. On the other hand, existing reflective and transmittance grating designs use a line or imaging sensor with a typical pixel size between 10-20 μm. Such sensors should have 1000-2000 pixels in dispersion domain in order to cover a relevant Raman shift range between 400 to 2000 $cm^{-1}$. This leads to a typical sensor length of 12 to 28 mm[29,48] which can be another limitation for spectrometer miniaturization. It is important to mention that larger pixel size (typically more than 12 μm) of CCD and CMOS sensors results in increased dark noise collected by the sensor, therefore, sensor cooling down to at least +5° C. is recommended in order to reach high sensitivity during collection of weak Raman signals[51,52]. Another important problem that limits the sensitivity of Raman measurements is caused by variation of quantum efficiency (QE) of the individual pixels, which usually is at the level of 0.1-0.5%[53,54]. Unfortunately, pixel-to-pixel QE variation is not static in time and cannot be compensated via postprocessing for a long period of time[53]. This problem can be successfully solved via full vertical binning over the pixels of the imaging sensor[55], however, it would require deep cooling of the imaging sensor to avoid an increase of dark noise summed up from many pixels in vertical arrays. The here listed problems significantly limit miniaturization possibilities if a high Raman spectrometer performance should be maintained.

Miniaturization of Raman systems includes size-reduction of (i) spectrometer, (ii) Raman beam delivery path, (iii) laser beam delivery path, (iv) beam splitting unit and (v) sampling optics. Thus, besides the spectrometer, miniaturization also impacts the choice of lasers. In particular, proper operation of diode lasers requires accurate temperature stabilization of the active element[56] and optical power stabilization[57]. Compromises on stabilization of these parameters lead to laser frequency drift, mode-hopping and power instability[56-60]. Additionally, diode lasers are also sensitive to the external optical feedback or back reflections of laser irradiation from laser beam delivery elements and sample[61-65]. This effect leads to increased laser power and wavelength instability and could even permanently damage the laser diode[66]. Therefore, laser diode requires optical isolation typically realized with Faraday rotator[67]. This is an expensive element which also limits miniaturization capabilities.

Existing Raman miniaturization strategies, suffer from one or more of the following issues: insufficient spectral resolution and/or spectral range, limited SNR, due to high level of sensor dark noise, pixel-to-pixel QE variation on sensor, poor confocality or depth sectioning, instability of laser wavelength and laser optical power, high laser optical feedback sensitivity, and high-power consumption. Here, we present a miniaturization strategy that allow us to solve the listed problems and create extra-compact Raman spectrometers and microscopes based on non-stabilized laser diodes, close-packed optics, and non-cooled small pixel size sensors. The achieved performance is comparable with research-grade Raman systems. Our proposed miniaturization concept is based on real-time calibration of Raman shift and Raman intensity using an in-built reference channel that collects the Raman spectrum of polystyrene located in the spectrometer. Implementation of a reference channel has been realized in UV-VIS absorption spectroscopy decades ago[68]. However, we are not aware of any successful realization of a reference channel in Raman spectroscopy. Existing approaches are usually based on placing a reference sample in the place where the laser beam delivery optical path is overlapped with the back scattered Raman signal. Typically, the reference material is located just before the sample probe (for example, a flat window or lens subassembly made of $CaF_2$)[69]. Such a realization makes it possible to calibrate the laser wavelength and intensity using a Raman peak of the reference sample. However, this method fails if the Raman spectrum of the measured material contains Raman peaks or fluorescence signal within the same spectral range as the reference sample. At such conditions real-time laser wavelength and intensity calibration is problematic—if at all possible. In our concept, the reference channel is independent of the main optical path, which eliminates any interference between reference and main Raman signal collection channels.

Here, we demonstrate miniaturization down to several centimeters, an achieved limit of detection (LoD) down to 0.07% of methanol in water-ethanol solution, a low power consumption of around 2 Watts, perfect wavenumber (±1.5 cm−1) and intensity calibration (±1%) combined with high spectral resolution of around 7 $cm^{-1}$ within the broad spectral range of 400-4000 $cm^{-1}$. The high performance and vast versatility offered by our strategy facilitate simple integration into various instruments and applications. As use case examples, we show applications within quality control of alcoholic beverages, quantification of nutrients and metabolites during bacterial fermentation, in-vivo measurements of human skin, therapeutic drug monitoring and in-vitro bacteria identification.

Results

Design and working principle. Optical scheme of the developed miniaturized Raman spectrometer is shown in FIG. 7. Here, a typical AlGaAs laser diode in a 05.6 mm TO package with Fabry-Pérot resonator at a central wavelength of 785 nm and a maximum power of 200 mW is used as a Raman source (L1). Laser spectral linewidth at half maximum (LWHM) is 0.2 nm which is sufficient to obtain a spectral pixel resolution of the miniaturized Raman system of 0.3 nm. The selected type of diode laser usually requires precise temperature stabilization for Raman spectroscopy applications to prevent laser wavelength drift and "mode hop". In order to avoid bulky, costly and high-power Peltier elements for temperature stabilization of the laser diode, we propose a concept that does not require laser wavelength stabilization at all. According to FIG. 7*a*, a collimated laser beam is split into two beams using prism (P1); first part of the split beam B1 is focused on a polystyrene sample that is glued to a special Raman edge filter F3 coated with an aluminum mask (the mask serves as a spectral slit), second part of the split beam B2 is focused on the slit and reflected from the Raman filter F3 towards the sample as beam B3 (FIG. 7*b*). As a result, two Raman spectra (main channel and reference channel) in the "fingerprint" range (400-2700 $cm^{-1}$) are simultaneously collected by NIR enhanced imaging CMOS sensor in the range 800-960 nm (FIG. 7*c*).

Raman beam delivery system consists of Raman probe L5, slit lens L4 and spectrometer (elements F3, L6, F4, Grating, L7, Sensor). The spectral slit size is 25 μm that zoomed down to 5.4 μm on CMOS sensor focal plane with binned pixel size of 4 μm. Imaging capabilities of L7 provide uniform resolution along the spectral dimension on CMOS sensor at diffraction limited spot size. This makes it possible to concentrate most of the Raman signal intensity into a single row on the CMOS sensor (FIG. 7*c*). Spectrometer is equipped with fused silica transmission Bragg grating with average efficiency in the first order of diffraction ~96% in the range 800-960 nm[70]. In combination with NIR coating for all optical elements, entire optical system has extremely high throughput from the sample to the detector ~92%. Listed features significantly boost sensitivity of miniaturized Raman spectrometer.

In order to cover a "high frequency" Raman range, we have added an extra AlGaInP laser diode with Fabry-Perot resonator L2 with a central wavelength of 675 nm, LWHM 0.2 nm and a maximum power of 200 mW. This additional laser L2 and the main laser L1 are switched on sequentially, providing two different Raman shift ranges with the same grating. The proposed approach makes it possible to collect in the "high frequency" Raman range by the same optical elements in the same spectral range 800-960 nm that is used for collection of the "fingerprint" range. This strategy allows us to maintain a high SNR for Raman spectra in "high frequency" range due to relatively high QE of the CMOS (60% at 840 nm, 40% at 940 nm) sensor in the range 800-960 nm[71]. The collimated beam from non-temperature-stabilized laser L2 is combined and coaligned with collimated beam from L1 by dichroic mirror D1. After D1, laser irradiation from L2 propagates through the same optical path as B1-B3 and targets the polystyrene sample on the slit $S_{ref}$ and sample of interest $S_{data}$. Finally, two Raman spectra of the main channel and the reference channel in the range of 2700-4000 $cm^{-1}$ are simultaneously collected by the imaging CMOS sensor (FIG. 7*d*). Therefore, the miniaturized Raman spectrometer is capable of collecting combined Raman spectrum in the range of 400-4000 $cm^{-1}$ reaching the performance typically associated with much larger, research grade systems.

Wavenumber and intensity calibration. Raw Raman spectra from the reference and main channel collected as a function of time are shown in FIGS. 7*e-i*. Time-lapse experiment clearly shows peak shift of polystyrene (reference channel) and polypropylene (main channel) caused by laser wavelength drift. Due to the fact that both reference and main channel were collected from the same laser source and acquired simultaneously by the imaging CMOS sensor, we could apply wavenumber calibration for each collected Raman spectrum in the main channel. Calibration is done by peak fitting of several prominent polystyrene peaks in the reference channel and correcting for their known position, with the same correction applied also to the main channel. The result for wavenumber calibration versus time is shown in FIG. 7*k*, demonstrating high and stable calibration accuracy (±2 $cm^{-1}$) using multiple peaks of polystyrene measured by the main channel. At the same time, FIG. 7*l* demonstrates that Raman intensities in the reference and main channels are correlated as well (black and red curves). Therefore, it is possible to normalize main channel for laser power fluctuations during each spectrum acquisition (blue curve in FIG. 7*l*). This feature provides an excellent solution for quantitative Raman spectroscopy applications where laser intensity monitoring is required to reduce concentration determination error[72].

"Mode hop" deconvolution. The described wavenumber and laser intensity calibrations fail if a fast laser wavelength change occurs due to laser "mode hop." In this case, even at short exposure times (<0.2 sec), spectra will be collected at reduced spectral resolution and decreased peak intensity because the energy is spread over several individual pixels. Nevertheless, this problem can be solved by spectral deconvolution of the main channel based on the known spectral profile of the Raman spectrum of polystyrene in the reference channel (See section S1 of Supplemental Text, FIGS. 44-49). FIGS. 15*a-d* demonstrate that the deconvolution procedure significantly helps in recovering the original spectral resolution and Raman intensity during a "mode hop" process.

Spectral deblurring. Pixel limited spectral resolution of miniaturized Raman spectrometer is 5.6-3.4 $cm^{-1}$ in the range of 400-2000 $cm^{-1}$ (from laser excitation at 785 nm) which corresponds to the optimal slit size ~18 μm. Nevertheless, we decided to increase the actual slit size up to 25 μm for increased signal throughput, which transfers into the calculated spectral resolution of 10.2-5.8 $cm^{-1}$. Deviation from diffraction limited optics design would lead to even worse resolution. However, it is possible to measure the spectral apparatus function of the entire Raman system and compensate on it using deblurring methods[73]. Raman spectrum of diamond with natural linewidths of around 1.8 $cm^{-1}$ was used for the determination of the spectral apparatus function[74] (FIGS. 17-19). The result of spectral deblurring is shown in FIGS. 20-22, see section S2 of Supplemental Text. FIG. 7*m* illustrates improvements in terms of spectral resolution after correction on "mode hop" and spectral deblurring (black curve: before corrections, red curve: after corrections) demonstrating final high spectral resolution ~7 $cm^{-1}$ in worst case scenario.

Shifted-excitation Raman difference spectroscopy (SERDS). Laser wavelength drift, that is compensated with the use of the reference channel, but still is present due to laser instability, can be used for fluorescence subtraction similar to SERDS[75]. The method is based on the fundamental difference between Raman and fluorescence properties with regards to the wavelength shift of the excitation source. It is based on the fact that the fluorescence spectrum position is independent from the shift of the excitation wavelength, whereas the Raman spectrum is shifting along the shift of the excitation wavelength. This enables us to distinguish between Raman and fluorescence spectra. Typically, a dual- or tunable laser source is required for SERDS[76]. In our device, a non-stabilized laser automatically provides a gradual wavelength shift due to the laser body heating during operation. FIGS. 7*n*, 7*p* show shifted-excitation Raman spectra of polypropylene at different time points from the experiment in FIGS. 7*f*, 7*i*. Here, we applied SERSD algorithm[76] for fluorescence profile restoration. FIGS. 7*o*, 7*q* demonstrate fluorescence free Raman spectra (red curves) obtained after subtraction of resolved fluorescence profiles (green curves) from initial Raman spectra (black curves). Hereby we demonstrate that a non-wavelength-stabilized laser source can also be used for efficient fluorescence subtraction via SERDS if the device has a reference channel to compensate a wavelength shift in the Raman spectrum.

These multiple pre-processing techniques have been developed in order to realize a miniaturized Raman spectrometer, relying on the presence of a built-in calibration channel. The resulting device provides a (i) fluorescence-free, (ii) "mode hop"-free, (iii) laser power fluctuations-free Raman spectrum in the range 400-4000 $cm^{-1}$ with a spectral resolution ~7 $cm^{-1}$ (FIGS. 7*g*, 7*j*). Device control and data transfer can be performed by wire or wirelessly with software installed on smartphone/tablet or PC.

Sensor dark noise. The sensitivity of the Raman spectrometer strongly depends on the dark noise of the detector. Due to the weakness of the Raman signal, most of spectrometers are equipped with cooled linear or imaging sensors with relatively large pixel size (12-25 μm). Sensor cooling reduces the dark noise whereas large pixel size allows one to collect more photons maintaining high resolution at the same time[77]. Nevertheless, this is a high power demanding and bulky approach. As a solution towards miniaturization without significant compromise on sensitivity, we implemented a CMOS sensor with a small binned pixel size of 4 μm and managed to compress the signal from the Raman spectrum into a single row on the sensor using high numerical aperture (NA) imaging lens L6 (FIG. 8*a*). Signal compression allows us (i) to maximize SNR per pixel and (ii) avoid averaging of additional rows with unwanted additional dark noise. This is illustrated in an experiment where equal amount of total intensity of SERS signal was distributed over 20 rows on the CMOS sensor (FIG. 8*b*). Comparison of SERS spectra of trans-1,2-bis(4-pyridyl) ethane (BPE) in FIGS. 8*c*, 8*d* highlight 3 times higher SNR when the SERS signal is compressed into a single row.

Pixel QE variation. The fact that miniaturized Raman spectrometer uses non-wavelength-stabilized laser allows us to compensate on another sensitivity-limiting factor which is pixel-to-pixel QE variation of the spectroscopic sensor (FIG. 8*e*)[53,54]. FIG. 8*f* represents a fluorescence spectrum from a glass cover slide excited by a laser with an excitation wavelength of 785 nm obtained after averaging of 10 repetitions. It is visible that the spectral profile of fluorescence contains noise-like spikes. This "noise" is always present no matter how long a spectrum is collected or how many repetitions are applied because it represents pixel-to-pixel QE variation. However, once the reference channel-based wavenumber calibration is applied, pixel-to-pixel QE variation is significantly reduced (FIG. 8*g*). It happens because each spectrum wavenumber corresponds to a different pixel in the sensor row when the laser wavelength is shifted. As a result, pixel-to-pixel QE variation is averaged out over the pixels in the same row.

Laser optical isolation and SORS. Typically, laser diodes with Fabri-Pérot resonator require expensive optical isolation based on the Faraday effect[67]. A less complex solution may be based on laser polarization rotation via quarter waveplate; however, it provides reduced attenuation of the back reflected signal (<20 dB)[78]. Here we implement an off-axis laser beam delivery approach that (i) avoids laser back reflections targeting the laser aperture and (ii) boosts miniaturization capabilities (FIG. 8*h*). In addition to laser optical isolation, off-axis laser beam delivery supports Spatially offset Raman spectroscopy (SORS) conditions that allow us to avoid unwanted fluorescence contribution from out-of-focus layers inside the sample[79]. Effectively, it spatially separates contribution from out-of-focus regions and in-focus signal on the imaging sensor. FIG. 8*i* shows our miniaturized Raman spectrometer measuring whiskey content through the glass bottle. In order to demonstrate SORS performance we performed two experiments: with the laser beam aligned on-axis (black curve) and off-axis (red curve) (FIG. 8*j*). Black spectrum clearly demonstrates SORS benefit to avoid the contribution of fluorescence from the glass bottle (see movie 1).

Application I: Quantification of toxic methanol in vodka. In order to demonstrate the sensitivity and quantification performance of our miniaturized Raman spectrometer we performed measurements of vodka samples with different concentrations of methanol (see FIGS. 23-26, the tables of FIGS. 44-45). The raw Raman spectra of water-ethanol solutions with different concentrations of methanol (variation between 0-40%) in the range 400-2300 $cm^{-1}$ and 2750-4000 $cm^{-1}$ are shown respectively in FIGS. 8*k*, 8*n*. Results of PLS calibration for methanol quantification demonstrate LoD=0.07%, and LoQ=0.25% (FIGS. 8*l*-8*p*). To the best of our knowledge, the lowest previously reported LoD that was obtained by research grade Raman spectrometer with deep cooling CCD was 0.23-0.39%[80]. However, according to European regulations, methanol concentration in vodka products should be below 0.5%[81]. This means that LoD should be below 0.1% to perform routine methanol quantification through the bottle with vodka. Now, such methanol control becomes possible with our highly sensitive miniaturized Raman spectrometer.

Application II: Quantification of nutrients and metabolites during fermentation. In industrial production of chemicals by microbial fermentation, the volumes of bioreactors and production costs are often very large, and the reproducibility and the quality of the products are crucial features that must be ensured at all times. In the pharmaceutical field, for instance, regulatory agencies have been encouraging manufacturers to innovate in the field of process control and monitoring to ensure a sufficient product quality, as demonstrated by the introduction of the Process Analytical Technology (PAT) framework by the U.S. Food and Drug Administration in 2004[82]. The PAT framework outlined a strategy for a continuous control of manufacturing processes through the monitoring of critical process parameters and critical quality attributes to ensure that the product is safe and effective. The concept of continuous process monitoring is also part of the Quality by Design (QbD) paradigm, which approaches the process validation through a continuous improvement of the manufacturing process[83]. Since a continuous control of the fermentation process is demonstrated to lead to a better product quality, monitoring and controlling tools are being continuously explored and improved. These tools include probes for temperature, pH, dissolved gases and organic carbon, and spectroscopic probes, also including Raman probes[84,85].

Besides commercial devices recently developed for monitoring of nutrients and metabolites through Raman[86,87], several examples of on-line and off-line Raman process monitoring of industrial fermentation of bacteria, fungi and mammalian cells[88] have been reported in literature over the last years. Nutrients, metabolites and by-products have been monitored to gain better knowledge of the fermentation process and to control the feeding strategy[89-91]. The yield of metabolites of interest has been predicted with the aid of complex modeling systems, as in the case of glycoproteins produced by Chinese hamster ovary[92], or, in fewer cases, with direct detection of a strongly Raman active compound[93].

We used miniaturized Raman spectrometer to perform off-line quantification of pHCA produced during *E. coli* culture, directly measuring the Raman signal of liquid samples of bacterial supernatant (FIG. 9*g*). Calibration samples were collected for pHCA, glucose, $MgSO_4$ and $Na_2HPO_4$, (FIG. 9*a*, FIG. 27, the table located at FIG. 46) which were found to be the main contributions to the supernatant spectra at the beginning (black curve) and the end (red curve) of fermentation process (FIG. 9*b*). By applying the PLS calibration model to real supernatant samples, the concentration of pHCA was found to increase, whereas glucose decreased over time, as also confirmed by the close correlation with HPLC results (FIGS. 9*d*, 9*e*). Also MgSO4 and Na2$HPO_4$ were consumed over time (FIG. 9*f*), although no additional technique was used to validate Raman quantification in this case. Presented results demonstrate extremely high sensitivity of miniaturized Raman spectrometer with LoD for pHCA around 0.01 g/L and LoD for glucose around 1 g/L. To the best of our knowledge, the lowest previously reported LoD for glucose that was obtained by research grade Raman spectrometer with deep cooling CCD was around 0.55-8 g/L[94,95]. It is important to mention that due to real-time laser intensity calibration and pixel-to-pixel QE compensation implemented in the miniaturized Raman spectrometer we managed to obtain pHCA and glucose quantification error comparable with HPLC (FIGS. 9*d*, 9*e*). The presented acquisition method could be applied to more complex cases, such as the quantification of products and nutrients in tank fermentation, and, together with SERDS strategy for fluorescence reduction, could represent a high performance, compact and affordable solution for real time, at-line monitoring of bacterial fermentation. As an example, multiple miniaturized Raman spectrometers could be installed at different tank locations (top, middle and bottom) to monitor fermentation processes more efficiently. FIGS. 9*h*, 9*i*, 28, and the table at FIG. 47 demonstrate quantification of Serine produced during *E. coli* culture, directly measuring the Raman signal of liquid samples of bacterial supernatant. Here, Raman spectra contained significant fluorescence background (FIG. 9*c*), however, we still were able to get quantification error comparable with HPLC[96] (FIGS. 9*h*, 9*i*).

Figure 9N:
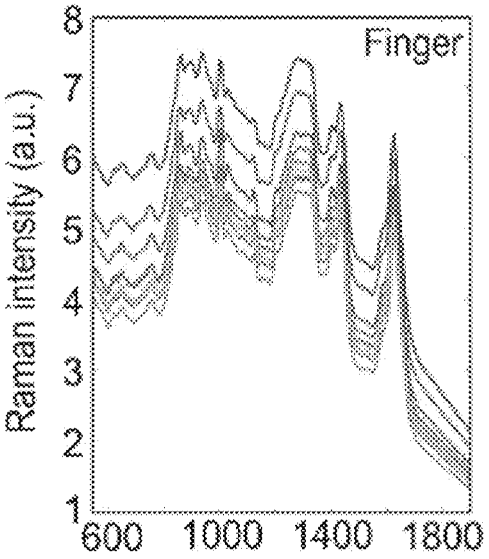
Figure 9O:
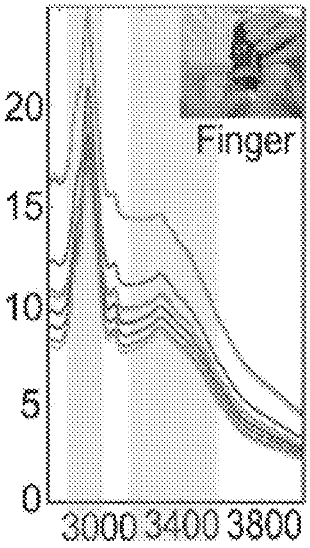
Figure 9P:
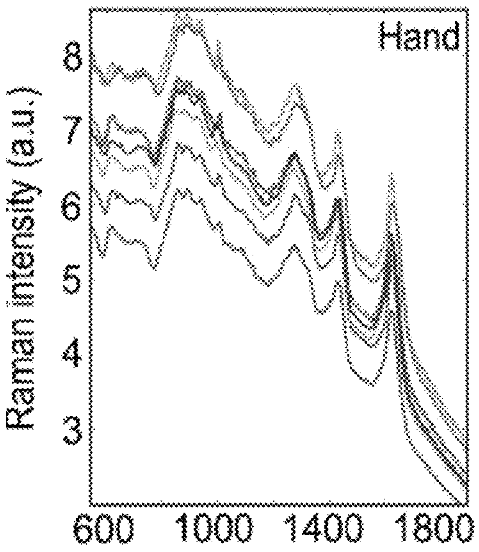
Figure 9Q:
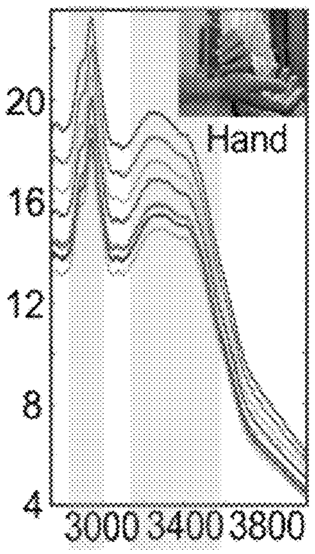
Figure 9R:
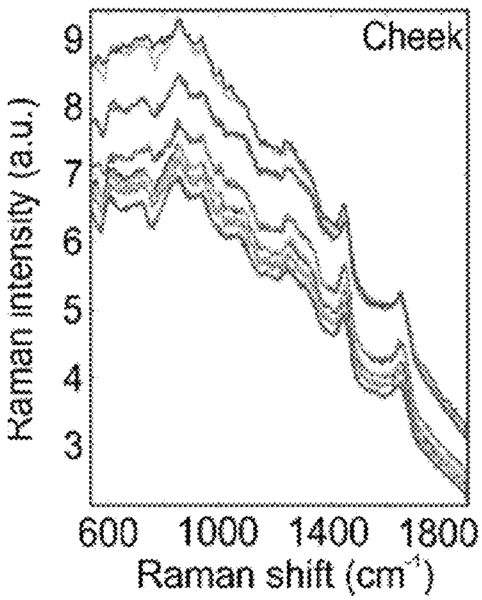
Figure 9S:
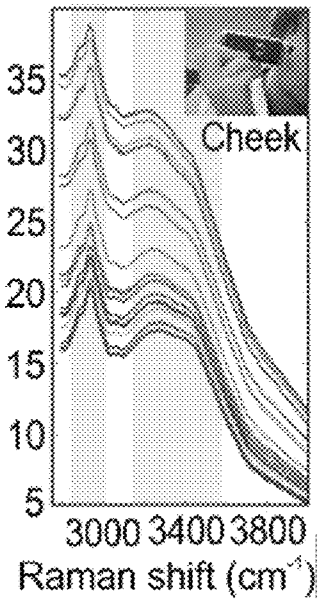

Application III: in-vivo skin measurements. In-vivo skin measurements are typically associated with complex Raman instrumentation that requires a deep cooling sensor due to the low Raman cross section of skin, especially at a depth of more than 100 μm[97,98]. Additionally, in-vivo skin measurements require the development of an immersion probe with high NA that can provide a small laser spot size in depth of tissue. A small laser spot size will improve the ratio between Raman and fluorescence signal. This happens due to a non-linear saturation of the fluorescence signal and a linear growth of the Raman signal when the laser power is increased[99]. Moreover, it is preferable to produce the last optical element of the probe from fused silica. This will generate optimized conditions for laser/Raman beam propagation in/out of the stratum corneum skin layer and provide a matching of the reflection index between the last optical surface of the probe and the skin media[97]. An extremely compact version of a skin probe is shown in FIGS. 9*j*-9*k*. Our probes can be optimized for skin measurements at different depths; between 0 to 150 μm. When our miniaturized Raman spectrometer is equipped with this probe, we were able to collect Raman spectra of skin at a depth of 10-20 μm with SNR better than 500:1 (1 sec exposure time, 5 repetitions). Typical application examples on studying anti-sun cream penetration and water content are shown in FIGS. 9*n*, 9*p*, 9*r* respectively. FIGS. 9*n-s* demonstrate Raman spectra obtained from two lasers (785 and 675 nm) at different skin areas (finger, hand and cheek). Water content difference at different skin areas could be clearly seen by intensity ratio of CH (2800-3000 $cm^{-1}$) and OH (3100-3500 $cm^{-1}$) bands. Compared to similar previous experiments[97,98] our in-vivo Raman measurements of skin seem to have unprecedented high SNR (500:1, 1 sec exposure time, 5 repetitions). We believe that the presented instrumentation could be applied for numerous in-vivo applications in the future including (i) skin disease diagnostics, (ii) skin aging, (iii) determination of molecular concentration profiles from the skin surface into the dermis, (iv) measuring of the distribution of intrinsic skin constituents (amino acids sweat constituents, lipids, proteins, water), (v) skin penetration and permeation of topical formulations, (vi) distinguishing of the difference between volar forearm skin, cheek, forehead, scalp, axilla, and other.

The optical design of our miniaturized Raman spectrometer allows confocal measurements because it utilizes a cross slit confocality concept[99] as shown in FIGS. 10*a*, 10*b*. This feature helps to separate out of focus layers, which is beneficial for typical handheld Raman applications where the contribution from sample packaging or glass needs to be minimized. However, cross slit design also allows us to target confocal Raman microscopy applications when the device is additionally equipped with a three-dimensional motorized stage and a white light microscopy module (FIG. 10*c*). The lateral resolution of our miniaturized Raman microscope was tested on polystyrene beads with a 1 μm diameter (FIG. 10*d*). Axial resolution was tested on the surface of a SERS substrate with BPE analyte at a concentration 100 μM (FIG. 10*e*). Cross sections in lateral and axial dimensions are represented in FIG. 10*f*. They demonstrate a lateral resolution of around 1 μm and an axial resolution of around 2 μm, indicating a diffraction limited performance in both dimensions. To the best of our knowledge, the presented miniaturized Raman microscope is the smallest reported confocal Raman system that has been designed without compromising on basic performance. Below we present two challenging Raman microscopy applications that typically require research grade systems with deep cooling sensors.

Application IV: quantification of anti-cancer drug via SERS mapping. Therapeutic drug monitoring (TDM) can improve clinical care when using drugs with pharmacokinetic variability and a narrow therapeutic window. Rapid, reliable, and easy-to-use detection methods are required in order to decrease the time of analysis and can also enable TDM in resource-limited settings or even at the bedside. Monitoring methotrexate (MTX), an anticancer drug, is critical since it is needed to follow the drug clearance rate and decide how to administer the rescue drug, leucovorin (LV), in order to avoid toxicity and even death. It has been shown that nanopillar-assisted separation (NPAS) method using SERS mapping by research grade Raman microscope with deep cooling EMCCD allows to measure MTX in PBS in the linear range of 5-150 μM with LoD=5 μM, LoQ=25 μM[100]. Here, we also used NPAS method with SERS mapping of the SERS chip surface according to the methodology described in the original publication[100]. Typical SERS maps of SERS substrates measured by our miniaturized Raman microscope are shown in FIG. 10G; total measurement time per chip was around 15 mins with exposure time of 0.1 sec per spectrum. In total, 24 SERS chips were used in this study following the NPAS procedure (FIGS. 10*h*, 10*i*). Calibration samples of MTX diluted in PBS were prepared in the range 0-75 μM. SERS spectra of MTX obtained after the averaging of SERS signals collected by mapping of the chip surface are shown in FIG. 10*j*. Result of PLS calibration for MTX quantification is shown in FIGS. 10*k*, 101 demonstrating improved LoD=3 μM, LoQ=20 μM in comparison to previously reported data[100] (see FIGS. 29-39, the table located in FIG. 48).

Application V: in-vitro bacteria identification. The worldwide increase of antimicrobial resistance (AMR) is a serious threat to human health. To avert the spread of AMR, fast reliable diagnostics tools that facilitate optimal antibiotic stewardship are an unmet need. In this regard, Raman spectroscopy promises rapid label- and culture-free identification and antimicrobial susceptibility testing (AST) in a single step. It was recently shown that a Raman-based setup could distinguish bacteria on the species level with more than 96% accuracy when machine learning techniques were combined with a novel data-augmentation algorithm.[4] In the current study, we used our miniaturized Raman microscope to measure exactly the same bacterial isolates as in the previous publication, where a research grade Raman microscope with deep cooling CCD was used [30](FIG. 10*n*) following identical sample preparation procedures and data analysis (see FIGS. 40-41). Raman spectra of different bacteria obtained after the averaging of the Raman signal from Raman maps are shown in FIG. 10*m*. A total of four Raman maps were collected per single bacteria isolate: three maps contained regions with individual bacteria, and a fourth map was collected as a background (FIG. 10*p*). A confusion matrix of bacteria identification built as a result of machine learning data analysis of Raman maps of bacteria is shown in FIG. 10*q*. The data obtained with the mini-Raman system show an accuracy of bacteria identification that is comparable to previously reported results from a research-grade Raman setup (overall classification accuracy 98.6%).[4] However, here we have, thanks to the performance of the spectrometer, been able to reduce the exposure time down to 0.2 sec per spectrum in comparison to 1 sec and 10 repetitions per spectrum in our previous publication while maintaining comparable or higher SNR of raw Raman spectra of bacteria (FIGS. 40-41).

Discussion

Our proof-of-concept results in FIGS. 7*a*-7*q*, FIGS. 8*a*-8*j* demonstrate a solution to some of the most pressing problems related to Raman miniaturization. We show that the need for stabilization of laser temperature and power can be circumvented by integration of a reference channel. Additionally, our miniaturization strategy provides: a reduction of sensor dark noise, a compensation on pixel-to-pixel QE variation, a laser optical isolation and maintenance of a high spectral resolution. As an additional feature, our strategy brings forward valuable SERDS and SORS functions. Our basic strategy is centered around a built-in and real-time calibration of Raman shift and laser intensity, facilitated by multiple data processing algorithms. Many of these algorithms rely on information provided by the reference channel. With our strategy we have been able to miniaturize a Raman spectrometer down to several centimeters and have achieved excellent sensitivity (LoD down to 0.07% of methanol in water-ethanol solution), a low power consumption of around 2 Watts, perfect wavenumber (±1.5 cm−1) and intensity calibration (±1%) combined with high spectral resolution of around 7 $cm^{-1}$ within the broad spectral range 400-4000 $cm^{-1}$. The high performance and vast versatility offered by our approach facilitate simple integration into various instruments and applications.

Our proposed concept is currently limited with respect to spectrum registration in low frequency Raman shifts (below 400 $cm^{-1}$) due to laser wavelength drift that does not allow us to apply ultra-steep Raman edge filters close to the laser line. However, precise selection of the diode lasers with known laser wavelength drift versus operation temperature will allow us to apply ultra-steep filters in the next iterations of the system design. Another current limitation is the inability to use long exposures (more than a few seconds) because of spectrum blurring due to laser wavelength drift and high dark noise of the non-cooled sensor. This issue may be partially mitigated by repeated measurements and by applying mode hop deconvolution on smaller exposures with subsequent averaging. This also has the benefit of reducing pixel-to-pixel QE variation effects. However, for extremely weak Raman signals, it seems unpractical to apply very long effective exposure times by having many repetitions, due to dark noise of the sensor. Therefore, certain laser temperature stabilization time may be applied before measurements to be able to reach long exposure times without significant loss of resolution due to spectral mode-hop.

We have exemplified several use cases that all rely on challenging Raman spectroscopy. These include quantification of chemicals at low concentration (through glassware such as bottles or with the use of SERS), in-vivo skin measurements and in-vitro identification of bacteria (FIGS. 8*i*-8*p*, FIGS. 9-10). Application cases IV and V demonstrate that our miniaturized Raman microscope ideally suits for SERS mapping and bacteria mapping applications and provides advantages in key Raman microscopy requirements such as LoD, LoQ, mapping speed and mapping resolution, system size and affordability. Other potential use cases include (i) consumer level chemical characterization of pharmaceuticals, chemicals and food products in order to determine chemical purity and chemical composition, (ii) quality control of chemical products and kinetic monitoring of chemical processes in the industry, (iii) identification of drugs, explosives, toxic liquids and gases by the law enforcement and customs authorities as well as military. Additionally, the proposed technology could be effectively applied on drones, robots and even in space missions due to its small size and weight, low power consumption and autonomous calibration of Raman shift and laser intensity.

We foresee that further development of our technology will allow us to miniaturize the entire Raman model down to a size of 10×15×3 mm with a calculated spectral resolution of around 18 $cm^{-1}$ (FIGS. 42, 43). This size becomes very attractive for direct integration into smartphones as an in-built chemical analyzer. We believe that our concept can also be applied in different modifications of bulky dispersive Raman spectrometers, SHRS spectrometers and on-chip dispersive and FT spectrometers. This may boost optics miniaturization even further because all of the above mentioned concepts still rely on the need of wavelength and power stabilized lasers. In conclusion we see our miniaturization strategy as a facilitator for both miniaturizing and democratizing Raman spectrometers, making Raman spectroscopy more accessible to researchers as well as consumers.

Methods

Materials, Sample Preparation and Measurements.

Application I: Quantification of toxic methanol in vodka. Methanol, ethanol and water with the purity of 99.9%, 99.8% and 99.9% were used in this research (manufactured by Sigma-Aldrich, CAS Numbers 67-56-1, 64-17-5 and 7732-18-5, respectively). The temperature of the liquid samples was 25±0.4° C. The solution of vodka was prepared at concentration ratio 40:60 for ethanol and water. The concentration of components in the methanol-vodka solutions was changed from 0% to 40% of methanol (in volume %). Diluted samples at concentrations 0, 0.1, 0.25, 0.5, 1, 5, 10, 20, 40% with ±0.1% dilution error were prepared with the usage of Eppendorf Pipette Research Plus (volume 100-1000 μL). Each sample was stored in glass vials with a screw cap (volume 1.5 ml). The whiskey bottle used in the studies was produced by Johnnie Walker, Red Label. Whiskey contains 40% of ethanol. The thickness of glass bottle at the measurement area was ~2.7 mm.

Application II: Quantification of nutrients and metabolites during fermentation. Stock solutions of 100 mM pHCA and 100 mM CA were freshly prepared in EtOH 99%. For Raman calibration standards, pHCA was diluted in control supernatant (obtained from a non-pHCA producing *E. coli* strain (CBJ786)). In addition, for Raman and HPLC experiments the analytes were diluted in M9 medium. HCl 32% was used for acidification of samples and DCM as the organic phase for LLE. Stock solutions of 50 mM Phe and 50 mM Tyr were prepared in water and NaOH at pH ~14 respectively. *E. coli* strains (CBJ800, CBJ786, CBJ951, CBJ789), expressing TAL and PAL-encoding genes from IPTG-inducible promoters, were grown in M9 medium with 1% glucose, 2 mM Tyr and/or 2 mM Phe, 1 mM IPTG and antibiotics for maintenance of plasmids for 22 h as described in our previous work[101]. For quantification of pHCA produced by *E. coli*, bacterial supernatant samples were obtained from each strain by centrifugation (10 min at 10 000 g, 4° C.), and filtration through 0.2 μm filters. The concentration of pHCA in samples was measured with reversed-phase HPLC by separation on a HS-F5 column (Sigma-Aldrich, St Louis, MO, USA) with previously described mobile phases (ammonium formate buffer and acetonitrile), with an overall analysis time of approximately 15 min per sample[101]. The absorbance was measured at 333 nm for pHCA[102]. Aqueous solutions were prepared with ultra-pure water obtained from a Milli-Q purification system (Millipore Corporation, Billerica, MA, USA), and all the chemicals were purchased from Sigma-Aldrich (St Louis, MO, USA). For Raman determination of pHCA in bacterial supernatant, *E. coli* samples (CBJ 800), genetically modified to produce pHCA, were cultured in growth medium according to the methods described in our previous research[101,102]. Bacterial aliquots were centrifuged and filtered at 0, 1.5, 4.5, 6, 7.5, 9, 11.25, 23 and 26.5 h, with the purpose of monitoring the pHCA production and the nutrient consumption at several time points throughout the culture. The concentrations of pHCA and glucose were also determined through HPLC, with the methods described in our previous publication[101].

Raman measurements were carried out at fixed laser power on the sample of 100 mW (from laser excitation wavelength 785 nm) and 30 mW (from laser excitation wavelength 675 nm) A custom Raman probe with NA=0.08 was used in this study which provides an estimated laser spot size of around 10 μm on the sample. Each spectrum was averaged over 10 repetitions at an exposure time of 1 s each. A sample volume of 500 μL was poured into a glass vial with screw cap (volume 1.5 ml). The Raman signal of liquid samples was collected by focusing the laser beam in the middle of the vial through a bottom window, and each sample was collected in triplicates.

Application III: in-vivo skin measurements. Anti-sun cream Sollotion SPF30 produced by DermaPharm A/S was used in this study. Cream was applied on human palm that was previously cleaned with water-soup solution to avoid skin surface contamination by dust.

Microscopy test on PS beads. PS beads with size of 1 μm in the form of aqueous suspension were purchased on Merck (MDL number: MFCD00243243). Suspension was deposited on polished stainless-steel surface for Raman microscopy mapping.

Application IV: quantification of anti-cancer drug via SERS mapping. MTX (98% purity) was initially dissolved in 50 μL of 1 M NaOH, and 2 mM stock solution was prepared in phosphate-buffered saline (PBS), pH 7.4, which was aliquoted and stored at −20° C. until further use. The MTX stock solutions were used to freshly prepare standards in PBS. The MTX standard solutions in PBS was mixed with methanol (MeOH) in various concentration of MTX: 0, 5, 10, 25, 50, 75 μM. Solvents, chemicals, and samples were of analytical grade and purchased from Sigma-Aldrich (St. Louis, MO, USA). Fabrication of the AgNP SERS substrates and NPAS/SERS detection was described in our previous publication.

Application V: in-vitro bacteria identification. The bacteria were obtained from overnight on agar plate cultures which were sealed with parafilm and stored at 5° C. until sample preparation. Storage time varied, but was not found to result in spectral changes to strain or phenotype characteristics. All other sample preparation conditions were kept consistent between samples. Test samples were prepared separately from samples used for training, to ensure classification was not influenced by differences in sample preparation. To prepare samples for Raman measurement, a sample was simply transferred from a single colony directly to a sterilized CaF2 Raman-grade objective slide. Detailed description of sample preparation and data analysis can be found in our previous publication.[4]

REFERENCES

1 Pezzotti G. Raman spectroscopy in cell biology and microbiology. J Raman Spectrosc 2021; 52: 2348-2443.

2 Downes A, Mouras R, Bagnaninchi P, Elfick A. Raman spectroscopy and CARS microscopy of stem cells and their derivatives. J Raman Spectrosc 2011; 42: 1864-1870.

3 Auner G W, Koya S K, Huang C, Broadbent B, Trexler M, Auner Z et al. Applications of Raman spectroscopy in cancer diagnosis. Cancer Metastasis Rev 2018; 37: 691-717.

4 Thomsen B L, Christensen J B, Rodenko O, Usenov I, Grønnemose RB, Andersen T E et al. Accurate and fast identification of minimally prepared bacteria phenotypes using Raman spectroscopy assisted by machine learning. Sci Rep 2022; 12:16436.

Stöckel S, Kirchhoff J, Neugebauer U, Rösch P, Popp J. The application of Raman spectroscopy for the detection and identification of microorganisms. J Raman Spectrosc 2016; 47: 89-109.

6 Wang L, Liu W, Tang J-W, Wang J-J, Liu Q-H, Wen P-B et al. Applications of Raman Spectroscopy in Bacterial Infections: Principles, Advantages, and Shortcomings. Front Microbiol 2021; 12. doi:10.3389/fmicb.2021.683580.

7 Ho C-S, Jean N, Hogan C A, Blackmon L, Jeffrey S S, Holodniy M et al.

Rapid identification of pathogenic bacteria using Raman spectroscopy and deep learning. Nat Commun 2019; 10: 4927.

8 Doty K C, Muro C K, Bueno J, Halámková L, Lednev I K. What can Raman spectroscopy do for criminalistics? J Raman Spectrosc 2016; 47: 39-50.

9 Petersen M, Yu Z, Lu X. Application of Raman Spectroscopic Methods in Food Safety: A Review. Biosensors 2021; 11: 187.

10 Downes A, Elfick A. Raman Spectroscopy and Related Techniques in Biomedicine. Sensors 2010; 10: 1871-1889.

11 Kong K, Kendall C, Stone N, Notingher I. Raman spectroscopy for medical diagnostics—From in-vitro biofluid assays to in-vivo cancer detection. Adv Drug Deliv Rev 2015; 89:121-134.

12 Lieber C A, Majumder S K, Billheimer D, Ellis D L, Mahadevan-Jansen A.

Raman microspectroscopy for skin cancer detection in vitro. J Biomed Opt 2008; 13: 024013.

13 Ramírez-Elias M G, González FJ. Raman Spectroscopy for In Vivo Medical Diagnosis. In: Raman Spectroscopy. InTech, 2018 doi:10.5772/intechopen.72933.

14 Hanlon E B, Manoharan R, Koo T-W, Shafer K E, Motz J T, Fitzmaurice M et al. Prospects for in vivo Raman spectroscopy. Phys Med Biol 2000; 45: R1-R59.

15 Cordero E. In-vivo Raman spectroscopy: from basics to applications. J Biomed Opt 2018; 23: 1.

16 Motz J T, Gandhi S J, Scepanovic O R, Haka A S, Kramer J R, Dasari R R et al. Real-time Raman system for in vivo disease diagnosis. J Biomed Opt 2005; 10: 031113.

17 Culka A, Košek F, Drahota P, Jehlička J. Use of miniaturized Raman spectrometer for detection of sulfates of different hydration states—Significance for Mars studies. Icarus 2014; 243: 440-453.

18 Košek F, Culka A, Drahota P, Jehlička J. Applying portable Raman spectrometers for field discrimination of sulfates: Training for successful extraterrestrial detection. J Raman Spectrosc 2017; 48: 1085-1093.

19 Dickensheets D L, Wynn-Williams D D, Edwards H G M, Schoen C, Crowder C, Newton E M. A novel miniature confocal microscope/Raman spectrometer system for biomolecular analysis on future Mars missions after Antarctic trials. J Raman Spectrosc 2000; 31: 633-635.
Kim S, Joo J-H, Kim W, Bang A, Choi H W, Moon S W et al. A facile, portable surface-enhanced Raman spectroscopy sensing platform for on-site chemometrics of toxic chemicals. Sensors Actuators B Chem 2021; 343: 130102.
21 Wang W, Ma P, Song D. Applications of surface-enhanced Raman spectroscopy based on portable Raman spectrometers: A review of recent developments. Luminescence 2022; 37: 1822-1835.
22 Guo J, Liu Y, Ju H, Lu G. From lab to field: Surface-enhanced Raman scattering-based sensing strategies for on-site analysis. TrAC Trends Anal Chem 2022; 146: 116488.
23 Bratchenko I A, Bratchenko L A, Moryatov A A, Khristoforova Y A, Artemyev D N, Myakinin O O et al. In vivo diagnosis of skin cancer with a portable Raman spectroscopic device. Exp Dermatol 2021; 30: 652-663.
24 Kang J W, Park Y S, Chang H, Lee W, Singh S P, Choi W et al. Direct observation of glucose fingerprint using in vivo Raman spectroscopy. Sci Adv 2020; 6. doi:10.1126/sciadv.aay5206.
25 Coffey P, Smith N, Lennox B, Kijne G, Bowen B, Davis-Johnston A et al. Robotic arm material characterisation using LIBS and Raman in a nuclear hot cell decommissioning environment. J Hazard Mater 2021; 412: 125193.
26 Pinto M, Zorn K C, Tremblay J-P, Desroches J, Dallaire F, Aubertin K et al. Integration of a Raman spectroscopy system to a robotic-assisted surgical system for real-time tissue characterization during radical prostatectomy procedures. J Biomed Opt 2019; 24: 1.
27 Ashok P C, Giardini M E, Dholakia K, Sibbett W. A Raman spectroscopy bio-sensor for tissue discrimination in surgical robotics. J Biophotonics 2014; 7: 103-109.
28 Ilchenko O, Pilhun Y, Kutsyk A. Towards Raman imaging of centimeter scale tissue areas for real-time opto-molecular visualization of tissue boundaries for clinical applications. Light Sci Appl 2022; 11: 143.
29 Mu T, Li S, Feng H, Zhang C, Wang B, Ma X et al. High-Sensitive Smartphone-Based Raman System Based on Cloud Network Architecture. IEEE J Sel Top Quantum Electron 2019; 25: 1-6.
30 Kita D M, Miranda B, Favela D, Bono D, Michon J, Lin H et al. High-performance and scalable on-chip digital Fourier transform spectroscopy. Nat Commun 2018; 9:4405.
31 Zhang L, Chen J, Ma C, Li W, Qi Z, Xue N. Research Progress on On-Chip Fourier Transform Spectrometer. Laser Photon Rev 2021; 15: 2100016.
32 Xiao Ma, Mingyu Li, Jian-Jun He. CMOS-Compatible Integrated Spectrometer Based on Echelle Diffraction Grating and MSM Photodetector Array. IEEE Photonics J 2013; 5: 6600807-6600807.
33 Ryckeboer E, Nie X, Subramanian A Z, Martens D, Bienstman P, Clemmen S et al. CMOS-compatible silicon nitride spectrometers for lab-on-a-chip spectral sensing. In: Vivien L, Pavesi L, Pelli S (eds). 2016, p 98911 K.
34 Heaton H I. Interferometric Raman spectrometry with fiber waveguides. Appl Opt 1997; 36: 6739.
35 Pol Van Dorpe P P. Optical spectrometer with matched étendue. 2018.https://patents.google.com/patent/U.S. Pat. No. 9,909,992B2/en.
36 Hu T, Zhang X, Zhang M, Yan X. A high-resolution miniaturized ultraviolet spectrometer based on arrayed waveguide grating and microring cascade structures. Opt Commun 2021; 482:126591.
37 Ismail N, Choo-Smith L-P, Wörhoff K, Driessen A, Baclig A C, Caspers P J et al. Raman spectroscopy with an integrated arrayed-waveguide grating. Opt Lett 2011; 36: 4629.
38 Harwit M, Sloane N J A. Instrumental Considerations. In: Hadamard Transform Optics. Elsevier, 1979, pp 109-145.
39 Kita D M, Miranda B, Favela D, Bono D, Michon J, Lin H et al. High-performance and scalable on-chip digital Fourier transform spectroscopy. Nat Commun 2018; 9:4405.
40 Vunckx K, Geelen B, Garcia Munoz V, Lee W, Chang H, Van Dorpe P et al. Towards a miniaturized application-specific Raman spectrometer. In: Kim M S, Cho B-K, Chin B A (eds). Sensing for Agriculture and Food Quality and Safety XII. SPIE, 2020, p 8.
41 Korinth F, Schmälzlin E, Stiebing C, Urrutia T, Micheva G, Sandin C et al. Wide Field Spectral Imaging with Shifted Excitation Raman Difference Spectroscopy Using the Nod and Shuffle Technique. Sensors 2020; 20: 6723.
42 Manzoni C, Comelli D, Cerullo G N, Ardini B, Vanna R, Bassi A et al. A high-throughput Fourier-transform wide-field hyperspectral microscope for fluorescence and Raman imaging. In: Groves R, Liang H (eds). Optics for Arts, Architecture, and Archaeology VIII. SPIE, 2021, p 8.
43 Barnett P D, Angel S M. Miniature Spatial Heterodyne Raman Spectrometer with a Cell Phone Camera Detector. Appl Spectrosc 2017; 71: 988-995.
44 Waldron A, Allen A, Colon A, Carter J C, Angel S M. A Monolithic Spatial Heterodyne Raman Spectrometer: Initial Tests. Appl Spectrosc 2021; 75: 57-69.
45 Feng Z, Xia G, Lu R, Cai X, Cui H, Hu M. High-Performance Ultra-Thin Spectrometer Optical Design Based on Coddington's Equations. Sensors 2021; 21: 323.
46 Xia C, Zeng C, Feng Z. Design of optical system of crossed astigmatism Czerny-Turner spectrometer. In: Zhao H, Liu J, Xu L, Wang Y (eds). AOPC 2021: Optical Spectroscopy and Imaging. SPIE, 2021, p 35.
47 Dynamic, robust and versatile sensors for diverse applications. Nat Photonics 2008; 2: 157-157.
48 Auz B, Bonvallet J, Olmstead T, Rodriguez J. Miniature Raman spectrometer development. In: Mahadevan-Jansen A, Petrich W (eds). Biomedical Vibrational Spectroscopy 2018: Advances in Research and Industry. SPIE, 2018, p 36.
49 Belay G Y, Hoving W, van der Put A, Vervaeke M, Van Erps J, Thienpont H et al. Miniaturized broadband spectrometer based on a three-segment diffraction grating for spectral tissue sensing. Opt Lasers Eng 2020; 134: 106157.
50 Thomas Rasmussen, Poul Hansen, Bjarke Rose, Ole Jespersen, Nicolai Rasmussen M R. How to Design a Miniature Raman Spectrometer. Spectroscopy 2015; 30.https://www.spectroscopyonline.com/view/how-design-miniature-raman-spectrometer.
51 Denson S C, Pommier C J S, Denton M B. The Impact of Array Detectors on Raman Spectroscopy. J Chem Educ 2007; 84: 67.
52 Cooper J B, Aust J, Stellman C, Chike K, Myrick M L, Schwartz R et al. Raman spectroscopy with a low-cost imaging CCD array. Spectrochim Acta Part A Mol Spectrosc 1994; 50: 567-575.
53 Smith R M, Rahmer G. Pixel area variation in CCDs and implications for precision photometry. In: Dorn D A, Holland A D (eds). 2008, p 70212A.

54 Kotov I V., Kotov Al, Frank J, Kubanek P, Prouza M, O'Connor P et al. Study of pixel area variations in fully depleted thick CCD. In: Holland A D, Dorn D A (eds). 2010, p 774206.
55 Hennelly B, Barton S. Signal to noise ratio of Raman spectra of biological samples. In: Popp J, Tuchin V V., Pavone F S (eds). Biophotonics: Photonic Solutions for Better Health Care VI. SPIE, 2018, p 160.
56 Wang W, Major A, Paliwal J. Grating-Stabilized External Cavity Diode Lasers for Raman Spectroscopy—A Review. Appl Spectrosc Rev 2012; 47: 116-143.
57 Cooney T F, Skinner H T, Angel S M. Evaluation of External-Cavity Diode Lasers for Raman Spectroscopy. Appl Spectrosc 1995; 49: 1846-1851.
58 Saliba S D, Junker M, Turner L D, Scholten R E. Mode stability of external cavity diode lasers. Appl Opt 2009; 48: 6692.
59 Angel S M, Carrabba M, Cooney T F. The utilization of diode lasers for Raman spectroscopy. Spectrochim Acta Part A Mol Biomol Spectrosc 1995; 51: 1779-1799.
60 John B. Cooper, Philip E. Flecher, Sacharia Albin, Thomas M. Vess and WTW. Elimination of Mode Hopping and Frequency Hysteresis in Diode Laser Raman Spectroscopy: The Advantages of a Distributed Bragg Reflector Diode Laser for Raman Excitation. Appl Spectrosc 1995; 49: 1692-1698.
61 Leonhäuser B, Kissel H, Tomm J W, Hempel M, Unger A, Biesenbach J. High-power diode lasers under external optical feedback. In: Zediker M S (ed). 2015, p 93480M.
62 Maiwald M, Erbert G, Klehr A, Sumpf B, Wenzel H, Laurent T et al. Reliable operation of 785 nm DFB diode lasers for rapid Raman spectroscopy. In: Zediker M S (ed). 2007, p 64560W.
63 Petermann K. External optical feedback phenomena in semiconductor lasers. IEEE J Sel Top Quantum Electron 1995; 1: 480-489.
64 Engelbrecht R, Lins B, Zinn P, Buchtal R, Schmauss B. Line shapes of near-infrared DFB and VCSEL diode lasers under the influence of system back reflections. Appl Phys B 2012; 109: 441-452.
65 Goldberg L, Taylor H F, Dandridge A, Weller J F, Miles R O. Spectral Characteristics of Semiconductor Lasers with Optical Feedback. IEEE Trans Microw Theory Tech 1982; 30: 401-410.
66 Leisher P O, Li C, Jha A K, Pipe K P, Helmrich J D, Thiagarajan P et al. Feedback-Induced Failure of High-Power Diode Lasers. IEEE J Quantum Electron 2018; 54:1-13.
67 Kuwahara H, Onoda Y, Sasaki M, Shirasaki M. An optical isolator for semiconductor lasers in the 0.8 μm range. Opt Commun 1981; 40: 99-104.
68 Sommer L. Analytical absorption spectrophotometry in the visible and ultraviolet: the principles. Elsevier, 2012.
69 Kobayashi M, Ota T. Spectrometry device and spectrometry method. 2010; U.S. Pat. No. 9,435,741 B2.
70 Nguyen H T, Shore B W, Bryan S J, Britten J A, Boyd R D, Perry M D. High-efficiency fused-silica transmission gratings. Opt Lett 1997; 22: 142.
71 Gove R J. CMOS image sensor technology advances for mobile devices. In: High Performance Silicon Imaging. Elsevier, 2020, pp 185-240.
72 Aarnoutse P J, Westerhuis J A. Quantitative Raman Reaction Monitoring Using the Solvent as Internal Standard. Anal Chem 2005; 77: 1228-1236.
73 Chalmond B. PSF estimation for image deblurring. CVGIP Graph Model Image Process 1991; 53: 364-372.
74 Liu M S, Bursill L A, Prawer S, Beserman R. Temperature dependence of the first-order Raman phonon line of diamond. Phys Rev B 2000; 61: 3391-3395.
75 Gebrekidan M T, Knipfer C, Stelzle F, Popp J, Will S, Braeuer A. A shifted-excitation Raman difference spectroscopy (SERDS) evaluation strategy for the efficient isolation of Raman spectra from extreme fluorescence interference. J Raman Spectrosc 2016; 47:198-209.
76 Guo S, Chernavskaia O, Popp J, Bocklitz T. Spectral reconstruction for shifted-excitation Raman difference spectroscopy (SERDS). Talanta 2018; 186: 372-380.
77 Dieing T, Hollricher O. High-resolution, high-speed confocal Raman imaging. Vib Spectrosc 2008; 48: 22-27.
78 Tateda M, Matsushita H. Optical isolator independent of input polarization direction utilizing a quarter-wave plate. In: Digest of the LEOS Summer Topical Meetings, 2005. IEEE, pp 47-48.
79 Mosca S, Conti C, Stone N, Matousek P. Spatially offset Raman spectroscopy. Nat Rev Methods Prim 2021; 1: 21.
80 Ellis D I, Muhamadali H, Xu Y, Eccles R, Goodall I, Goodacre R. Rapid through-container detection of fake spirits and methanol quantification with handheld Raman spectroscopy. Analyst 2019; 144: 324-330.
81 Paine A J, Dayan A D. Defining a tolerable concentration of methanol in alcoholic drinks. Hum Exp Toxicol 2001; 20: 563-568.
82 FDA. Guidance for Industry PAT: A Framework for Innovative Pharmaceutical Development, Manufacturing, and Quality Assurance. FDA Off Doc 2004; 16.
83 ICH. Pharmaceutical Development Q8. ICH Harmon Tripart Guidel 2009; 8:1-28.
84 O'Mara P, Farrell A, Bones J, Twomey K. Staying alive! Sensors used for monitoring cell health in bioreactors. Talanta 2018; 176: 130-139.
85 Biechele P, Busse C, Solle D, Scheper T, Reardon K. Sensor systems for bioprocess monitoring. Eng Life Sci 2015; 15: 469-488.
86 PROCELLICS™ In-Line and Real-Time Bioprocess Raman Analyzer.
87 SUNIL-INA INSTRUMENT LTD.® Raman RXN3 Analyzer.
88 Esmonde-White K A, Cuellar M, Uerpmann C, Lenain B, Lewis I R. Raman spectroscopy as a process analytical technology for pharmaceutical manufacturing and bioprocessing. Anal Bioanal Chem 2017; 409: 637-649.
89 Shope T B, Vickers T J, Mann C K. The direct analysis of fermentation products by Raman spectroscopy. Appl Spectrosc 1987; 41: 908-912.
90 Sivakesava S, Irudayaraj J, Demirci A. Monitoring a bioprocess for ethanol production using FT-MIR and FT-Raman spectroscopy. J Ind Microbiol Biotechnol 2001; 26:185-190.
91 Xu Y, Ford J F, Mann C K, Vickers T J, Brackett J M, Cousineau K L et al. Raman measurement of glucose in bioreactor materials. In: Vo-Dinh T, Lieberman R A, Vurek G G, Katzir A (eds). Biomedical Sensing, Imaging, And Tracking Technologies Ii. 1997, pp 10-19.
92 Li B, Ray B H, Leister K J, Ryder A G. Performance monitoring of a mammalian cell based bioprocess using Raman spectroscopy. Anal Chim Acta 2013; 796: 84-91.
93 Cannizzaro C, Rhiel M, Marison I, von Stockar U. On-line monitoring of Phaffia rhodozyma fed-batch process with in situ dispersive raman spectroscopy. Biotechnol Bioeng 2003; 83: 668-680.

94 Shih C-J, Smith E A. Determination of glucose and ethanol after enzymatic hydrolysis and fermentation of biomass using Raman spectroscopy. Anal Chim Acta 2009; 653: 200-206.
95 Ávila TC, Poppi R J, Lunardi I, Tizei P A G, Pereira G A G. Raman spectroscopy and chemometrics for on-line control of glucose fermentation by *Saccharomyces cerevisiae*. Biotechnol Prog 2012; 28: 1598-1604.
96 Jendresen C B, Stahlhut S G, Li M, Gaspar P, Siedler S, Forster J et al. Highly Active and Specific Tyrosine Ammonia-Lyases from Diverse Origins Enable Enhanced Production of Aromatic Compounds in Bacteria and *Saccharomyces cerevisiae*. Appl Environ Microbiol 2015; 81: 4458-4476.
97 Caspers P J, Bruining H A, Puppels G J, Lucassen G W, Carter E A. In Vivo Confocal Raman Microspectroscopy of the Skin: Noninvasive Determination of Molecular Concentration Profiles. J Invest Dermatol 2001; 116: 434-442.
98 Nakagawa N, Matsumoto M, Sakai S. In vivo measurement of the water content in the dermis by confocal Raman spectroscopy. Ski Res Technol 2010; 16: 137-141.
99 Slipets R, Ilchenko O, Mazzoni C, Tentor F, Nielsen L H, Boisen A. Volumetric Raman chemical imaging of drug delivery systems. J Raman Spectrosc 2020; 51:1153-1159.
100 Göksel Y, Zor K, Rindzevicius T, Thorhauge Als-Nielsen B E, Schmiegelow K, Boisen A. Quantification of Methotrexate in Human Serum Using Surface-Enhanced Raman Scattering—Toward Therapeutic Drug Monitoring. ACS Sensors 2021; 6: 2664-2673.
101 Morelli L, Serioli L, Centorbi F A, Jendresen C B, Matteucci M, Ilchenko O et al. Injection molded lab-on-a-disc platform for screening of genetically modified *E. coli* using liquid-liquid extraction and surface enhanced Raman scattering. Lab Chip 2018; 18: 869-877.
102 Morelli L, Zór K, Jendresen C B, Rindzevicius T, Schmidt M S, Nielsen A T et al. Surface Enhanced Raman Scattering for Quantification of p-Coumaric Acid Produced by *Escherichia coli. Anal Chem* 2017; 89: 3981-3987.

Supplementary Materials for

Optics Miniaturization Strategy for Demanding Raman Spectroscopy Applications

This file includes:

Supplementary Text

References

Supplementary Text

S1 "Mode Hop" Deconvolution.

Blurred signal can be written as convolution of PSF and real (ideal) signal:

$$\tilde{f}(x)=\int_{-\infty}^{\infty} psf(x-\chi)f(\chi)d\chi = psf * f \tag{1}$$

In matrix form $$\tilde{f}=\hat{A}_{psf}f=\hat{A}_f\cdot psf \tag{2}$$

The above equation represents symmetry properties of convolution. It allows us to estimate PSF using ideal and blurred signals. The obtained PSF can be used for the deblurring of measured signals.

Since measured blurred signal contains noise, the solution should be found in sense of least squares.

The PSF estimation problem can be rewritten as classical least squares problem:

$$psf=\operatorname{argmin}_x\|y-\hat{A}x\|_2^2 \tag{3}$$

To constrain result to be non-negative, NNLS should be used:

$$psf=\operatorname{argmin}_x\|y-\hat{A}x\|_2^2 \text{ subject to } x\geq 0 \tag{4}$$

These problems are ill-posed and regularization steps are required. We considered several types of regularization[1]:

1) L1 regularization $$psf=\operatorname{argmin}_x\|y-\hat{A}x\|_2^2+\lambda^2\|x\|_1^2 \tag{5}$$

2) L2 regularization (robust regression)

$$psf=\operatorname{argmin}_x\|y-\hat{A}x\|_2^2+\lambda^2\|x\|_2^2 \tag{6}$$

3) L2 smooth regularization $$psf=\operatorname{argmin}_x\|y-\hat{A}x\|_2^2+\lambda^2\|\hat{D}_2x\|_2^2 \tag{7}$$

Here $\hat{D}_2$ is a second derivative matrix.

When the 'ideal' reference channel spectrum is available, the 'mod hop' deconvolution algorithm is the following:

1) Considering the reference channel spectrum at each step as blurred one, we can obtain PSF using the 'ideal' reference spectrum.
2) Data channel spectrum is deblurred using the obtained PSF.

We used the same value of the regularization parameter λ=0.1. As the example, the 'ideal' reference channel spectrum (FIG. 12) and blurred reference channel spectrum (FIG. 13) were used to estimate the PSF (FIG. 14). The deblurred data channel spectrum is shown in FIGS. 15*a*-15*d*. We used different techniques of regularization. The best result is obtained for L2 smooth regularization (Eq. 7)

The same procedure were applied to the time map (FIGS. 16*a*-16*d*).

Diamond peak at 1332 $cm^{-1}$ (FIG. [17) was used as for the estimation of PSF. Raman spectrum of diamond was baseline corrected using asymmetrical least squares2 (FIG. 18). Parameters used for baseline estimation is the following: $\lambda=10^4$, p=0.001. The obtained PSF is shown in FIG. 19.

We used L2 nonnegative regularization (Eq. 6). FISTA algorithm implemented in IRTools3 was used to solve this problem. Raman spectrum of toluene was used to test this deconvolution approach (FIG. 20). Background was estimated using asymmetric least squares with $\lambda=10^5$, p=0.001. The obtained results are shown in FIG. 21. It worth to be noted that background correction is a crucial step. Otherwise, additional artefacts might occur. As it can be seen from the FIG. 22, such approach allows increasing spectral resolution in 1.5 times.

REFERENCES

1. Eilers, P. H. C. Penalties in Chemometrics. in *Encyclopedia of Analytical Chemistry* 1-12 (Wiley, 2020). doi:10.1002/9780470027318.a9658.
2. Eilers, P. H. C. & Boelens, H. F. M. Baseline Correction with Asymmetric Least Squares Smoothing. https://zanran_storage.s3.amazonaws.com/www.science.uva.nl/ContentPages/4431996 18.pdf (2005).
3. Gazzola, S., Hansen, P. C. & Nagy, J. G. IR Tools: a MATLAB package of iterative regularization methods and large-scale test problems. Numer Algorithms 81, 773-811 (2019).
4. Olivieri, A. C., Goicoechea, H. C. & Ihon, F. A. MVC1: An integrated MatLab toolbox for first-order multivariate calibration. Chemometrics and Intelligent Laboratory Systems 73, 189-197 (2004).
5. Olivieri, A. & Olivieri, A. C. Introduction to Multivariate Calibration A Practical Approach Introduction to Multivariate Calibration Introduction to Multivariate Calibration.

The invention claimed is:

1. An apparatus for carrying out Raman spectroscopy on a sample, the apparatus comprising an optical system which is configured to guide a first portion of a laser beam to a sample and a second portion of the laser beam to a reference sample, wherein a first spectrum beam is generated from an interaction between the first portion of the laser beam and the sample and a second spectrum beam is generated from an interaction between the second portion of the laser beam and the reference sample;

the optical system being configured to guide the first spectrum beam and the second spectrum beam to a diffraction element, wherein the diffraction element is configured to split the first spectrum beam into a first spectrum of spatially separated wavelength components associated with the sample and to split the second spectrum beam into a second spectrum of spatially separated wavelength components associated with the reference sample;

the apparatus comprising a detector with an array of pixels for detecting the first and second spectrum on the array of pixels;

wherein the sample and the reference sample are placed in different positions in the optical system; and wherein the optical system comprises an optical filter having a surface facing a grating and a surface facing at least one of the sample and the reference sample, the optical filter being reflective for the first portion of the laser beam and the second portion of the laser beam and transmissive for the first and second spectrum beams, wherein the reference sample is arranged on one of the surfaces of the optical filter, wherein the optical system is configured to guide the first portion of the laser beam such that it is reflected from the optical filter and incident on the sample, wherein the first portion of the laser beam is bypassing the reference sample;

wherein the optical system comprises an optical slit through which the first and second spectrum beams are guided by the optical system, wherein the optical slit formed by a separate optical element is arranged between the optical filter and the grating, and wherein the optical element forming the optical slit is movable such that the optical slit can be aligned in at least one direction in a plane perpendicular to an optical axis of the optical system.

2. The apparatus of claim 1, wherein the optical system comprises a beam blocker arranged between the sample and the reference sample and configured to block at least one of the following: light that propagates from the reference sample to the sample and light that propagates from the sample to the reference sample.

3. The apparatus of claim 2, wherein the beam blocker has at least one reflective surface configured to reflect light that is incident on the reflective surface out of the optical system and on a beam dump.

4. The apparatus of claim 3, wherein the beam blocker has at least one absorbing surface configured to absorb light which is incident on the absorbing surface.

5. The apparatus of claim 3, wherein the optical system is configured to guide the first portion of the laser beam and the first spectrum beam such that the first portion of the laser beam and the first spectrum beam bypass the reference sample.

6. The apparatus of claim 1, wherein the optical element forming the optical slit is spaced at a distance in the range between 0 mm to 2.0 mm or 0.5 mm and 2.0 mm from an optical filter.

7. The apparatus of claim 1, wherein the optical system comprises a set of optical apertures, the apertures of the set of optical apertures being arranged between the grating and the optical filter in a staggered relationship as viewed in a longitudinal direction, each aperture comprising a disc-shaped body having a central opening, the openings being aligned with each other as viewed in the longitudinal direction.

8. The apparatus of claim 7, wherein the openings of the apertures are dimensioned such that first and second spectral beams pass through the openings.

9. The apparatus of claim 8, wherein a diameter of the openings is the same for all openings or different for the openings, wherein the diameters of the openings are adapted to be a factor larger than beam diameters of the beams passing through the openings, wherein the factor is between 1 and 2.

10. The apparatus of claim 1, wherein a position of the optical slit is fixed during operation of the apparatus.

* * * * *